(12) United States Patent
Ellison et al.

(10) Patent No.: US 11,099,344 B2
(45) Date of Patent: Aug. 24, 2021

(54) FIBER CASSETTE

(71) Applicant: Telect, Inc., Liberty Lake, WA (US)

(72) Inventors: Steven W. Ellison, Mead, WA (US); David Michael Smead, Liberty Lake, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 16/462,898

(22) PCT Filed: Nov. 7, 2017

(86) PCT No.: PCT/US2017/060391
§ 371 (c)(1),
(2) Date: May 21, 2019

(87) PCT Pub. No.: WO2018/089359
PCT Pub. Date: May 17, 2018

(65) Prior Publication Data
US 2019/0302388 A1   Oct. 3, 2019

Related U.S. Application Data

(60) Provisional application No. 62/539,539, filed on Jul. 31, 2017, provisional application No. 62/419,402, filed on Nov. 8, 2016.

(51) Int. Cl.
*G02B 6/00* (2006.01)
*G02B 6/44* (2006.01)
*G02B 6/38* (2006.01)

(52) U.S. Cl.
CPC ......... *G02B 6/4455* (2013.01); *G02B 6/3897* (2013.01); *G02B 6/3887* (2013.01)

(58) Field of Classification Search
CPC .. G02B 6/4455; G02B 6/4459; G02B 6/4452; G02B 6/4453
See application file for complete search history.

(56) References Cited

U.S. PATENT DOCUMENTS 4,848,859 A * 7/1989 Edmonds ............... A47B 47/03
312/257.1
5,339,379 A   8/1994 Kutsch et al.
(Continued)

FOREIGN PATENT DOCUMENTS

WO   WO2016168337   10/2016
WO   WO2018089347    5/2018
(Continued)

OTHER PUBLICATIONS

U.S. Appl. No. 15/363,016, filed Nov. 29, 2016, Campbell et al., Slidable telecommunications tray with cable slack management.
(Continued)

*Primary Examiner* — Eric Wong
(74) *Attorney, Agent, or Firm* — Lee & Hayes, P.C.

(57) ABSTRACT

A cassette including a length from a first end of the cassette to a second end of the cassette, and a width from a first side of the cassette to a second side of the cassette. The cassette may include a detent arranged in the first side of the cassette or arranged in the second side of the cassette. The cassette may be arrangeable in a tray such that the at least one detent is engageable with another detent arranged in a wall of the tray. The cassette may include a groove arranged in a bottom surface of the cassette. The cassette may be arrangeable in a tray such that a protrusion of the tray is engageable with the groove of the cassette.

19 Claims, 33 Drawing Sheets

(56) References Cited

U.S. PATENT DOCUMENTS

| | | | |
|---|---|---|---|
| 5,546,495 A | 8/1996 | Bruckner et al. | |
| 6,674,952 B2 | 1/2004 | Howell et al. | |
| 6,748,155 B2 | 6/2004 | Kim et al. | |
| 6,792,190 B2 | 9/2004 | Xin et al. | |
| 6,855,558 B1 | 2/2005 | Hattori | |
| 7,509,016 B2 | 3/2009 | Smith et al. | |
| 7,873,252 B2 * | 1/2011 | Smrha | G02B 6/3897 385/135 |
| 8,280,216 B2 | 10/2012 | Cooke et al. | |
| 8,326,107 B2 | 12/2012 | Cooke et al. | |
| 8,452,148 B2 | 5/2013 | Cooke et al. | |
| 8,625,950 B2 | 1/2014 | Beamon et al. | |
| 8,712,206 B2 | 4/2014 | Cooke et al. | |
| 9,097,872 B2 | 8/2015 | Seo et al. | |
| 9,128,262 B2 * | 9/2015 | Campbell | G02B 6/4453 |
| 9,250,409 B2 | 2/2016 | Blackwell, Jr. et al. | |
| 9,258,916 B2 | 2/2016 | Lu et al. | |
| 9,389,384 B2 | 7/2016 | Solheid et al. | |
| 9,470,868 B2 | 10/2016 | Ellison et al. | |
| 9,523,833 B2 | 12/2016 | Campbell et al. | |
| 9,541,726 B2 | 1/2017 | Geens et al. | |
| 9,690,065 B2 | 6/2017 | Wiltjer et al. | |
| 9,823,432 B2 | 11/2017 | Alexi et al. | |
| 9,829,642 B2 | 11/2017 | Geens et al. | |
| 9,829,666 B2 | 11/2017 | Ellison et al. | |
| 10,012,813 B2 | 7/2018 | Petersen et al. | |
| 10,025,055 B2 | 7/2018 | Alexi et al. | |
| 10,101,542 B2 * | 10/2018 | Kostecka | G02B 6/3879 |
| 10,175,441 B2 | 1/2019 | Ellison et al. | |
| 10,203,465 B2 | 2/2019 | Krampotich et al. | |
| 10,209,470 B2 | 2/2019 | Geling et al. | |
| 10,254,496 B2 | 4/2019 | Geens et al. | |
| 10,502,917 B2 | 12/2019 | Geens et al. | |
| 2009/0324189 A1 * | 12/2009 | Hill | G02B 6/4454 385/135 |
| 2010/0054684 A1 * | 3/2010 | Cooke | G02B 6/4455 385/135 |
| 2010/0142910 A1 * | 6/2010 | Hill | G02B 6/4454 385/135 |
| 2012/0328258 A1 | 12/2012 | Barron et al. | |
| 2014/0086545 A1 | 3/2014 | Solheid et al. | |
| 2014/0241691 A1 * | 8/2014 | Solheid | G02B 6/4452 385/135 |
| 2014/0248028 A1 | 9/2014 | Campbell et al. | |
| 2014/0354131 A1 | 12/2014 | Takeuchi et al. | |
| 2015/0063772 A1 | 3/2015 | Beamon et al. | |
| 2015/0117829 A1 | 4/2015 | Allen | |
| 2015/0212286 A1 | 7/2015 | Vongseng et al. | |
| 2015/0309674 A1 | 10/2015 | Williams et al. | |
| 2016/0033732 A1 | 2/2016 | Giraud et al. | |
| 2016/0047999 A1 | 2/2016 | Alexi et al. | |
| 2016/0062068 A1 | 3/2016 | Giraud et al. | |
| 2016/0077298 A1 | 3/2016 | Wiltjer et al. | |
| 2016/0219748 A1 | 7/2016 | Tsai et al. | |
| 2018/0224621 A1 | 8/2018 | Campbell et al. | |
| 2019/0317292 A1 | 10/2019 | Ellison et al. | |
| 2020/0081216 A1 * | 3/2020 | Takeuchi | G02B 6/445 |

FOREIGN PATENT DOCUMENTS

| | | |
|---|---|---|
| WO | WO2018089359 | 5/2018 |
| WO | WO2018089367 | 5/2018 |

OTHER PUBLICATIONS

"ICC. Slide-Out Fiber Optic Rack Mount Enclosures. Installation Instructions", Dec. 3, 2014, retrieved from the internet on Feb. 23, 2018 from URL:https://web/archive.org/web/20150508202907/http://www.icc.com/docs/install/ICFORET31RM-62RM-T4RM-MSR-0521-RevA.pdf, 2 pages.

PCT Invitation to Pay Additional Fees mailed Jan. 17, 2018 for PCT Application No. PCT/US17/60360, 2 pages.

PCT Search Report and Written Opinion dated Jan. 4, 2018 for PCT Application No. PCT/US17/60391, 8 pages.

PCT Search Report and Written Opinion dated Jan. 4, 2018 for PCT Application No. PCT/US17/60406, 8 pages.

PCT Search Report and Written Opinion dated Apr. 5, 2018 for PCT application No. PCT/US2017/060360, 13 pages.

\* cited by examiner

US 11,099,344 B2

FIBER CASSETTE

CROSS-REFERENCE TO RELATED APPLICATIONS

This application is a national stage application of an international patent application PCT/US17/60391, filed Nov. 7, 2017, entitled "Fiber Cassette", which claims priority to U.S. Provisional Patent Application No. 62/419,402, filed Nov. 8, 2016, entitled "Fiber Optic Systems" and to U.S. Provisional Patent Application No. 62/539,539, filed Jul. 31, 2017, entitled "Configurable Fiber Cassette" all of which are hereby incorporated by reference in their entirety.

BACKGROUND

An important consideration in data communication equipment is circuit density. Most central data communication locations have limited space. Therefore, there is a need to reduce the size of data communication equipment, and install as much data communication equipment as possible in a relatively small space at a central data communication location.

For data communication manufacturers, making high density trays can be a challenging process in which engineers develop trays to meet the high density needs of the central data communication locations while protecting communication lines, maintaining bend radii of the communication lines, and managing massive amounts of the communication lines. This is particularly true for optical fiber communication lines, where the engineers create trays having a high density of optical fibers.

Another important consideration in data communication equipment is configurability. Existing high density fiber cassettes can have limited configurability and are generally dedicated to a particular use in the central data communication location. For example, existing high density fiber cassettes have a front geometry dedicated to specific connector types and a unique back geometry dedicated to specific connector types. Dedicated front and back geometries may be exacerbated when making a high density fiber cassette exclusively for a particular high density fiber application. For example, existing high density fiber cassettes may be manufactured exclusively for MPO applications, patch applications, splice applications, splitter applications, pre-terminated applications, etc. Where existing high density fiber cassettes may be manufactured exclusively for a particular high density fiber application, each of the existing high density fiber cassettes may have a different front geometry and/or different back geometry designed exclusively for the particular high density fiber application. Because each high density fiber cassette may have a different front geometry and/or different back geometry this reduces the configurability of the high density fiber cassettes, thereby reducing margins by increasing the cost of manufacturing and increasing manufacturing lead times of high density fiber cassettes. Therefore, there is a desire to maximize margins by decreasing a cost of manufacturing the high density fiber cassettes, as well as maximizing a cassettes utility in a number of applications by making them easily factory configurable.

SUMMARY

Data communication apparatus are described which are configured to have a tray arrangeable in a chassis where the tray is slideably displaceable from a stowed position to a first use position or to a second use position, and a shuttle member may be arranged in a cassette arranged in the tray, where the shuttle member may be slideably displaceable from a first position to a second position. This summary is provided to introduce simplified concepts of fiber optic tray systems, which are further described below in the Detailed Description. This summary is not intended to identify essential features of the claimed subject matter, nor is it intended for use in determining the scope of the claimed subject matter.

In an example, a data communication apparatus includes a cassette including a shuttle member arranged in a first end of the cassette opposite a connector fastening station arranged in a second end of the cassette. The shuttle member may be slideably displaceable from a first position to a second position, wherein when in the first position the shuttle member is disposed a distance from the connector fastening station, and when in the second position the shuttle member is disposed a distance from the connector fastening station greater than the distance when the shuttle member is in the first position. The connector fastening station may provide for fastening respective connectors to a portion of the second end of the cassette via the shuttle member incrementally over time.

In an example, a data communication apparatus may include a 19 inch chassis having a left side and a right side, and the tray may be a standard tray arrangeable in both the left side and the right side of the 19 inch chassis.

In other examples, a data communication apparatus may include a flexible member having an end coupleable to a first end of the tray or a second end of the tray. The flexible member may provide for maintaining a bend radius of optical fibers received by the flexible member when the tray is slideably displaced from the stowed position to the first use position or to the second use position.

In another example, a data communication apparatus may include a braking member arrangeable adjacent to the first side or the second side of the chassis. The braking member may include one or more protrusions having a having offset points of contact that provide for gripping a plurality of optical fibers arranged in the protrusions. The braking member may provide for preventing the plurality of optical fibers from being displaced, relative to the protrusions, up to a threshold amount of force applied to the optical fibers.

In an example, a data communication apparatus may include a second cassette arranged in a second portion, adjacent to a first portion, of a tray. In this example, the second cassette may include a first connector fastening station arranged in a first end of the second cassette and a second connector fastening station arranged in a second end, opposite the first end, of the second cassette.

In another example, a data communication apparatus may include a second cassette arranged in a second portion, adjacent to the first portion, of the tray. In this example, the second cassette may have a first portion adjacent to a second portion, and may include at least one connector module removeably receivable by the first portion or the second portion of the second cassette.

In an example, a data communication apparatus includes a cassette having a first end opposite a second end. The first end may have a first geometry symmetrical, about at least one axis, to a second geometry of the second end. A first connector fastening station may be arranged in the first end of the cassette and may include a first plurality of receptacles. Each of the first plurality of receptacles may be configured to contain at least one of a first connector, a first adapter, a first plug, or a first strain relief unit. A second connector fastening station may be arranged in the second end of the cassette and may include a second plurality of receptacles. Each of the second plurality of receptacles may be configured to contain at least one of a second connector, a second adapter, a second plug, or a second strain relief unit. The first plurality of receptacles of the first connector fastening station may be symmetrical, about the at least one axis, to the second plurality of receptacles of the second connector fastening station.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 illustrates a tray in a first use position where a first end of the tray is disposed a distance external from a first access side of the chassis.

FIG. 6 illustrates a first position of the shuttle member where the shuttle member is disposed a distance from the connector fastening station.

FIG. 9 illustrates the shuttle member may be arranged in the first end of the cassette opposite the connector fastening station arranged in the second end of the cassette.

FIG. 13 illustrates a first connector fastening station may be arranged in a first end of the second cassette and a second connector fastening station may be arranged in a second end, opposite the first end, of the second cassette.

FIG. 16 illustrates connector modules may be removeably received by first and second portions of the third cassette.

FIG. 20 illustrates a first end of the cassette having a first geometry symmetrical, about at least one axis, to a second geometry of a second end of the cassette.

DETAILED DESCRIPTION

Overview

This disclosure is directed to data communication apparatus having a cassette arranged in a tray arranged in a chassis, where the tray is slideably displaceable from a stowed position to a first use position or to a second use position and at least a first portion of the cassette is disposed a distance external from a first access side of the chassis when the tray is in the first use position, and at least a second portion of the cassette is disposed a distance external from a second access side of the chassis when the tray is in the second use position. Because the first portion of the cassette is disposed the distance external from the first access side of the chassis when the tray is in the first use position and the second portion of the cassette is disposed the distance external from the second access side of the chassis when the tray is in the second use position, a user may patch cables from the first access side of the chassis to the second access side of the chassis without the user reaching into the chassis to arrange the cables proximate to second access side of the chassis.

In another example, a data communication apparatus includes a flexible member that maintains a bend radius of optical fibers received by the flexible member when a tray is slideably displaced from a stowed position to a first use position or to a second use position. The flexible member may include at least a first straight link shorter than a second straight link, where the first straight link may be pivotably coupled to the second straight link. Because the flexible member may include a first straight link shorter than a second straight link, where the first straight link may be pivotably coupled to the second straight link, the flexible member may provide for using a tray in a left side position of the chassis or a right side position of the chassis.

In another example, a data communication apparatus includes a braking member. The braking member may include protrusions having offset points of contact that provide for contacting a plurality of optical fibers arranged in the protrusions and prevent the plurality of optical fibers from being displaced relative to the protrusions. Because the braking member prevents the optical fibers from being displaced relative to the protrusions, the braking member provides for managing the optical fibers by maintaining a desired service loop or slack of the optical fibers and prevents the optical fibers from becoming taut which prevents a tray from being slideably displaced and/or prevents damaging the optical fibers.

Illustrative Data Communication Apparatuses

Figure 1:
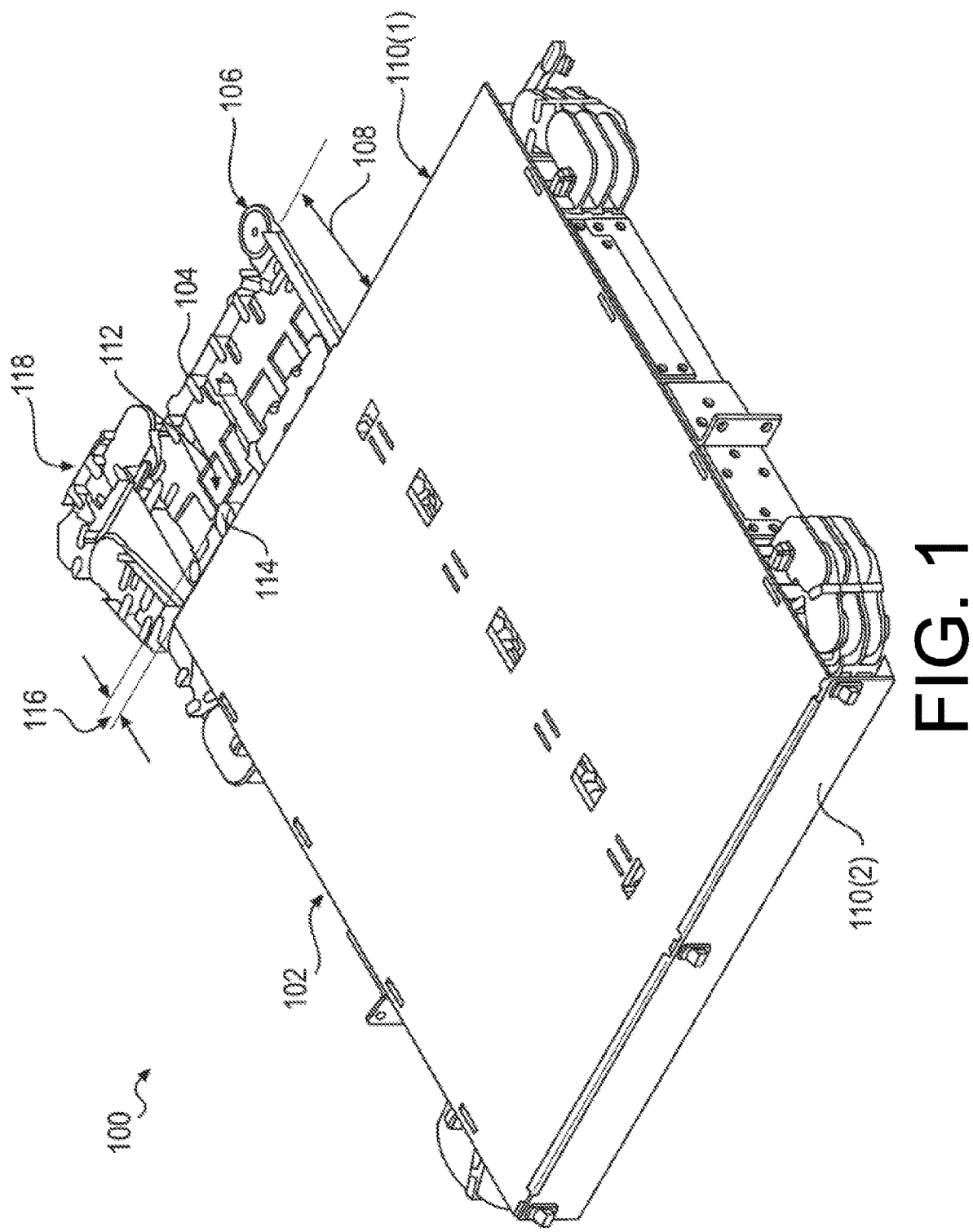
FIG. 1 illustrates an isometric view of an example data communication apparatus having trays arranged in a chassis.

FIG. 1 illustrates an isometric view of an example data communication apparatus 100 having trays arranged in a chassis 102. The chassis 102 may be a 19 inch chassis and provide for patching optical fibers. A patch may be separate fibers (e.g., separate cables) terminated in a connector (e.g., Lucent Connectors (LCs), subscriber connectors (SC), etc.)) having an end condition (e.g., an angle-polished connector (APC) end condition or an ultra-polished connector (UPC) end condition). In the patch, the separate fibers terminated in the connector may then be inserted into an adapter (e.g., a coupler), where the adapter may provide for an additional cable to be inserted into the opposite end providing a continuous path for light to pass through. While FIG. 1 illustrates a chassis 102 that provides for patching optical fibers, the chassis could provide for other termination connections. For example, the chassis could provide for splicing optical fibers. FIG. 1 illustrates a tray 104 in a first use position 106 where a first end of the tray is disposed a distance 108 external from a first access side 110(1) of the chassis. For example, the chassis 102 may having a first access side 110(1) opposite a second access side 110(2), and the tray 104 may be slideably displaceable from a stowed position, where the first and second ends of the tray are located in the chassis, to the first use position 106. In one example, the distance 108 may be at least about 1 inch to at most about 6 inches. In another example, the distance 108 may be about 3 inches.

FIG. 1 illustrates a cassette 112 arranged in the tray 104. The cassette 112 may include a shuttle member 114 arranged in a first end of the cassette. When the tray 104 is in the first use position 106, at least a portion of the shuttle member 114 may be disposed a distance 116 external from the first access side 110(1) of the chassis 102.

FIG. 1 illustrates a flexible member 118 having an end coupleable to the first end of the tray 104, the flexible member for maintaining a bend radius of optical fibers received by the flexible member.

Figure 2:
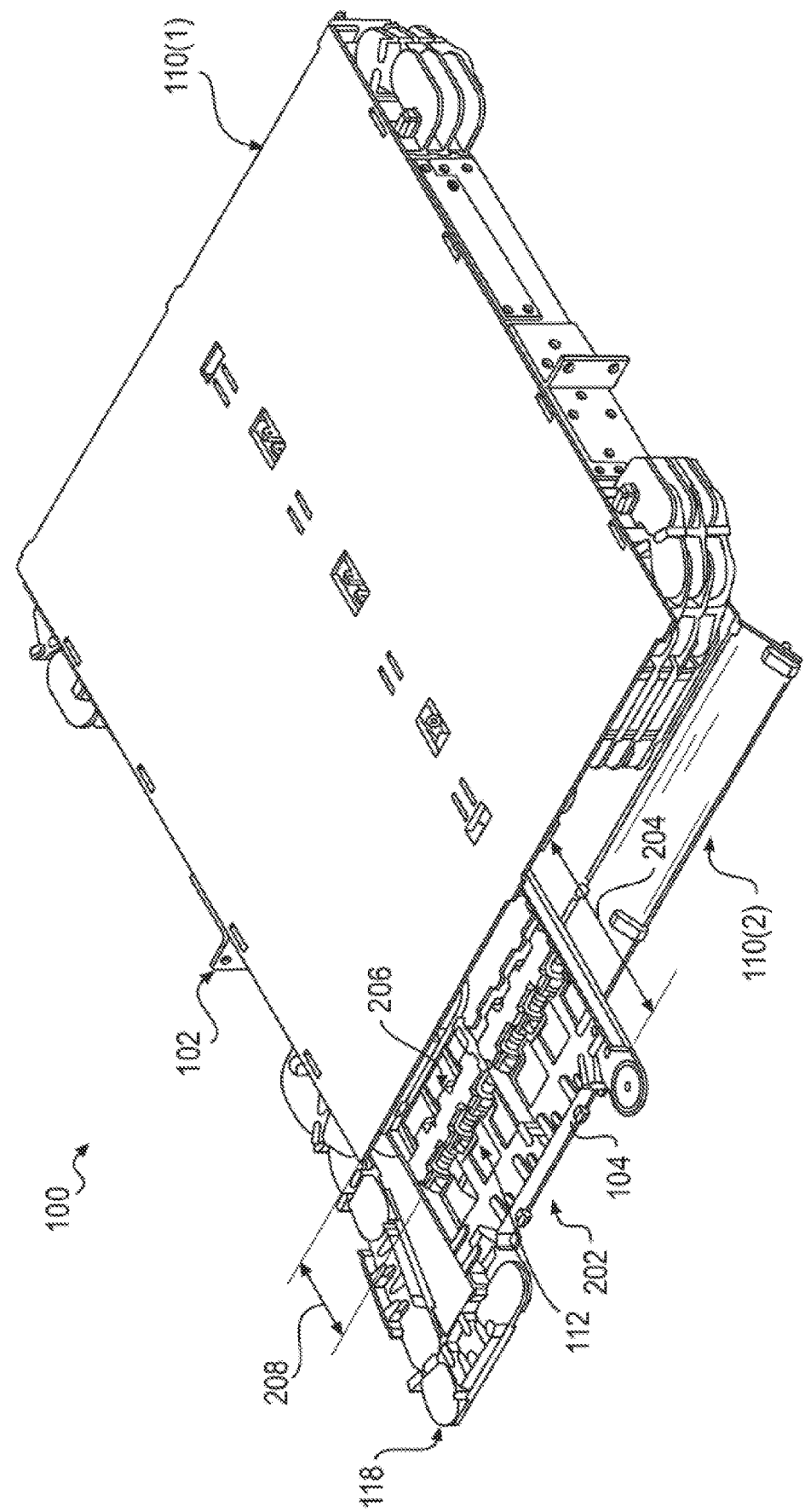
FIG. 2 illustrates the isometric view of the example data communication apparatus shown in FIG. 1, with the tray in a second use position where a second end of the tray is disposed a distance external from a second access side of the chassis.

FIG. 2 illustrates the isometric view of the example data communication apparatus 100 shown in FIG. 1, with the tray 104 in a second use position 202 where a second end of the tray is disposed a distance 204 external from the second access side 110(2) of the chassis 102. For example, the tray 104 may be slideably displaceable from a stowed position, where the first and second ends of the tray are located in the chassis, to the second use position 202. In one example, the distance 204 may be at least about 1 inch to at most about 6 inches. In another example, the distance 204 may be about 3 inches.

FIG. 2 illustrates the cassette 112 arranged in the tray 104 may include a connector fastening station 206 arranged in the second end of the cassette. When the tray 104 is in the second use position 202, at least a portion of the connector fastening station 206 may be disposed a distance 208 external from the second access side 110(2) of the chassis 102.

FIG. 2 illustrates another flexible member 118 having an end coupleable to the second end of the tray 104, the flexible member for maintaining a bend radius of optical fibers received by the flexible member.

Figure 3:
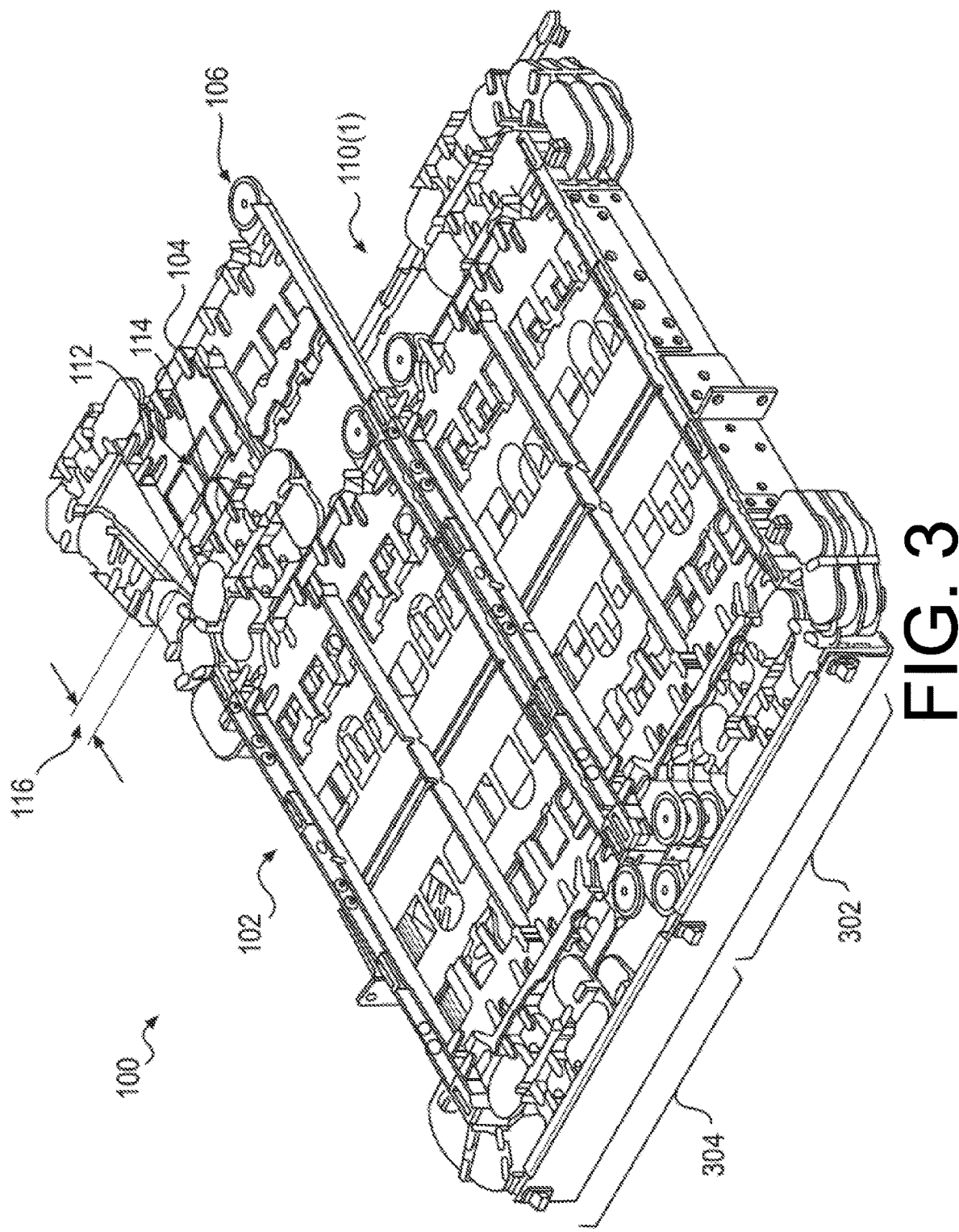
FIG. 3 illustrates the isometric view of the example data communication apparatus shown in FIG. 1, with a top of the chassis removed (the top of the chassis not shown), and the tray in the first use position where a portion of the shuttle member is in a first position and disposed a distance external from the first access side of the chassis.

FIG. 3 illustrates the isometric view of the example data communication apparatus 100 shown in FIG. 1, with a top of the chassis removed (the top of the chassis not shown), and the tray 104 in the first use position 106 where a portion of the shuttle member 114 is disposed the distance 116 external from the first access side 110(1) of the chassis 102. In this example, where the shuttle member 114 is disposed the distance 116 from the first access side 110(1) of the chassis 102, the shuttle member 114 may be in a first position where the shuttle member 114 is disposed a distance from the connector fastening station 206.

FIG. 3 illustrates the chassis 102 may be a 19 inch chassis having a left side 302 and a right side 304, and the tray 104 may be a standard tray arrangeable in both the left side 302 or the right side 304. For example, the tray 104 may be able to be received in the left side 302 of the chassis or the tray 104 may be able to be received in the right side 304 of the chassis. FIG. 3 illustrates a plurality of trays arranged in each of the left side 302 and the right side 304. Further, FIG. 3 illustrates a plurality of the flexible members may be coupled to the first and second ends of each of the respective trays. Because the trays may be arranged in either the left side or the right side of the chassis, a user may quickly and easily configure the data communication apparatus 100. Further, the flexible members may provide for arranging the trays in either the left side or the right side of the chassis.

Figure 4:
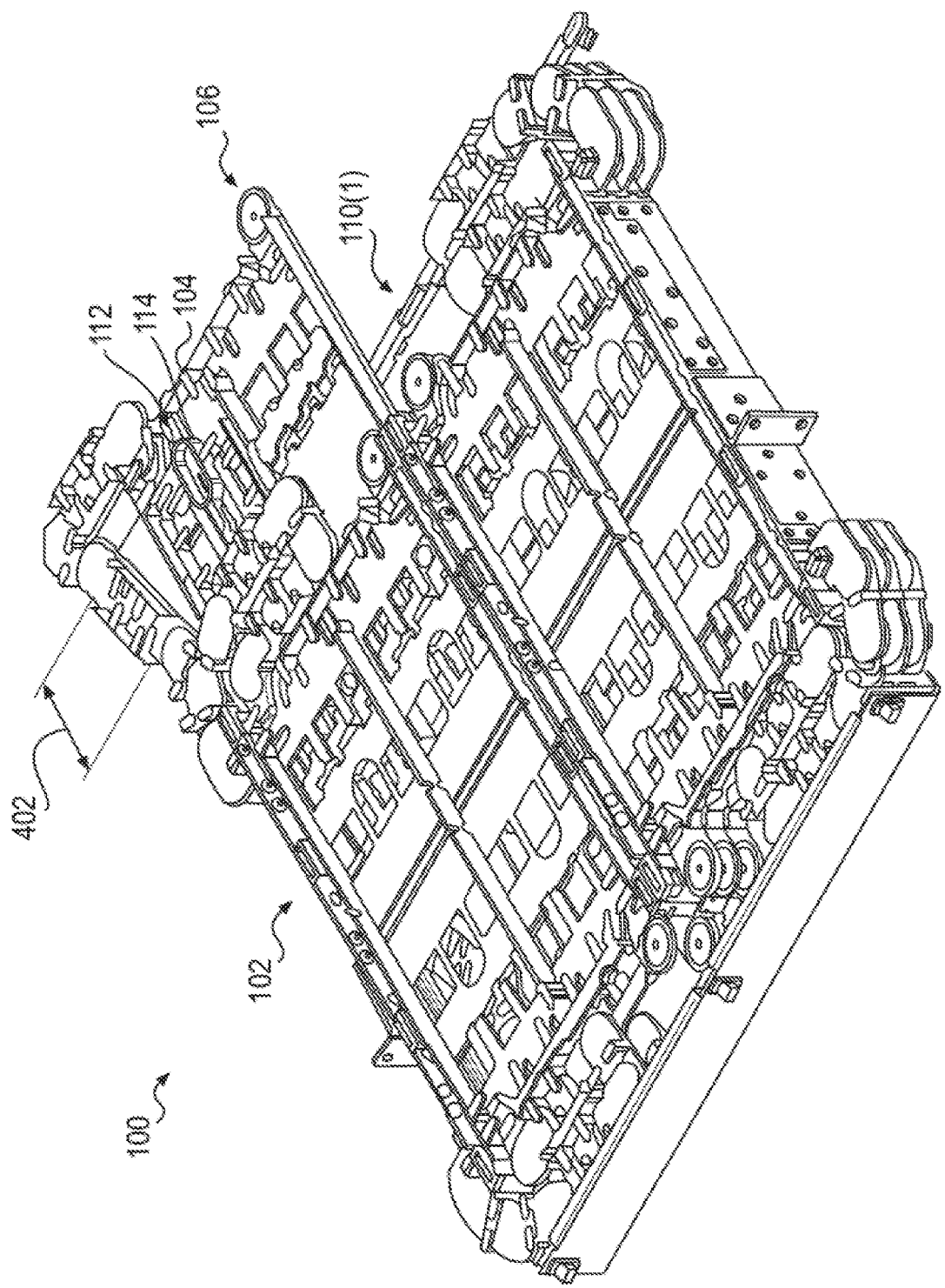
FIG. 4 illustrates the tray in the first use position shown in FIG. 3, and the shuttle member in a second position disposed a distance external from the first access side of the chassis greater than a distance when the shuttle member was in a first position shown in FIG. 3.

FIG. 4 illustrates the tray 104 in the first use position 106 shown in FIG. 3, and the shuttle member 114 in a second position disposed a distance 402 external from the first access side of the chassis 102 greater than the distance 116 when the shuttle member 114 was in a first position. For example, the shuttle member 114 arranged in the first end of the cassette 112, opposite the connector fastening station 206 arranged in the second end of the cassette 112, may be slideably displaceable from a first position to a second position. When the shuttle member 114 is in the first position the shuttle member 114 may be disposed the distance 116 from the first access side of the chassis 102 and when the shuttle member 114 is in the second position the shuttle member may be disposed the distance 402, greater than the distance 116, from the first access side of the chassis 102.

A user (e.g., technician) may slideably displace the tray 104 out from the stowed position to the first use position 106 and subsequently slideably displace the shuttle member 114 from the first position to the second position to route optical fiber through the tray 104. For example, a user may open the tray and subsequently displace the shuttle member 114 to the second position to route optical fibers through the shuttle member 114 to be arranged proximate to the connector fastening station 206. Subsequent to routing the optical fibers through the shuttle member 114 proximate the connector fastening station 206, the user may displace the shuttle member 114 back to the first position.

Figure 5:
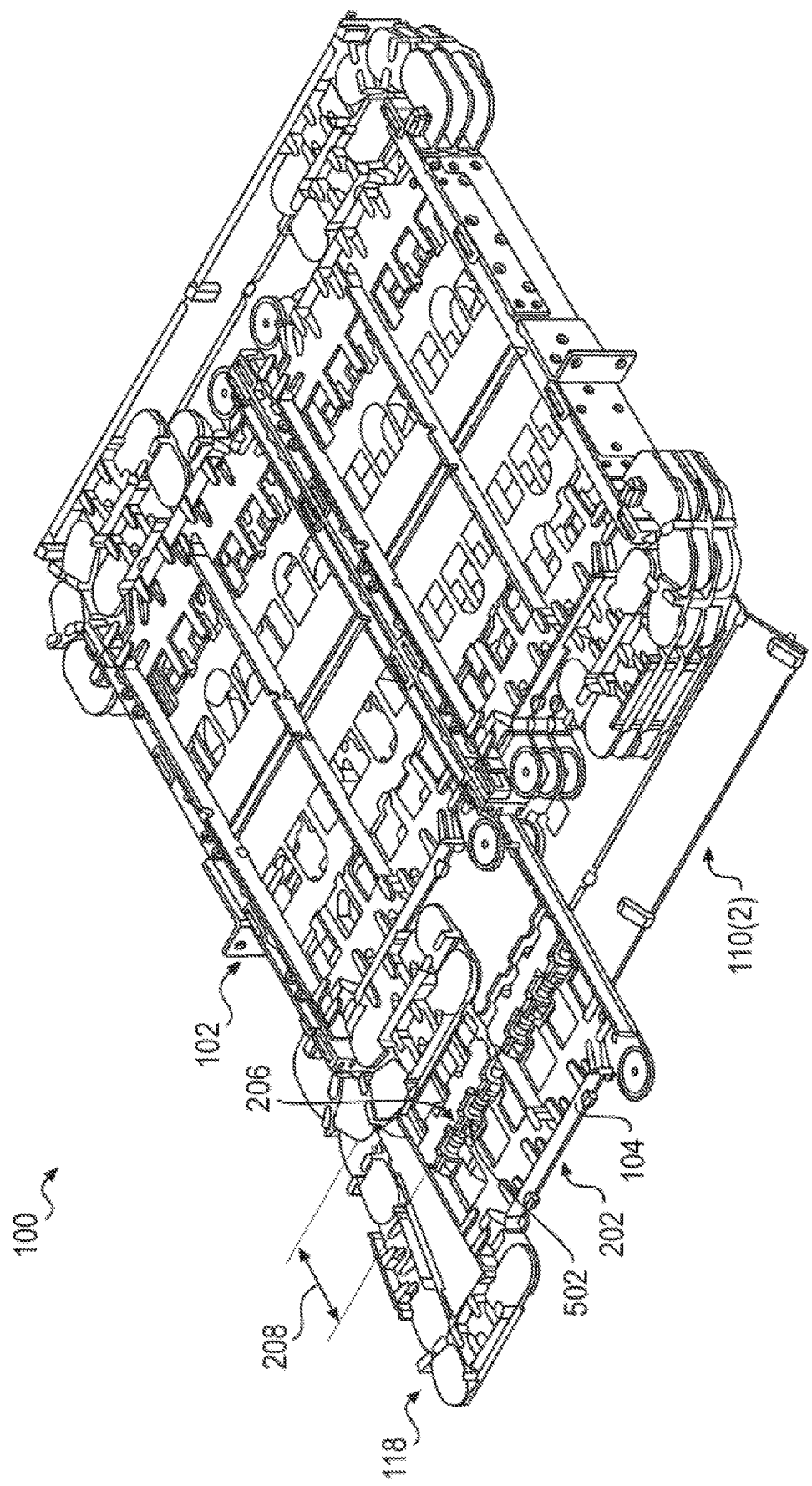
FIG. 5 illustrates the isometric view of the example data communication apparatus shown in FIG. 1, with the top of the chassis removed (the top of the chassis not shown), and the tray in the second use position where a portion of a connector fastening station is disposed a distance external from the second access side of the chassis.

FIG. 5 illustrates the isometric view of the example data communication apparatus 100 shown in FIG. 1, with the top of the chassis removed (top of chassis not shown), and the tray 104 in the second use position 202 where the portion of the connector fastening station 206 is disposed the distance 208 external from the second access side 110(2) of the chassis 102. Subsequent to the user routing the optical fibers through the shuttle member 114 towards the connector fastening station 206, the user may slideably displace the tray 104 to the second use position 202 where the portion of the connector fastening station 206 is disposed the distance 208 external from the second access side 110(2) of the chassis 102 to gain access to the optical fibers disposed proximate to the connector fastening station 206. The plurality of optical fibers may each have a termination, and a user may removeably connect (e.g., couple, connect, join, plug, etc.) a respective termination to a respective connector 502 fastened to the connector fastening station 206 when the tray 104 is in the second use position.

Figure 6:
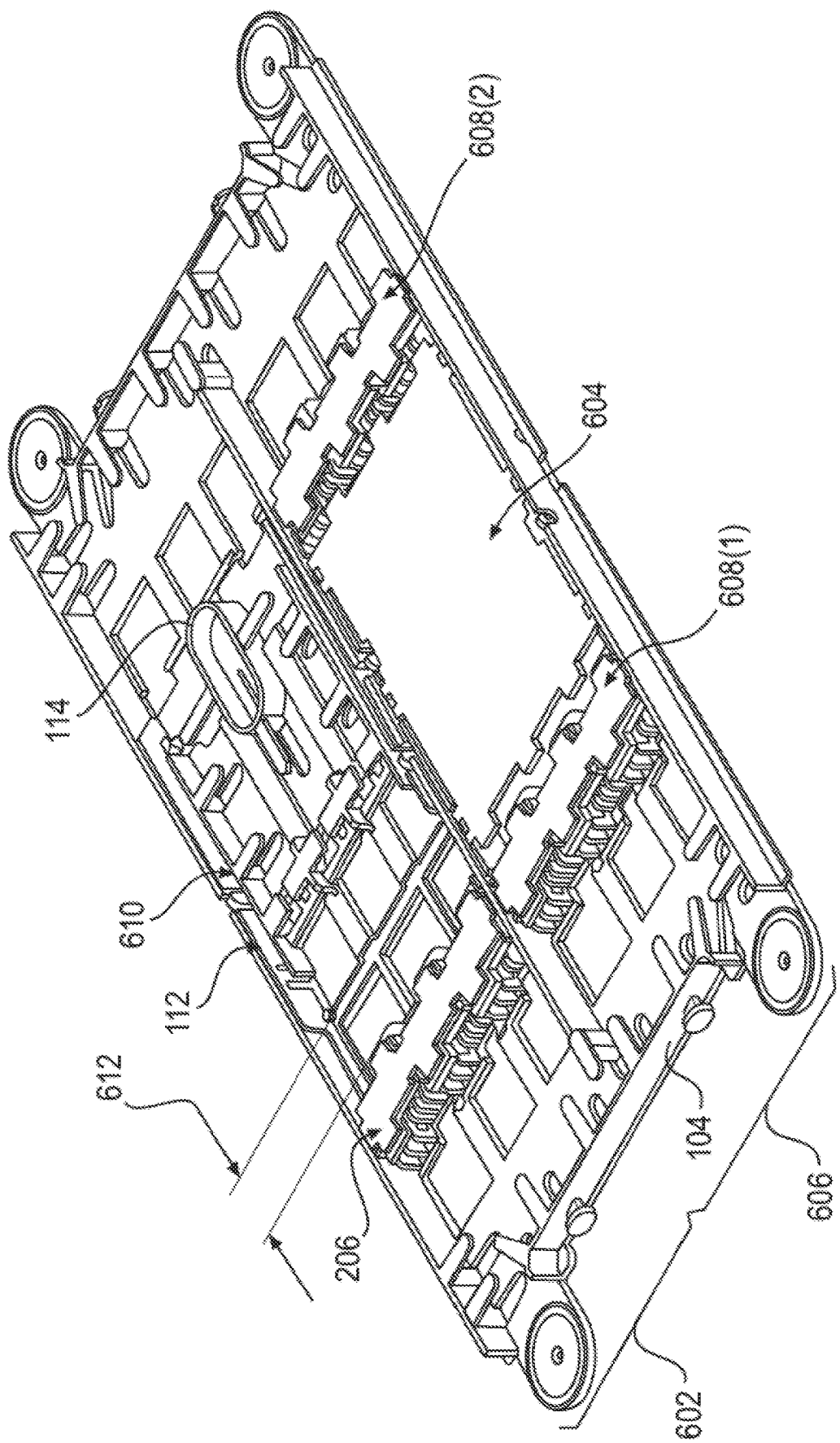
FIG. 6 illustrates a perspective view of the example tray shown in FIGS. 1-5 with a first cassette arranged in a first portion of the tray, and a second cassette arranged in a second portion, adjacent to the first portion, of the tray.

FIG. 6 illustrates a perspective view of the example tray 104 shown in FIGS. 1-5 with the cassette 112 (e.g., first cassette) arranged in a first portion 602 of the tray 104, and a second cassette 604 arranged in a second portion 606, adjacent to the first portion 602, of the tray 104. While FIG. 6 illustrates the first cassette 112 arranged in the first portion 602 and the second cassette 604 arranged in the second portion 606, the first cassette 112 may be arranged in the second portion 606, and the second cassette 604 may be arranged in the first portion 602. The second cassette 604 may include a first connector fastening station 608(1) arranged in a first end of the second cassette 604 and a second connector fastening station 608(2) arranged in a second end, opposite the first end, of the second cassette 604. The first connector fastening station 608(1) may fasten respective connectors to a portion of the first end of the second cassette in a staggered pattern or the second connector fastening station 608(2) may fasten respective connectors to a portion of the second end of the second cassette in the staggered pattern.

FIG. 6 illustrates a first position 610 of the shuttle member 114 where the shuttle member 114 is disposed a distance 612 from the connector fastening station 206.

Figure 7:
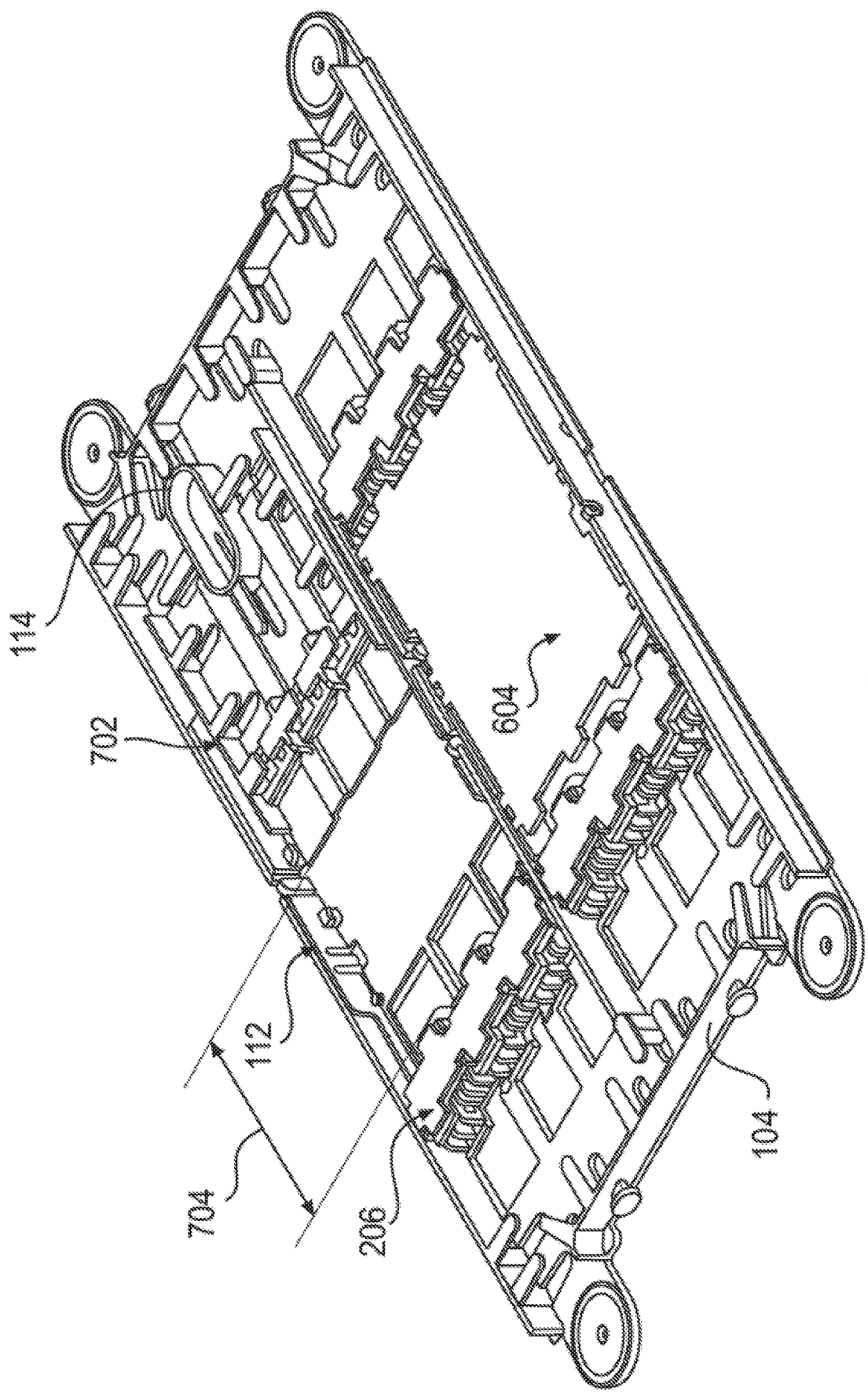
FIG. 7 illustrates the perspective view of the example tray shown in FIG. 6, with the shuttle member in the second position, where the shuttle member may be disposed a distance from the connector fastening station greater than the distance when the shuttle member is in the first position shown in FIG. 6.

FIG. 7 illustrates the perspective view of the example tray 104 shown in FIG. 6, with the shuttle member 114 in a second position 702 where the shuttle member 114 may be disposed a distance 704 from the connector fastening station 206 greater than the distance 612 when the shuttle member 114 is in the first position 610. The second position 702 may provide more space for a user to route optical fiber through the shuttle member 114.

In one example, the tray 104 may have a height of at least about 0.5 rack units (RUs) to at most about 5 RUs. In another example, the tray 104 may have a height of at least about 1 RU. In one example, optical fiber arranged in the shuttle member 114 may be contained by optical fiber management members (e.g., posts, ramps, gates, troughs, apertures, etc.) arranged in the shuttle member 114 that provide for routing and/or containing the optical fiber with a minimum bend radius. Further, the optical fiber management members may provide for positioning the plurality of optical fibers received by the shuttle member adjacent to the connector fastening station. For example, a user may route the plurality of optical fibers through optical fiber management members arranged in the shuttle member when the tray is in the first use position and the shuttle member is in the first position or the second position.

Figure 8:
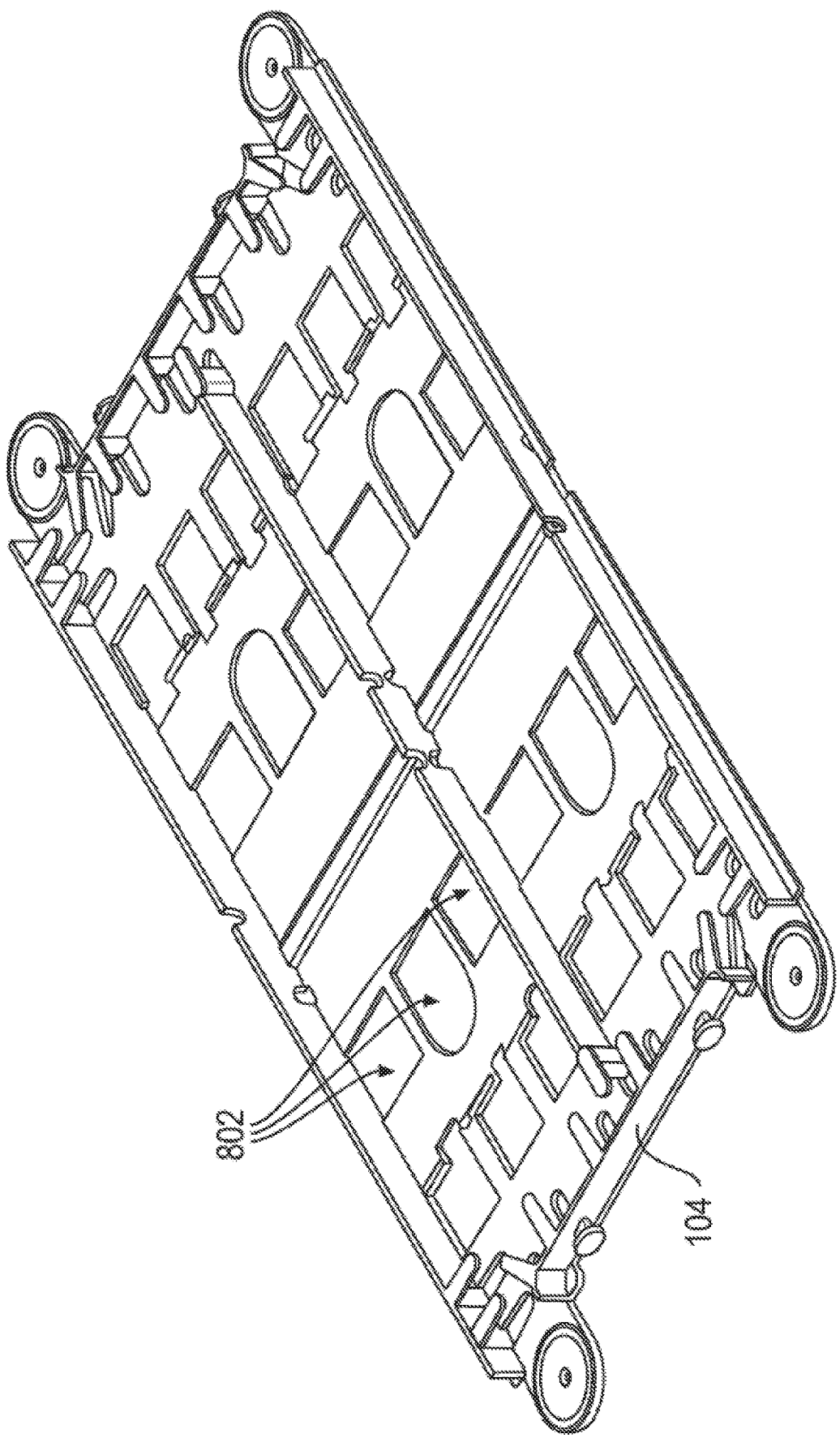
FIG. 8 illustrates a perspective view of the example tray shown in FIGS. 1-7 void of cassettes.

FIG. 8 illustrates a perspective view of the tray 104 shown in FIGS. 1-7 void of the first cassette 112 and the second cassette 604. FIG. 8 illustrates the tray 104 may include one or more apertures 802 arranged in a portion (e.g., a surface, a bottom surface, a floor, etc.) of the tray 104. For example, the one or more apertures 802 may be arranged in a portion (e.g., a surface, a bottom surface, a floor, etc.) of the tray 104 proximate to the connector fastening station. The one or more apertures 802 may provide access to a connector fastened to the connector fastening station. For example, the one or more apertures 802 may provide access to a bottom portion of a connector fastened to the connector fastening station and/or an optical fiber termination connected to the connector.

Figure 9:
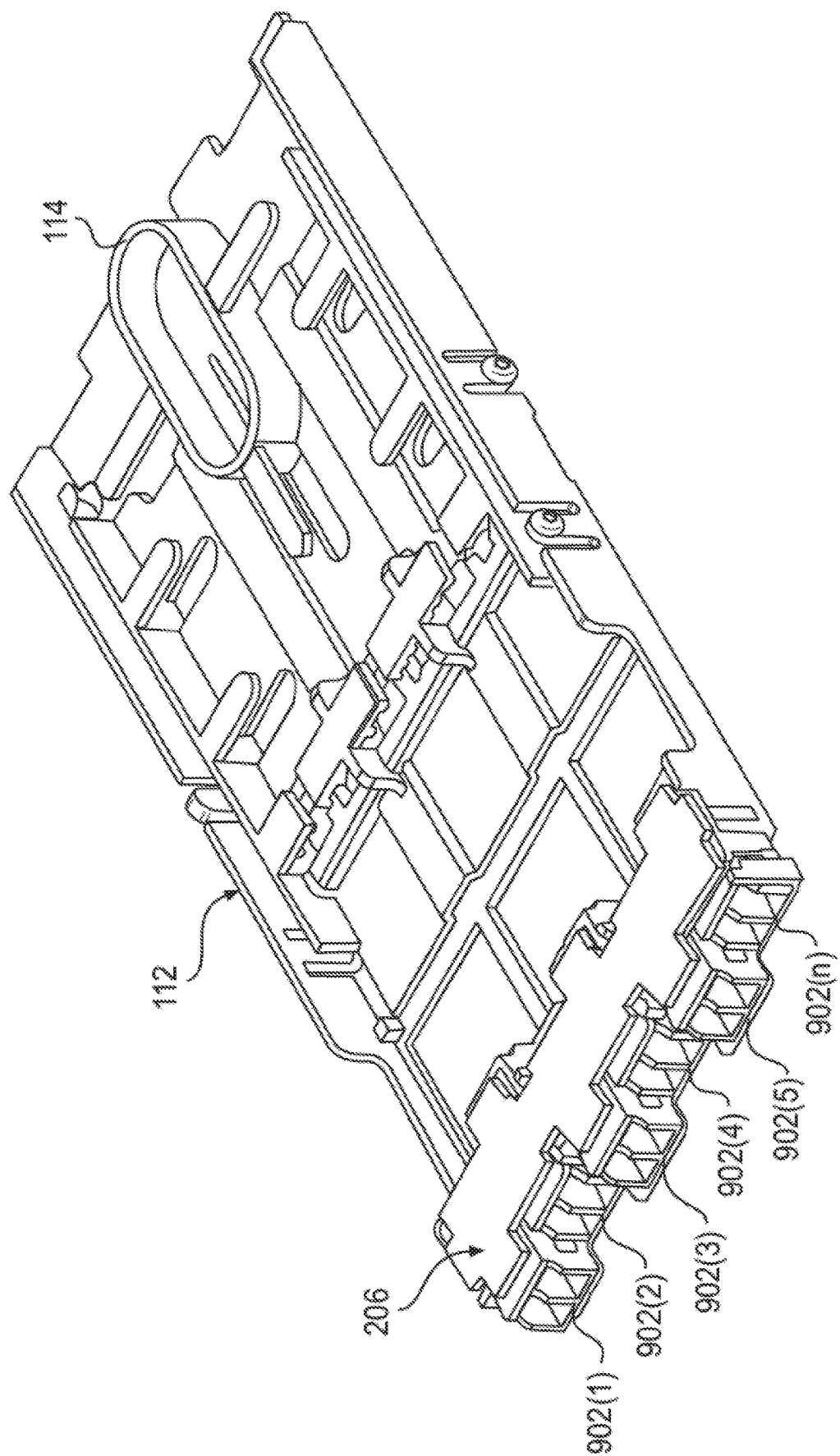
FIG. 9 illustrates a perspective view of the example first cassette shown in FIGS. 1-7.

FIG. 9 illustrates a perspective view of the example first cassette 112 shown in FIGS. 1-7. FIG. 9 illustrates the shuttle member 114 arranged in the first end of the cassette 112 opposite the connector fastening station 206 arranged in the second end of the cassette 112. FIG. 9 illustrates the connector fastening station 206 fastens respective connectors 902(1), 902(2), 902(3), 902(4), 902(5), and 902(n) to a portion of the second end of the cassette in a staggered pattern. The staggered pattern of the respective connectors 902(1) through 902(n) may include a first connector (e.g., connector 902(1)) and a second connector (e.g., connector 902(3)) disposed in a first plane, and a third connector (e.g., connector 902(2)) and a fourth connector (e.g., connector 902(4)) disposed in a second plane, where the first plane is spaced a distance from the second plane. Each connector may be a commercial off-the-shelf (COTS) connector and the connector fastening station may provide for connecting each COTS connector to a portion of the second end of the cassette in the staggered pattern.

Figure 10:
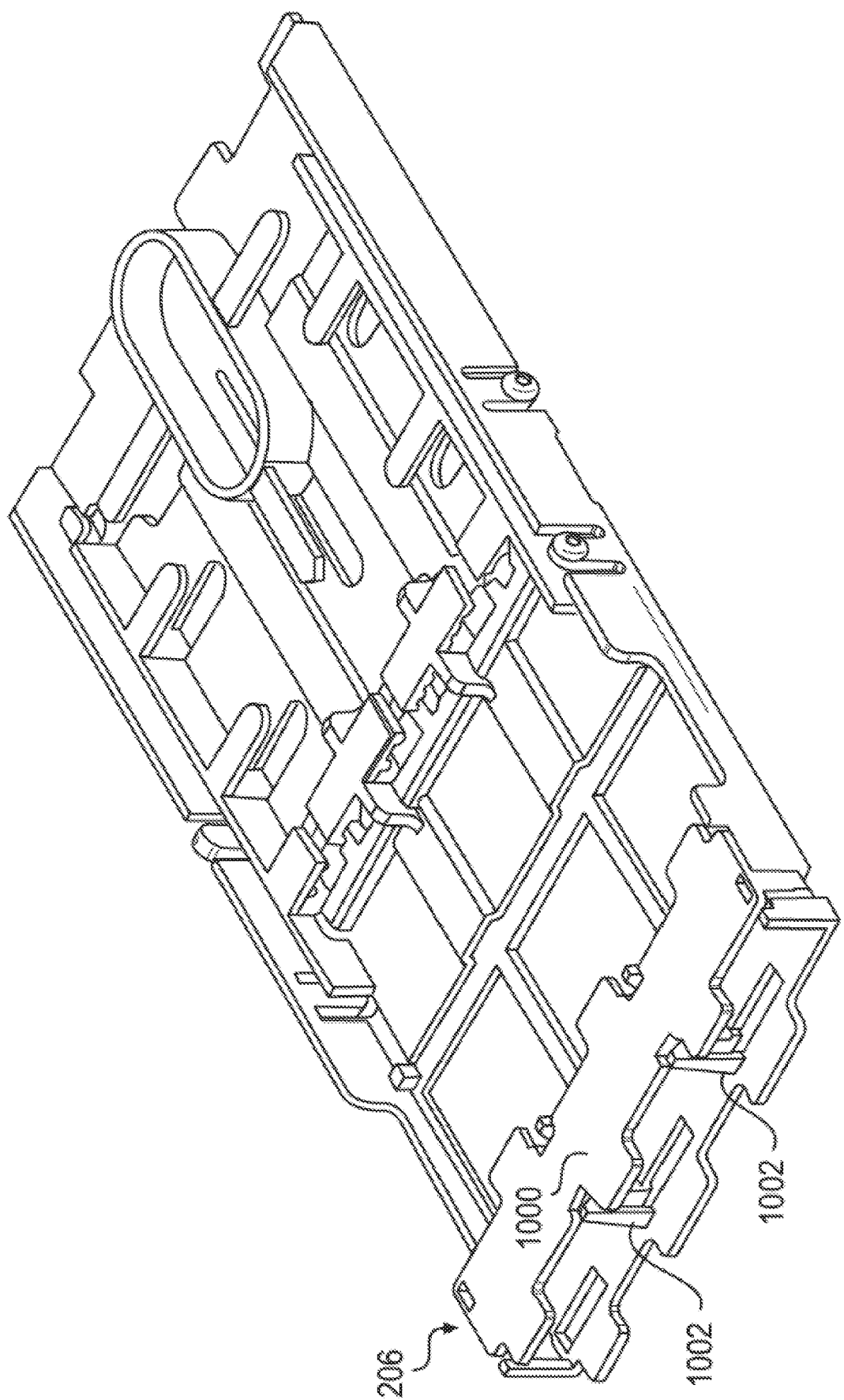
FIG. 10 illustrates the perspective view of the example first cassette shown in FIG. 9, void of connectors (not shown) fastened to the connector fastening station.

FIG. 10 illustrates the perspective view of the example first cassette 112 shown in FIG. 9, void of the connectors 902(1) through 902(n) (not shown) fastened to the connector fastening station 206. FIG. 10 illustrates the connector fastening station 206 may include a connector cover 1000 that fastens (e.g., snap-fits, press-fits, interference fits, etc.) with one or more fastening members 1002.

Figure 11:
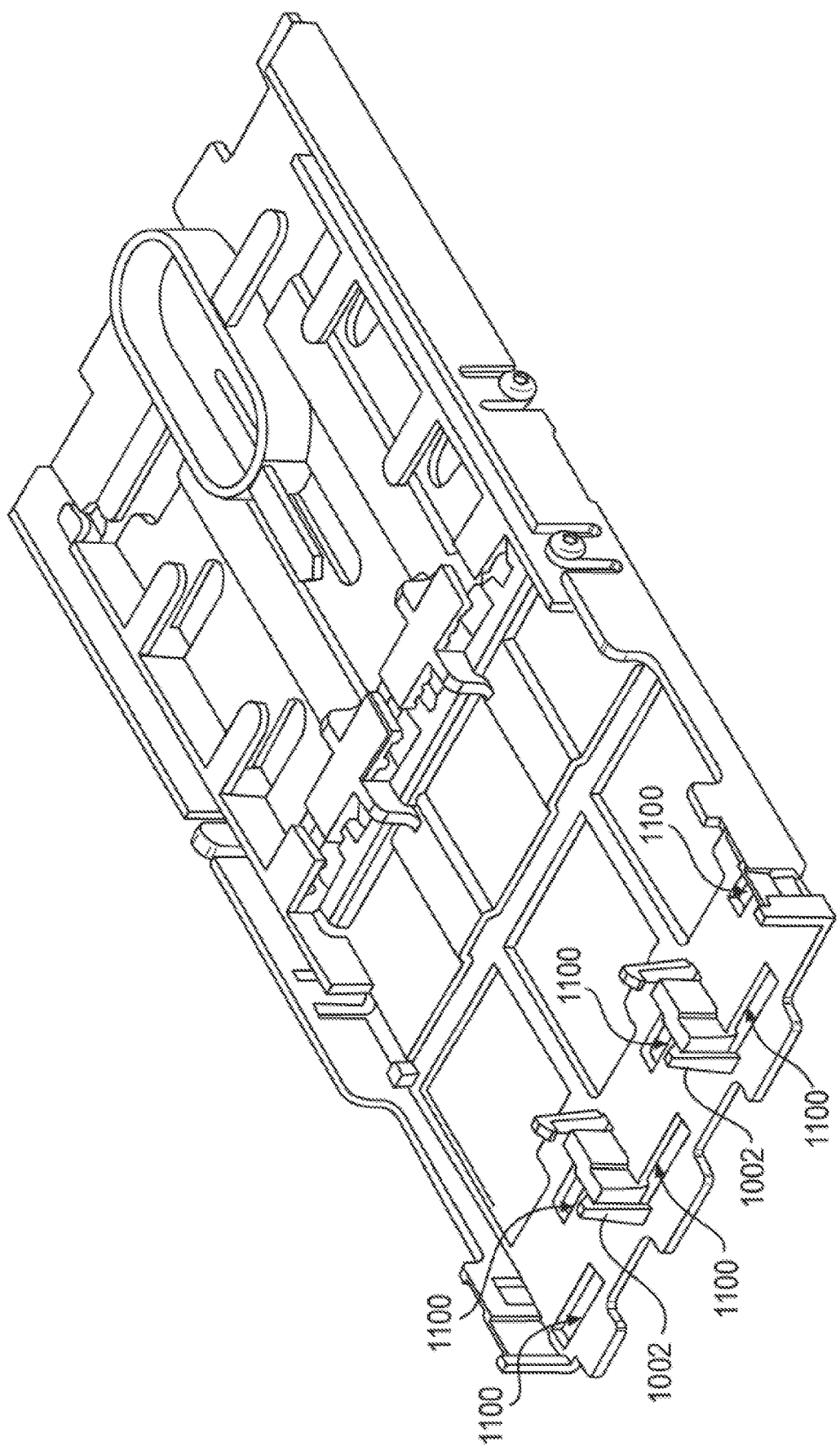
FIG. 11 illustrates the perspective view of the example first cassette shown in FIG. 10, void of the connector cover (not shown).

FIG. 11 illustrates the perspective view of the example first cassette 112 shown in FIG. 10, void of the connector cover 1000 (not shown). FIG. 11 illustrates apertures 1100 arranged in the portion (e.g., surface, bottom surface, floor, etc.) of the cassette 112. The apertures 1100 to receive a portion of each of the COTS connectors and connect each COTS connector to the portion of the second end of the cassette in the staggered pattern.

Figure 12:
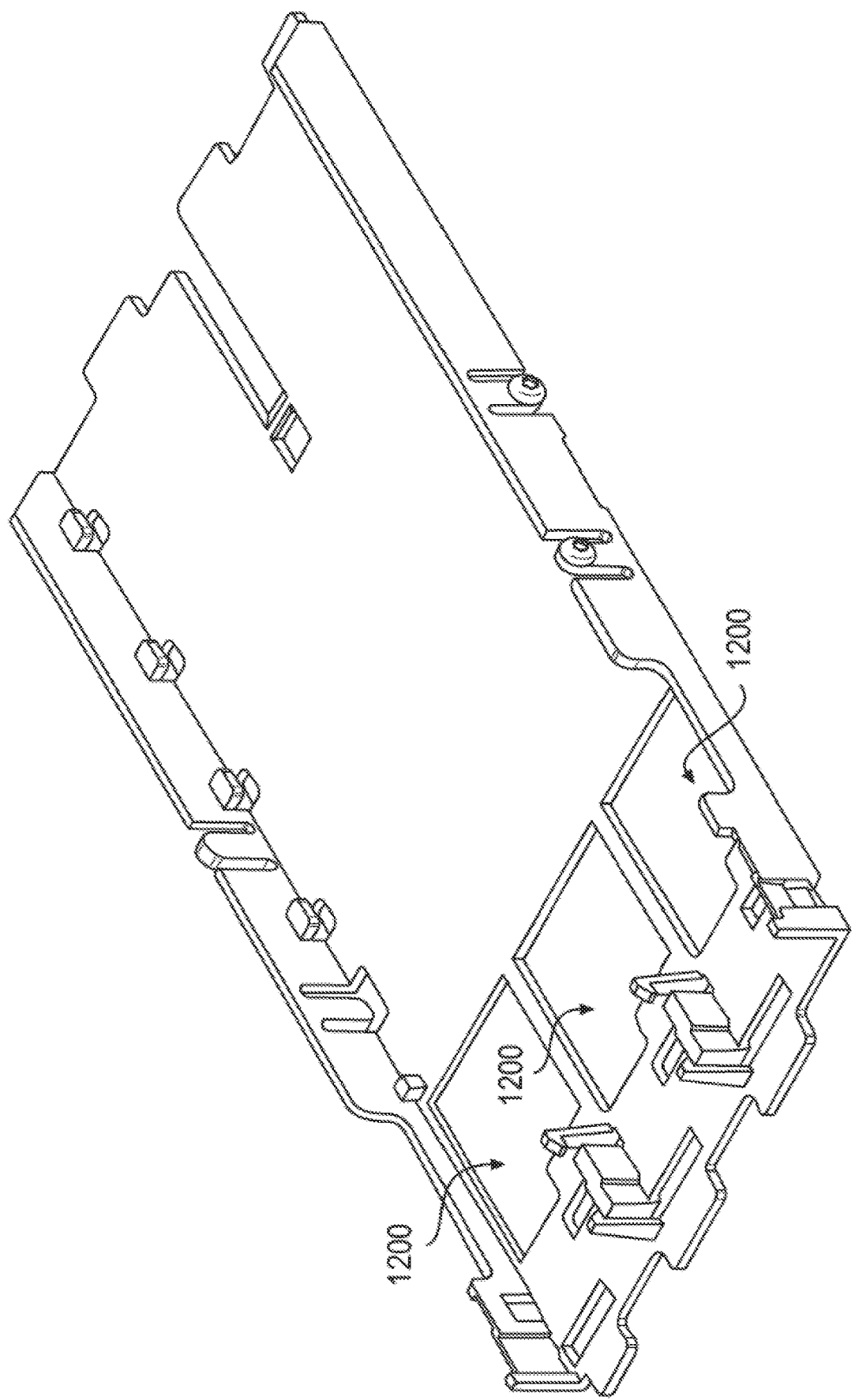
FIG. 12 illustrates the perspective view of the example first cassette shown in FIG. 10, void of the shuttle member (not shown).

FIG. 12 illustrates the perspective view of the example first cassette 112 shown in FIG. 10, void of the shuttle member 114 (not shown). FIG. 12 illustrates the cassette 112 may include one or more apertures 1200 arranged in a portion (e.g., a surface, a bottom surface, a floor, etc.) of the cassette 112. For example, the one or more apertures 1200 may be arranged in a portion (e.g., a surface, a bottom surface, a floor, etc.) of the cassette 112 proximate to the connector fastening station. The one or more apertures 1200 may provide access to a connector fastened to the connector fastening station. For example, the one or more apertures 1200 may provide access to a bottom portion of a connector fastened to the connector fastening station and/or an optical fiber termination connected to the connector.

Figure 13:
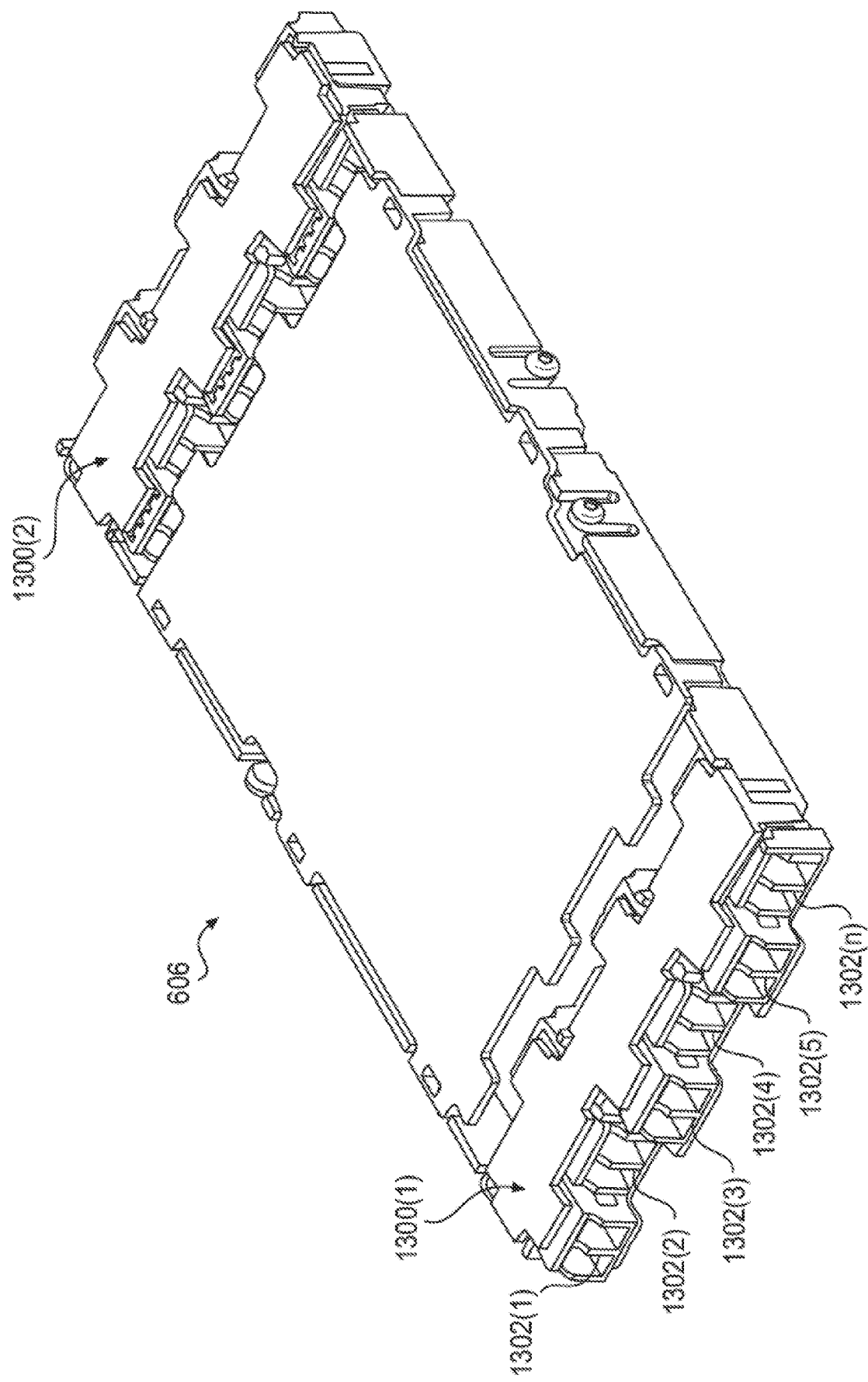
FIG. 13 illustrates a perspective view of an example second cassette.

FIG. 13 illustrates a perspective view of the example second cassette 604 shown in FIGS. 6 and 7. FIG. 13 illustrates a first connector fastening station 1300(1) arranged in a first end of the second cassette 604 and a second connector fastening station 1300(2) arranged in a second end, opposite the first end, of the second cassette 604.

FIG. 13 illustrates the connector fastening stations 1300(1) and 1300(2) fastens respective connectors 1302(1), 1302(2), 1302(3), 1302(4), 1302(5), and 1302(n) to a portion of the first and second ends of the second cassette in a staggered pattern. The staggered pattern of the respective connectors 1302(1) through 1302(n) may include a first connector (e.g., connector 1302(1)) and a second connector (e.g., connector 1302(3)) disposed in a first plane, and a third connector (e.g., connector 1302(2)) and a fourth connector (e.g., connector 1302(4)) disposed in a second plane, where the first plane is spaced a distance from the second plane. Each connector may be a commercial off-the-shelf (COTS) connector and the connector fastening station may provide for connecting each COTS connector to a portion of the first and second ends of the second cassette in a staggered pattern.

Figure 14:
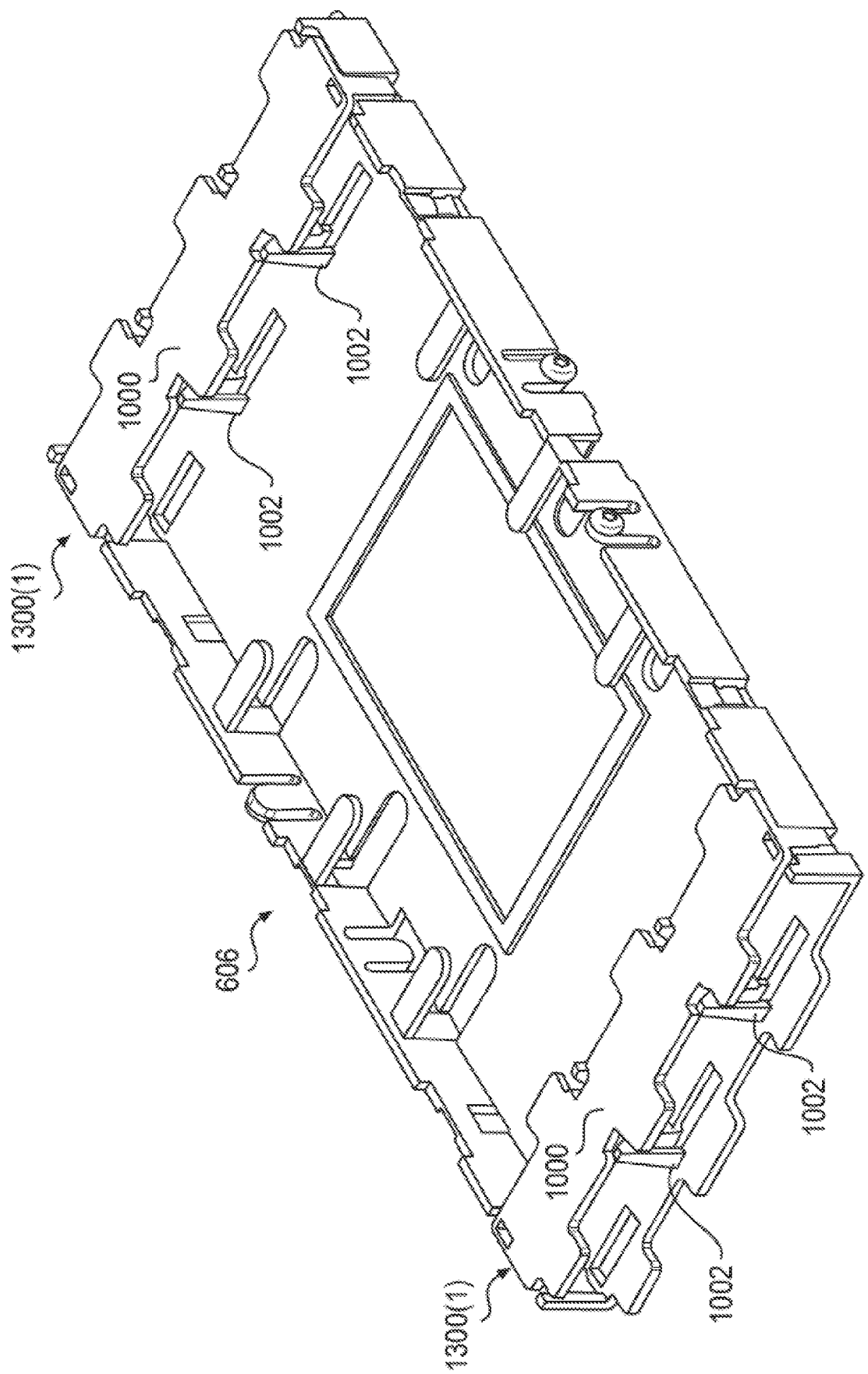
FIG. 14 illustrates the perspective view of the example second cassette shown in FIG. 13, void of connectors (not shown) fastened to the first and second connector fastening stations, and void of the cover (not shown) of the second cassette.

FIG. 14 illustrates the perspective view of the example second cassette 604 shown in FIG. 13, void of connectors 1302(1) through 1302(n) (not shown) fastened to the first and second connector fastening stations 1300(1) and 1300(2), and void of a cover (not shown) of the second cassette 604. Similar to the connector fastening station 206 of the first cassette 112, each of the connector fastening stations 1300(1) and 1300(2) may include a connector cover 1000 that fastens (e.g., snap-fits, press-fits, interference fits, etc.) with one or more fastening members 1002.

Figure 15:
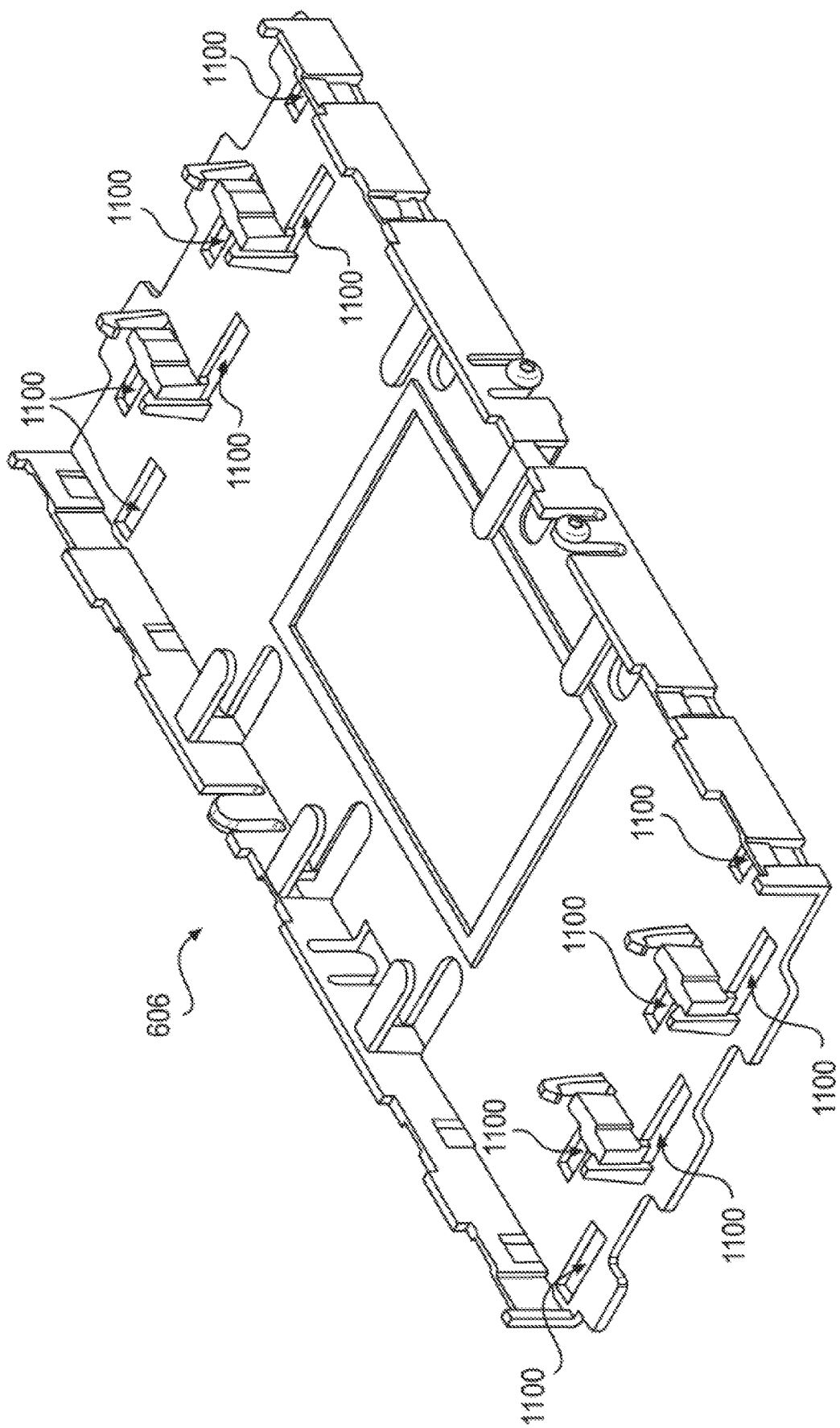
FIG. 15 illustrates the perspective view of the example second cassette shown in FIG. 14, void of the connector covers (not shown) of the first and second connector fastening stations.

FIG. 15 illustrates the perspective view of the example second cassette 604 shown in FIG. 14, void of the connector covers 1000 (not shown) of the first and second connector fastening stations 1300(1) and 1300(2). Similar to the connector fastening station 206 of the first cassette 112, each of the connector fastening stations 1300(1) and 1300(2) may include apertures 1100 arranged in the portion (e.g., surface, bottom surface, floor, etc.) of the second cassette 604. The apertures 1100 to receive a portion of each of the COTS connectors and connect each COTS connector to the portion of the second end of the cassette in the staggered pattern.

Figure 16:
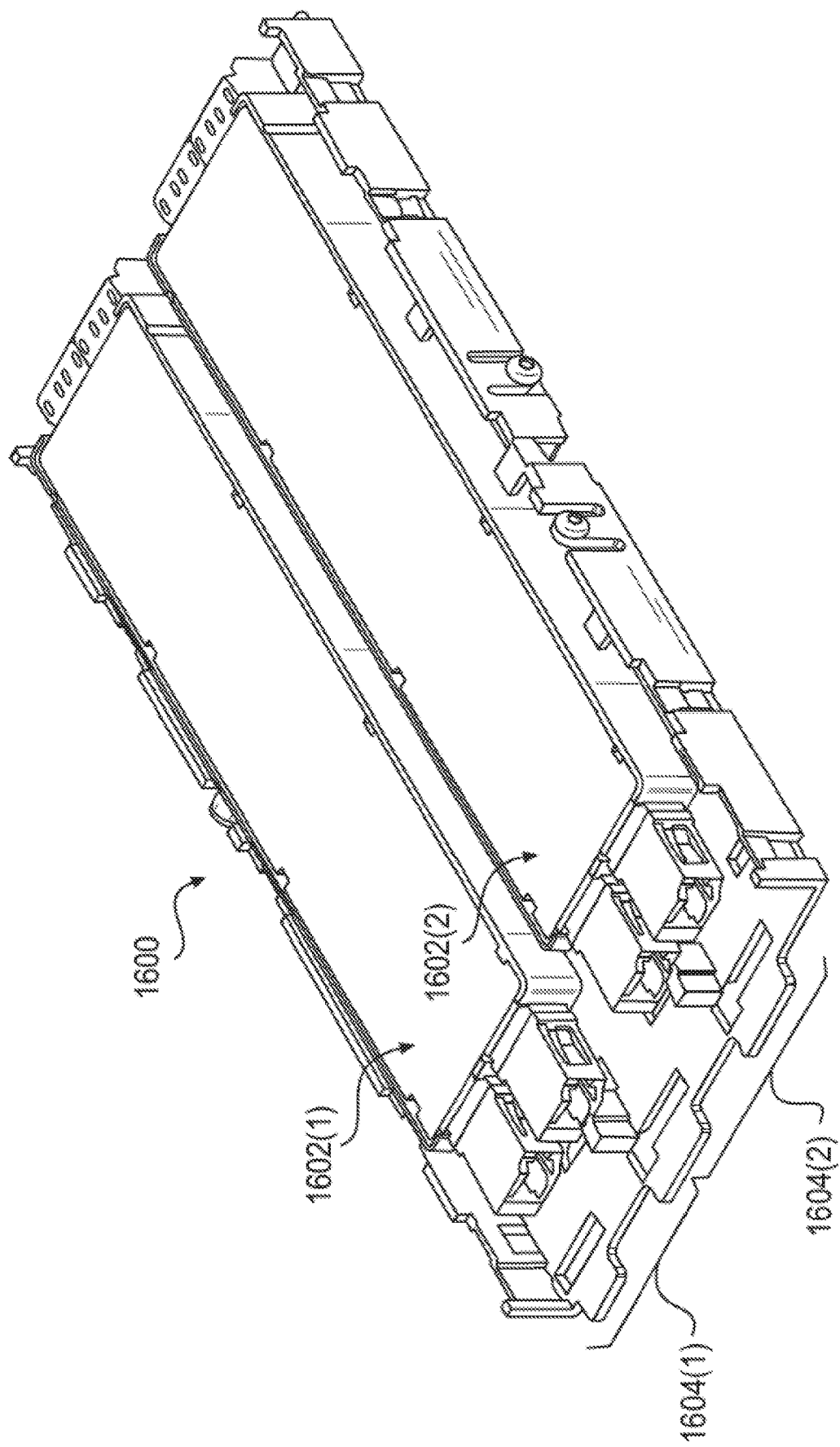
FIG. 16 illustrates a perspective view of an example third cassette.

FIG. 16 illustrates a perspective view of an example third cassette 1600. FIG. 16 illustrates connector modules 1602(1) and 1602(2) removeably received by first and second portions 1604(1) and 1604(2) of the third cassette 1600. While FIG. 16 illustrates connector module 1602(1) removeably received by first portion 1604(1) and connector module 1602(2) removeably received by second portion 1604(2), connector module 1602(1) may be removeably received by second portion 1604(2) and connector module 1602(2) may be removeably received by first portion 1604(1). The connector modules 1602(1) and 1602(2) may include monitor connectors arranged in a first end of the connector modules 1602(1) and 1602(2) and transmitter connectors arranged in second end of the connector modules 1602(1) and 1602(2). The connector modules 1602(1) and 1602(2) may provide for installing or removing fewer optical fibers than a number of optical fibers associated with an entire cassette. For example, the connector modules 1602(1) and 1602(2) may provide for installing or removing fewer optical fibers than 12 optical fibers associated with cassette 604. For example, each of the connector modules may provide for installing or removing at least about 1 optical fiber to at most about 6 optical fibers.

Figure 17:
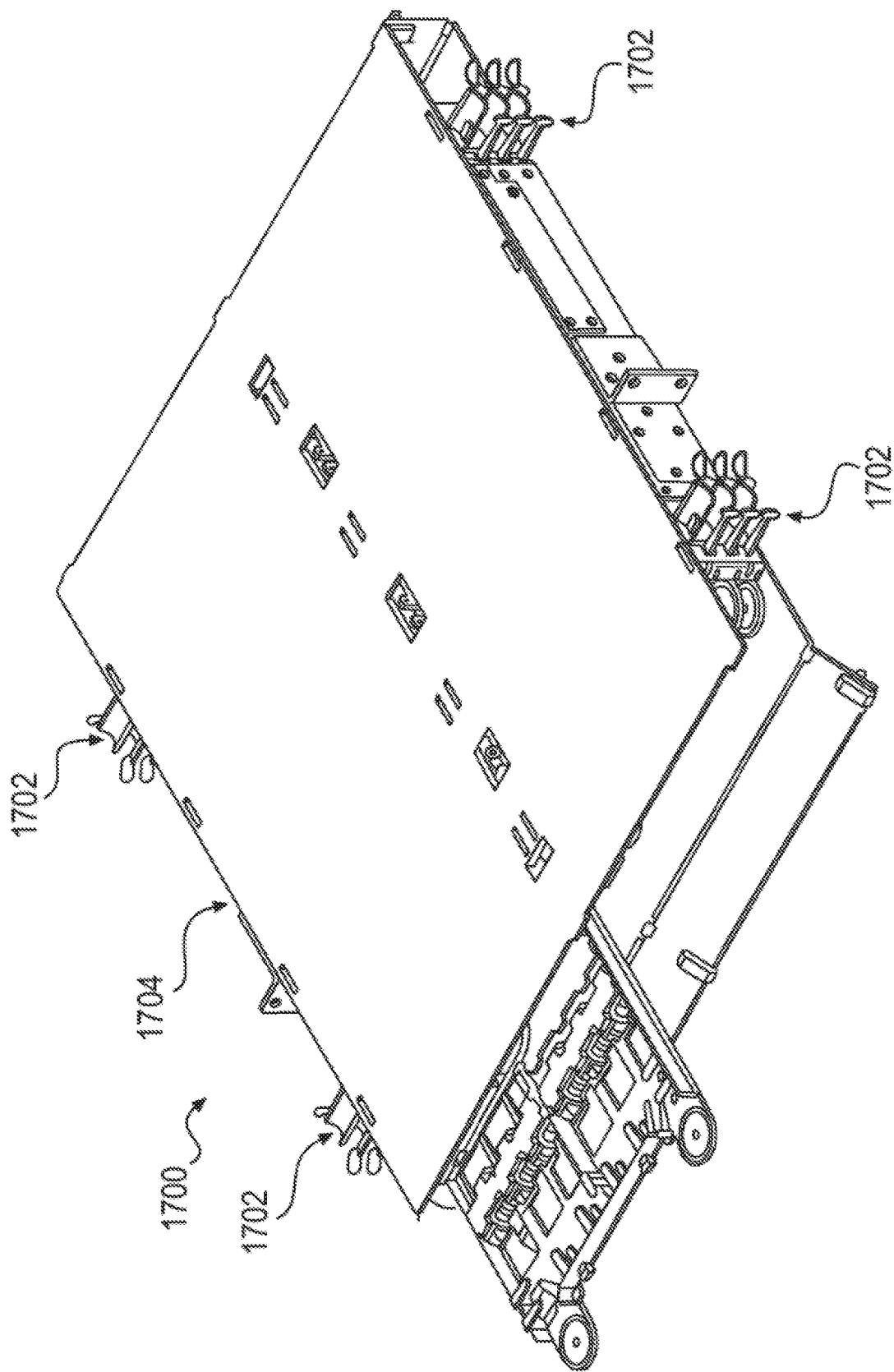
FIG. 17 illustrates an isometric view of another example data communication apparatus having braking members.

FIG. 17 illustrates an isometric view of another example data communication apparatus 1700. FIG. 17 illustrates braking members 1702 arrangeable adjacent to a first side or a second side of a chassis 1704. FIG. 17 illustrates chassis 1704 may be the same as chassis 102 illustrated in FIGS. 1-5. While FIG. 17 illustrates the braking members 1702 arrangeable adjacent to a first side or a second side of the chassis 1704, the braking members 1702 may be arrangeable adjacent to a portion of a frame, a chassis, a cable manager, a rack, a wall, etc.

When routing or lacing optical fiber in a tray or a chassis a service loop or slack in the optical fiber may be required to maintain good fiber management and fiber bend minimums. With the high density of optical fibers, the optical fibers are moved to a fiber cable manager where the collected optical fibers weigh more than a weight of the optical fibers associated with the tray or the service loop. The weight of the collected optical fibers may displace the optical fibers and reduce or eliminate the service loop or slack in the optical fibers, thus tightening the optical fibers associated with the tray or service loop, and preventing the tray from being displaced or damaging the optical fibers.

The braking member 1702 may include protrusions having offset points of contact. The offset points of contact of the protrusions forming a curvilinear route for the optical fibers. The protrusions for contacting a plurality of optical fibers arranged in the protrusions and preventing the plurality of optical fibers from being displaced, relative to the protrusions, up to a threshold amount of force applied to the optical fibers.

The braking member 1702 may be used in telecommunication systems to maintain the optical fiber bend radii while limiting the displacement of the optical fibers. The optical fibers may be routed or laced through the braking member 1702 touching at least about three offset points of contact that maintain the minimum bend radii. These three offset points of contact are offset a distance to cause drag as the optical fibers are pulled by the weight of the optical fibers. The drag prevents the service loop or slack of the optical fibers from being displaced to maintain the service loop or slack of the optical fibers. Further, if a force greater than a threshold amount of force is applied to the optical fibers, the optical fibers may be displaced through the braking member 1702 without damaging the optical fibers. The resistance or drag provided by the braking member 1702 may be adjusted by adjusting an interference caused by the three offset points of contact. For example, the protrusions of the braking member 1702 may be separated by a distance that provides for an interference fit of the optical fibers routed in contact with the three offset points of contact of at least about a diameter of one optical fiber. The interference may be adjusted based on a quantity of optical fibers received by the braking member 1702. Further, the resistance or drag provided by the braking member 1702 may be adjusted by adjusting a surface finish of the protrusions of the braking member 1702. For example, the resistance or drag may be adjusted by adjusting a coefficient of friction between the optical fibers and the protrusions of the braking member 1702.

The braking member 1702 may be used to manage optical fiber entering or exiting a tray (e.g., tray 104) instead of a flexible member (e.g., flexible member 118). Further, the braking member 1702 may be used to manage optical fiber entering or exiting a frame, a chassis, a cable manager, a rack, a wall, etc. In one example, the braking member 1702 may be configured to receive up to about 12 optical fibers. In another example, the braking member 1702 may be configured to receive up to about 24 optical fibers. In another example, the braking member 1702 may be configured to receive up to about 75 optical fibers. The braking member 1702 may be mounted to a side of a chassis at a location where the optical fiber enters the braking member 1702 at an upward angle and then exit the braking member 1702 at a downward angle. When a force is applied to the optical fibers at the downward angle, the force required to displace the optical fiber through the braking member 1702 may be more than a force that is applied to optical fibers exiting the braking member 1702 at a horizontal angle. The braking member 1702 may include one or more optical fiber management members (e.g., posts, ramps, gates, troughs, apertures, etc.) arranged with the protrusions, or other surfaces of the brake member, that provide for routing and/or containing the optical fiber with a minimum bend radius.

Figure 18:
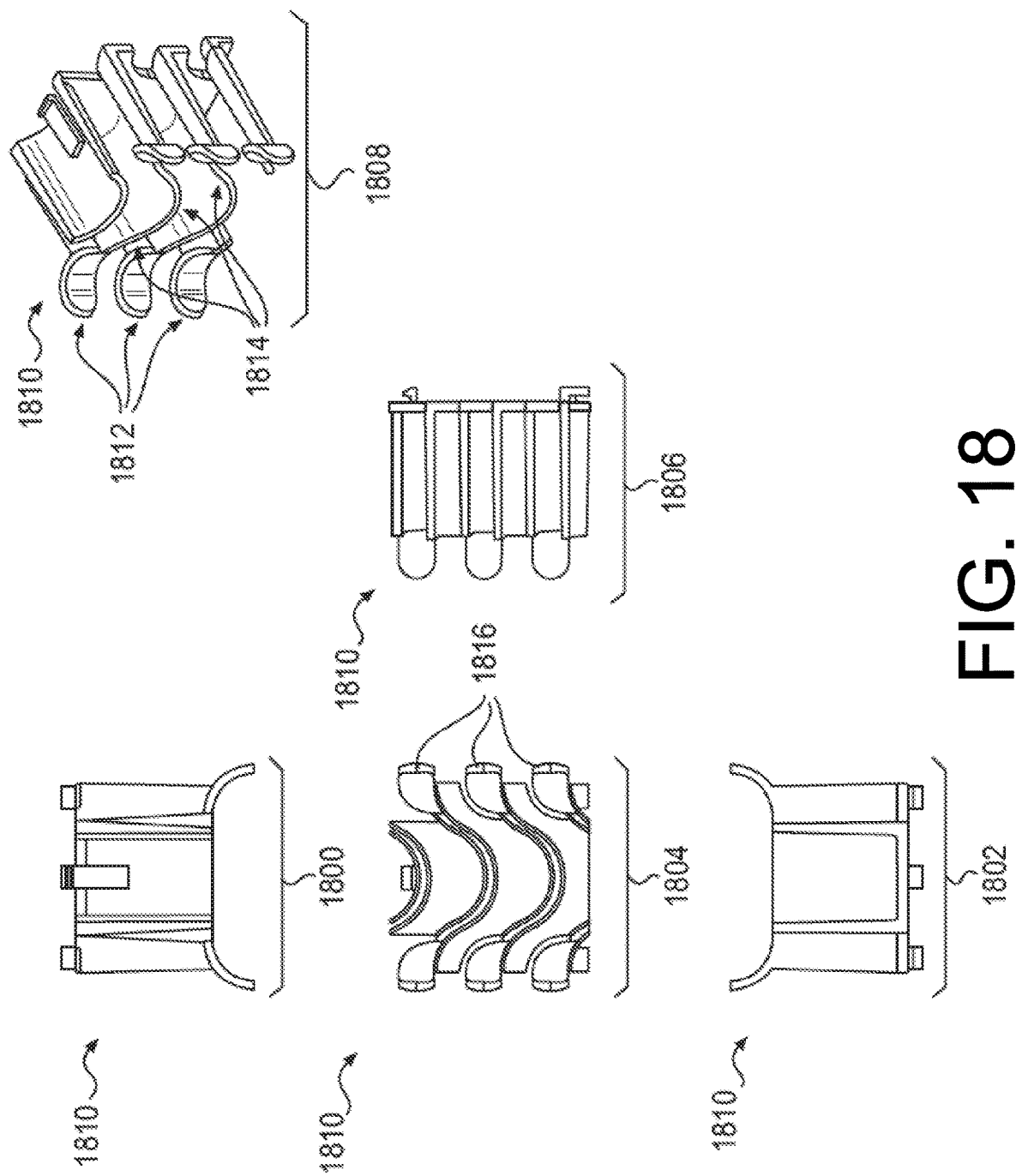
FIG. 18 illustrates a top view, a bottom view, a front view, a side view, and a perspective view of an example braking member.

FIG. 18 illustrates a top view 1800, a bottom view 1802, a front view 1804, a side view 1806, and a perspective view 1808 of an example braking member 1810. Braking member 1810 may be the same as braking member 1702. FIG. 18 illustrates the braking member 1810 may include protrusions 1812. The protrusions 1812 may have a substantially curvilinear cross-sectional profile. The protrusions 1812 may provide at least about three offset points of contact 1814 that maintain the minimum bend radii and cause drag as the optical fibers are pulled by the weight of the optical fibers. FIG. 18 illustrates the braking member 1810 may include one or more optical fiber management members 1816 arranged with the protrusions 1812 of the braking member 1810 that provide for routing and/or containing the optical fiber with a minimum bend radius. For example, optical fiber management members 1816 may be arranged on an end surface of each of the protrusions 1812 to provide for routing the optical fiber in and/or out of the protrusions 1812 with a minimum bend radius.

While FIG. 18 illustrates dimensions of the braking member 1810, these dimensions are example dimensions and different dimensions are contemplated. For example, the braking member 1810 may be a different size based on a quantity of optical fibers the braking member 1810 is to receive.

Figure 19:
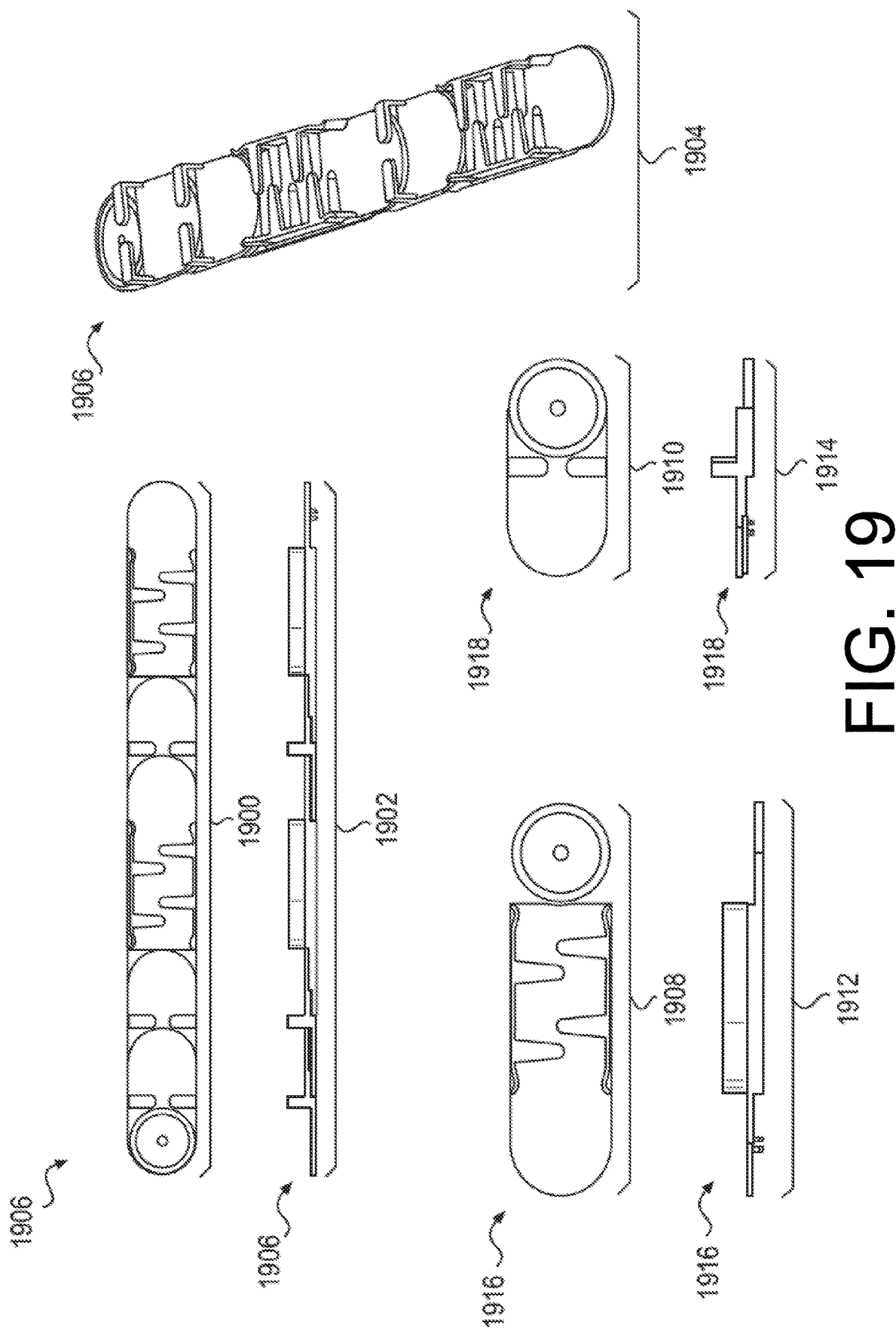
FIG. 19 illustrates a top view, side view and perspective view of an example link assembly, and top views and side views of respective example links of the example link assembly.

FIG. 19 illustrates a top view 1900, side view 1902 and perspective view 1904 of an example flexible member 1906, and top views 1908 and 1910 and side views 1912 and 1914 of respective example links 1916 and 1918 of the example flexible member 1906. The flexible member 1912 may be the same as the flexible member 118 illustrated in FIGS. 1-5.

FIG. 19 illustrates the link 1916 may have a longer length than a length of the link 1918. Further, the links 1916 and 1918 may be substantially rectilinear. Because the links 1916 and 1918 may be rectilinear, the flexible member 1906 may be coupled to a first end of a tray (e.g., tray 104) or a second end of the tray. Moreover, because the links 1916 and 1918 may be rectilinear, the flexible member 1906 may be coupled to a left side or a right side of the first end of the tray or a left side or a right side of the second end of the tray. Because the flexible member 1906 may be coupled to a left side or a right side of a first end of a tray or a left side or a right side of a second end of a tray, a user may quickly and easily arrange trays in either a left side or the right side of a chassis (e.g., chassis 102. Because a user may quickly and easily arrange trays in a chassis, a user may quickly and easily configure a data communication apparatus (e.g., data communication apparatus 100).

FIG. 19 illustrates the link 1916 may pivotably couple with the link 1918. For example, the link 1916 may pivotably couple with the link 1918 via a snap-fit, press-fit, interference fit. For example, the link 1916 may include a snap-fit member, press-fit member, interference fit member arranged on opposite ends of the link 1916, and the link 1918 may include a cooperating snap-fit member, press-fit member, interference fit member arranged on opposite ends of the link 1918 that pivotably couple with the snap-fit member, press-fit member, interference fit member arranged on opposite ends of the link 1916. The snap-fit, press-fit, interference fit members and the cooperating snap-fit, press-fit, interference fit members may include guides, grooves, rails, channels, etc. arranged in a surface of the members to provide for rotatably guiding the links 1916 and 1918 when the links 1916 and 1918 are pivotably rotated relative to each other. The links 1916 and 1918 may include one or more optical fiber management members that provide for routing and/or containing the optical fiber with a minimum bend radius. For example, optical fiber management members may be arranged on surfaces of each of the links 1916 and 1918 to provide for containing the optical fiber in flexible member 1906 with a minimum bend radius when a tray (e.g., tray 104) is slideably displaced.

While FIG. 19 illustrates dimensions of the links 1916 and 1918, these dimensions are example dimensions and different dimensions are contemplated. For example, the links 1916 and 1918 may have different sizes based on a quantity of optical fibers the flexible member 1906 is to receive.

Figure 20:
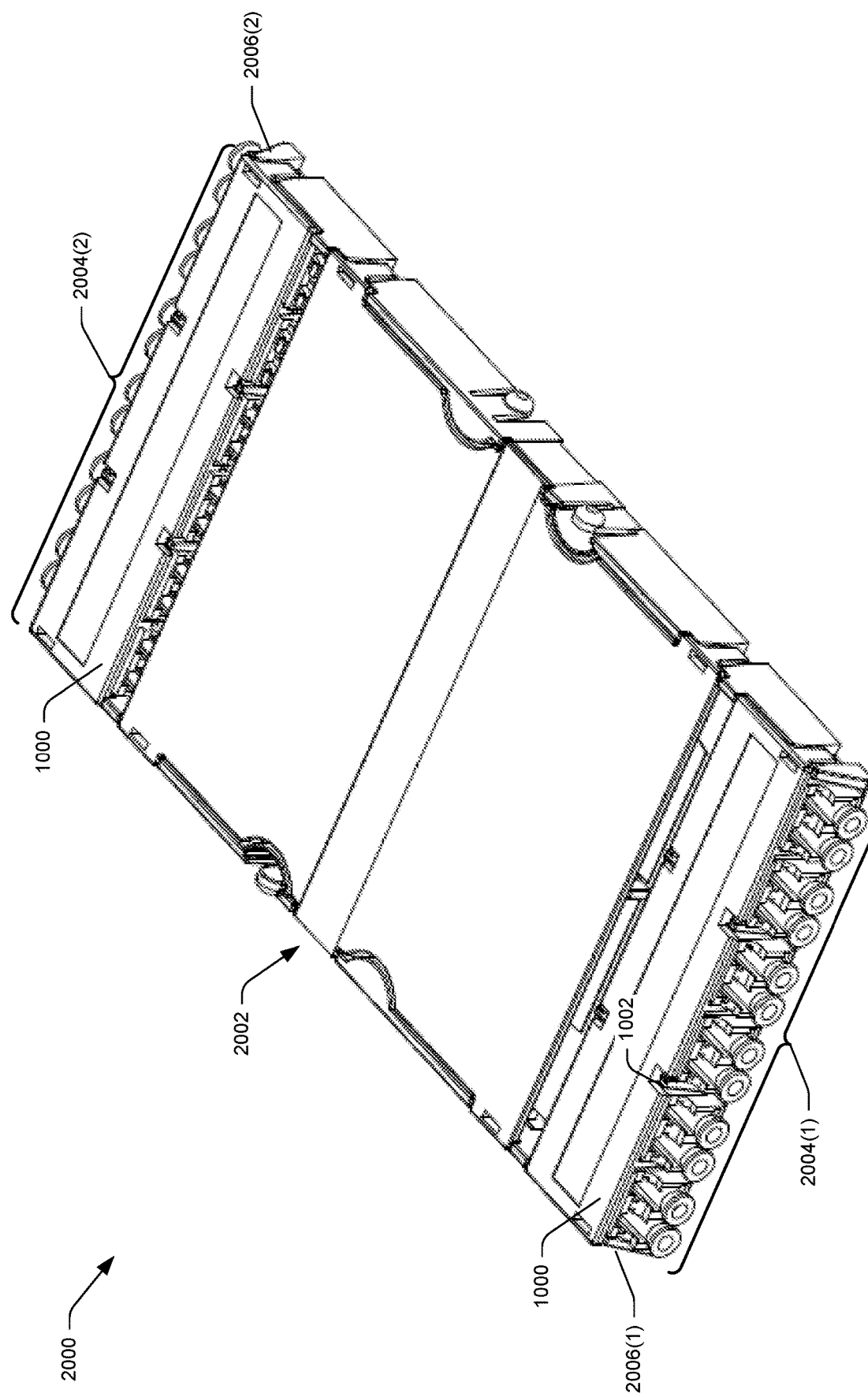
FIG. 20 illustrates a perspective view of another example cassette.
Figure 21:
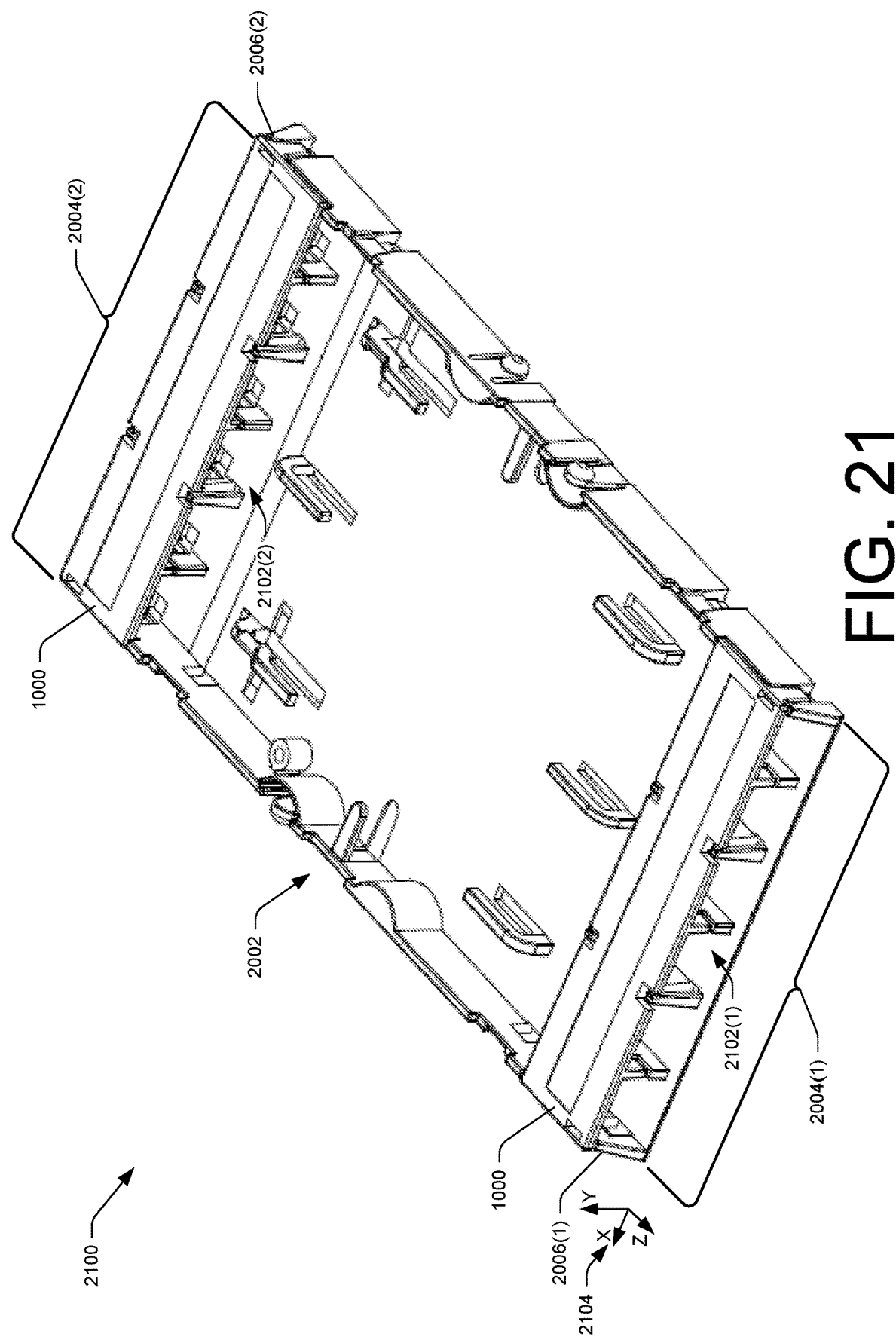
FIG. 21 illustrates the perspective view of the example cassette shown in FIG. 20, void of connectors (not shown) fastened to the first and second connector fastening stations, and void of the cover (not shown) of the cassette.
Figure 22:
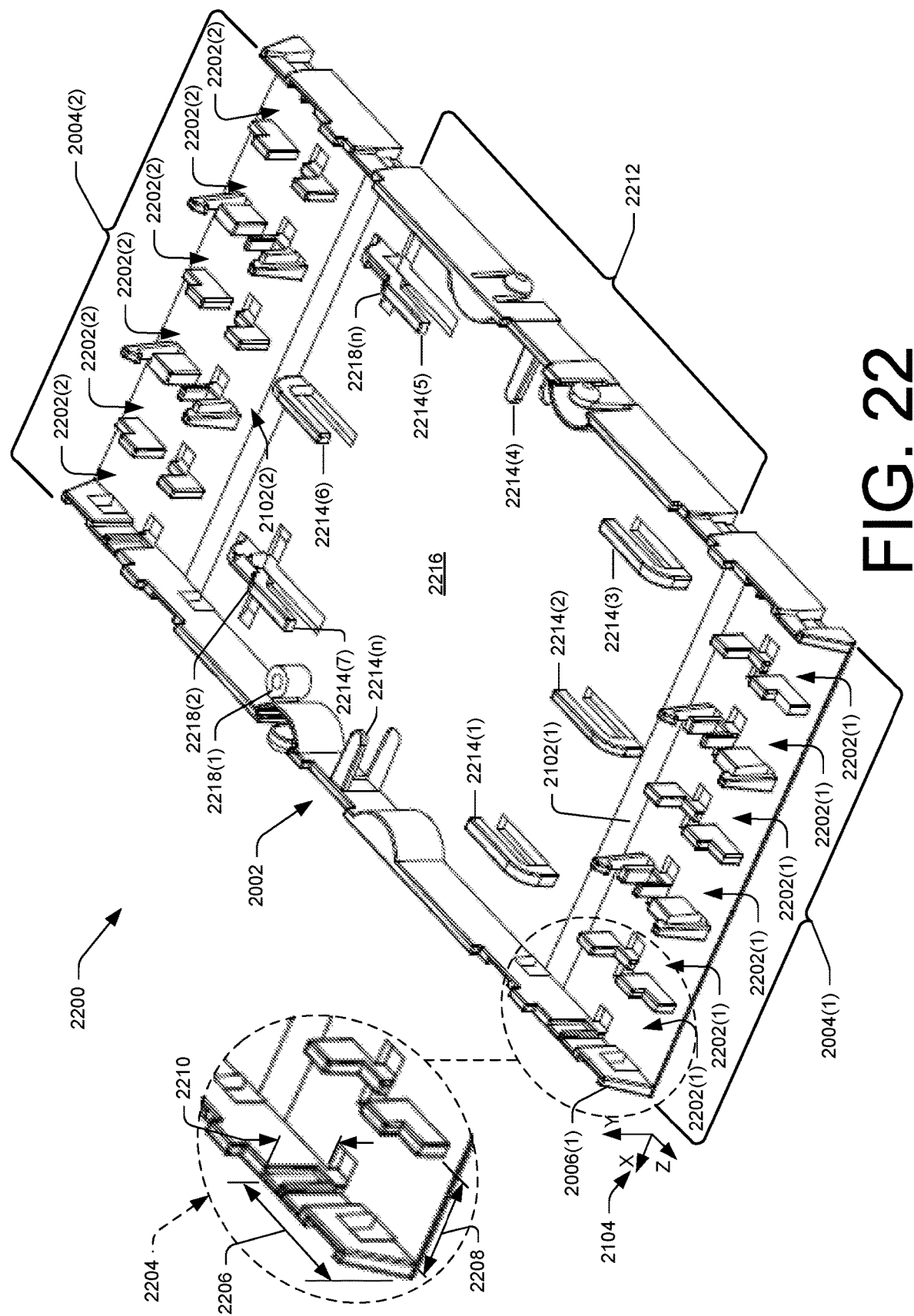
FIG. 22 illustrates the perspective view of the example cassette shown in FIG. 20, void of the cover (not shown) of the cassette and void of the connector covers (not shown) of the first and second connector fastening stations.

FIGS. 20, 21, and 22 illustrate a perspective view 2000 of another embodiment of a cassette 2002. FIGS. 20, 21, and 22 illustrate the cassette 2002 may have a first connector fastening station 2004(1) arranged in a first end 2006(1) of the cassette 2002 and a second connector fastening station 2004(2) arranged in a second end 2006(2), opposite the first end 2006(1), of the cassette 2002. Inasmuch as FIGS. 20, 21, and 22 depict different connector fastening stations, while referring to the same elements and features of the cassette 2002, the following discussion of specific features may refer interchangeably to any of FIGS. 13, 14, and 15 except where explicitly indicated. In particular, FIGS. 20, 21, and 22 illustrate an embodiment of the cassette 2002, including connector covers 1000. The cassette 2002 may include fastening members that fasten (e.g., snap-fits, press-fits, interference fits, etc.) with the connector covers 1000, connectors, adapters, plugs, or strain relief units. The fastening members may be the same as the one or more fastening members 1002.

FIG. 21 illustrates the perspective view 2100 of the cassette 2002 shown in FIG. 20, void of connectors (not shown) fastened to the first and second connector fastening stations 2004(1) and 2004(2), and void of the cover (not shown) of the cassette 2002. As depicted in FIG. 21, in some instances, the first end 2006(1) may have a first geometry 2102(1) symmetrical, about at least one axis 2104, to a second geometry 2102(2) of the second end 2006(2). For example, the first geometry 2102(1) may have a shape and relative arrangement of fastening features, structures, members, receptacles, etc. that are substantially the same as a shape and relative arrangement of fastening features, structures, members, receptacles, etc. of the second geometry 2102(2). Further, the shapes and relative arrangements of fastening features, structures, members, receptacles, etc. of both of the first geometry 2102(1) and the second geometry 2102(2) may be symmetrically arranged, about an X-axis, a Y-axis, and/or a Z-axis of the cassette 2002. For example, the first geometry 2102(1) may have a length, a width, a height, and a plurality of receptacles that are substantially the same as a length, a width, a height and a plurality of receptacles of the second geometry 2102(2) that may be symmetrically arranged about an X-axis, a Y-axis, and/or a Z-axis of the cassette 2002.

FIG. 22 illustrates the perspective view 2200 of the cassette 2002 shown in FIG. 20, void of the connector covers (not shown) of the first and second connector fastening stations 2004(1) and 2004(2). FIG. 22 depicts the first connector fastening station 2004(1) arranged in the first end 2006(1) of the cassette 2002 may include a first plurality of receptacles 2202(1). Each of the receptacles 2202(1) may be a respective cassette end interface position. For example, the cassette 2002 may have about six (or more or less) interface positions and each receptacle of the receptacles 2202(1) may be a respective one of the six interface positions.

Each of the receptacles 2202(1) may be designed to hold any one of a plurality of types of components that may provide for changing a functionality of the cassette 2002. For example, one or more of the first plurality of receptacles 2202(1) may be configured to fasten at least one of a first connector, a first adapter, a first plug, or a first strain relief unit. For example, one or more of the first plurality of receptacles 2202(1) may be configured to fasten, contain, hold, fix, etc. a connector, an adapter, a plug, or a strain relief unit to a portion of the first end 2006(1) of the cassette 2002. The connector may be an optical fiber connector used to join optical fibers where a connect/disconnect capability may be needed. The optical fiber connector may be a commercial off-the-shelf (COTS) connector (e.g., connector 502, connectors 902(1)-902(n), or connectors 1302(1)-1302(n)). For example, the optical fiber connector may be an LC connector (e.g., a Lucent Connector), or an SC connector (e.g., a Standard Connector or a Subscriber Connector). The connector may be inserted in any one of the receptacles 2202(1). The adapter may be an MPO adapter (e.g., a Multi-fiber Push On adapter). The adapter may be inserted in any one of the receptacles 2202(1). The plug may be a hole plug that may be inserted in any one of the receptacles 2202(1) when the receptacles 2202(1) are not utilized. For example, the plug may be a hole plug that may be inserted in any cassette end interface position when the cassette end interface positions are not being utilized. The strain relief unit may provide for managing fiber exiting or entering the cassette 2002. For example, the strain relief unit may provide for managing a multi-fiber cable exiting or entering the cassette 2002. The strain relief unit may be inserted in any two of the receptacles 2202(1). Because each of the receptacles 2202(1) may have the capability to hold any one of a plurality of types of components, this may provide a flexibility to configure the same cassette for multiple applications (e.g., combinable patch and/or splice cassette, MPO to LC Breakout cassette, Pre-terminated LC or SC cassette, configurable splitter cassette, etc.).

FIG. 22 depicts the second connector fastening station 2004(2) arranged in the second end 2006(2) of the cassette 2002 may include a second plurality of receptacles 2202(2). Similar to the receptacles 2202(1), each of the receptacles 2202(2) may be a respective cassette end interface position. For example, the cassette 2002 may have about six interface positions and each receptacle of the receptacles 2202(2) may be a respective one of the six interface positions.

Similar to the receptacles 2202(1), each of the receptacles 2202(2) may be designed to hold any one of a plurality of types of components that may provide for changing a functionality of the cassette 2002. For example, one or more of the second plurality of receptacles 2202(2) may be configured to fasten at least one of a second connector, a second adapter, a second plug, or a second strain relief unit. For example, one or more of the second plurality of receptacles 2202(2) may be configured to fasten, contain, hold, fix, etc. a connector, an adapter, a plug, or a strain relief unit to a portion of the second end 2006(2) of the cassette 2002.

As discussed above, the connector may be an optical fiber connector used to join optical fibers where a connect/disconnect capability may be needed. The optical fiber connector may be a commercial off-the-shelf (COTS) connector (e.g., connector 502, connectors 902(1)-902(n), or connectors 1302(1)-1302(n)). For example, the optical fiber connector may be an LC connector (e.g., a Lucent Connector), or an SC connector (e.g., a Standard Connector or a Subscriber Connector). The connector may be inserted in any one of the receptacles 2202(1). The adapter may be an MPO adapter (e.g., a Multi-fiber Push On adapter). The adapter may be inserted in any one of the receptacles 2202(1). The plug may be a hole plug that may be inserted in any one of the receptacles 2202(1) when the receptacles 2202(1) are not utilized. For example, the plug may be a hole plug that may be inserted in any cassette end interface position when the cassette end interface positions are not being utilized. The strain relief unit may provide for managing fiber exiting or entering the cassette 2002. For example, the strain relief unit may provide for managing a multi-fiber cable exiting or entering the cassette 2002. The strain relief unit may be inserted in any two of the receptacles 2202(2). Because each of the receptacles 2202(2) may have the capability to hold any one of a plurality of types of components, this may provide a flexibility to configure the same cassette for multiple applications (e.g., combined patch and splice cassette, MPO to LC Breakout cassette, Pre-terminated LC or SC cassette, configurable splitter cassette, etc.).

Further, the first plurality of receptacles 2202(1) of the first connector fastening station 2004(1) may be symmetrical, about the at least one axis 2104, to the second plurality of receptacles 2202(2) of the second connector fastening station 2004(2). For example, the first plurality of receptacles 2202(1) may have a shape and relative arrangement that are substantially the same as a shape and relative arrangement of the second plurality of receptacles 2202(2), and the shapes and relative arrangements of both of the first plurality of receptacles 2202(1) and the second plurality of receptacles 2202(2) may be symmetrically arranged, about an X-axis, a Y-axis, and/or a Z-axis of the cassette 2002. For example, each of the first plurality of receptacles 2202(1) may have a length, a width, and/or a height that may be substantially the same as a length, a width, and/or a height of the second plurality of receptacles 2202(2) that may be symmetrically arranged, about an X-axis, a Y-axis, and/or a Z-axis of the cassette 2002. For example, detail view 2204 illustrates the first plurality of receptacles 2202(1) may have a length 2206, a width 2208, and a height 2210 that may be substantially the same as a length, a width, and/or a height of the second plurality of receptacles 2202(2). In this example, the length 2206 of the first plurality of receptacles 2202(1) may be symmetrical, about the Z-axis of the cassette 2002, to the length of the second plurality of receptacles 2202(2). The width 2208 of the first plurality of receptacles 2202(1) may be symmetrical, about the X-axis of the cassette 2002, to the width of the second plurality of receptacles 2202(2). And, the height 2210 of the first plurality of receptacles 2202(1) may be symmetrical, about the Y-axis of the cassette 2002, to the height of the second plurality of receptacles 2202(2).

FIG. 22 depicts the cassette 2002 may include a fiber service loop bay 2212 for managing a plurality of fibers (not shown) received by the cassette 2002. The fiber service loop bay 2212 may be arranged between the first connector fastening station 2004(1) and the second connector fastening station 2004(2). FIG. 22 illustrates the fiber service loop bay 2212 may include a plurality of projections 2214(1), 2214(2), 2214(3), 2214(4), 2214(5), 2214(6), 2214(7), and 2214(n) arranged above a bottom surface 2216 of the cassette 2002 for storing and protecting the plurality of fibers. For example, the plurality of projections 2214(1)-2214(n) may store and protect the plurality of fibers between the plurality of projections 2214(1)-2214(n) and the bottom surface 2216 when the fibers are coiled in loops in the fiber service loop bay 2212. Further, the plurality of projections 2214(1)-2214(n) may be arranged in the fiber service loop bay 2212 to provide for maintaining a bend radius of the plurality of fibers received by the plurality of projections 2214(1)-2214(n).

FIG. 22 illustrates the cassette 2002 may also include fastening mechanisms 2218(1), 2218(2) and 2218(n) for securing at least a portion of the plurality of fibers received by the cassette 2002 that includes a feature for separating the incoming cable from the service loop. In one example, at least one of the fastening mechanisms 2218(1), 2218(2), or 2218(n) may be a tie down, and the portion of the plurality of fibers may be a jacket of the plurality of fibers received by the cassette 2002. For example, fastening mechanisms 2218(2) and 2218(n) may be a protrusion, a knob, a boss, etc. arranged with projections 2214(5) and 2214(7), respectively, that may provide for a fastener (e.g., a cable tie, a band, a rubber band, a bungie, a clip, etc.) to tie, anchor, fix, etc. a jacket of the plurality of fibers to the protrusion, the knob, the boss, etc.

In another example, at least one of the fastening mechanisms 2218(1), 2218(2), or 2218(n) may be a tie down, and the portion of the plurality of fibers may be an aramid yarn acting as a strength member for the plurality of fibers received by the cassette 2002. For example, fastening mechanism 2218(1) may be a threaded fastener, a snap-fit fastener, a press-fit fastener, etc., arranged in the fiber service loop bay 2212, that may provide for a cooperating threaded fastener, cooperating snap-fit fastener, cooperating press-fit fastener, etc. to tie, anchor, fix, etc. the aramid yarn, acting as the strength member for the plurality of fibers, to the threaded fastener, the snap-fit fastener, the press fit-fastener, etc., arranged in the fiber service loop bay 2212.

Figure 23:
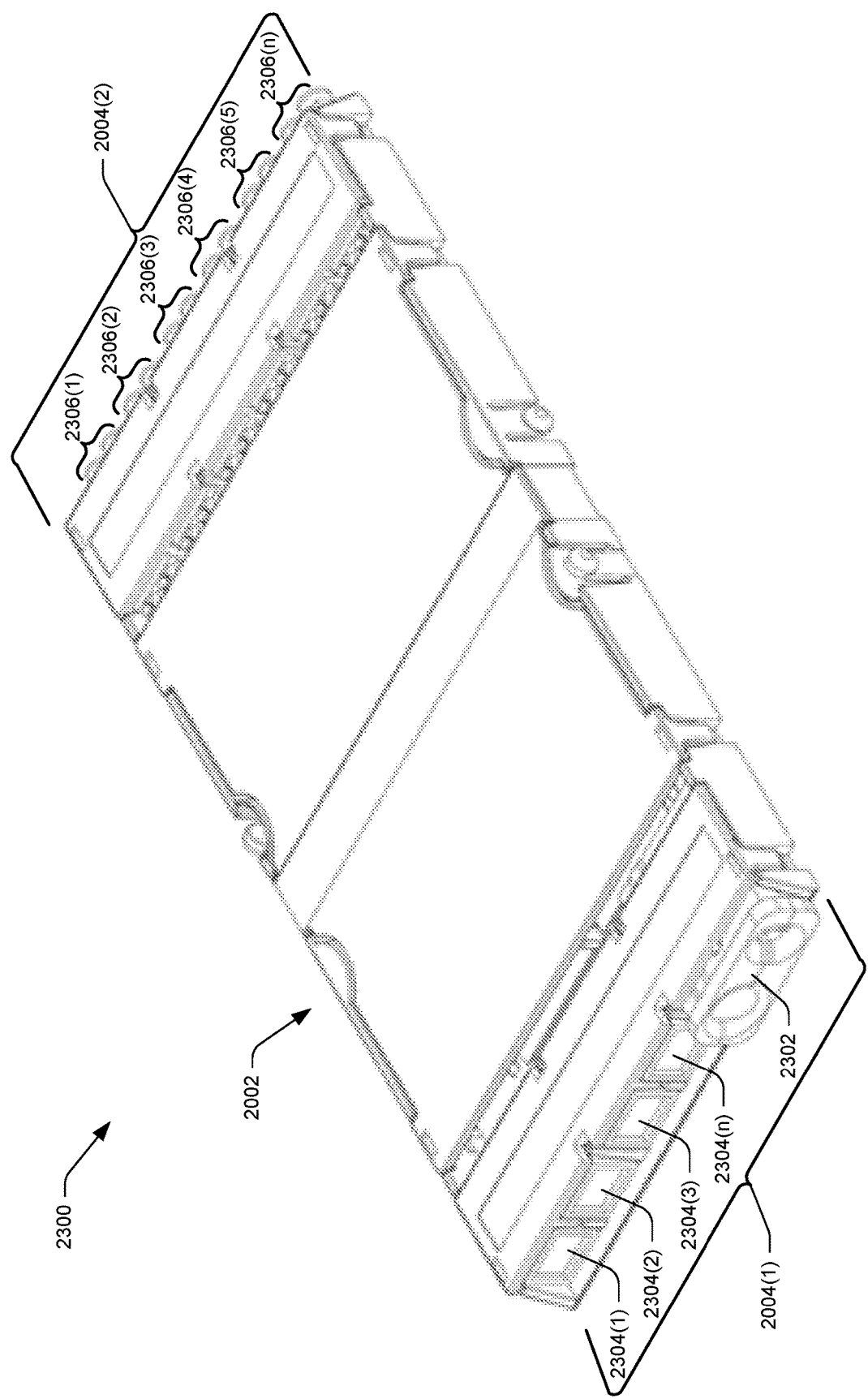
FIG. 23 illustrates a perspective view of the example cassette shown in FIG. 20, configured with a strain relief and connectors (e.g., LC connectors and/or SC connectors splice configuration, or LC connectors and/or SC connectors pre-terminated configuration).

FIG. 23 illustrates a perspective view 2300 of the cassette 2002 shown in FIG. 20, configured with a strain relief unit 2302, a plurality of hole plugs 2304(1), 2304(2), 2304(3), and 2304(n), and a plurality of connectors 2306(1), 2306(2), 2306(3), 2306(4), 2306(5), and 2306(n). For example, the cassette 2002 may be configured as a splice cassette that includes the strain relief unit 2302, the plurality of hole plugs 2304(1)-2304(n), and a plurality of duplex LC connectors and/or a plurality of SC connectors. In another example, the cassette 2002 may be configured as a pre-terminated cassette that includes the strain relief unit 2302, the plurality of hole plugs 2304(1)-2304(n), and the plurality of duplex LC connectors and/or plurality of SC connectors.

Figure 24:
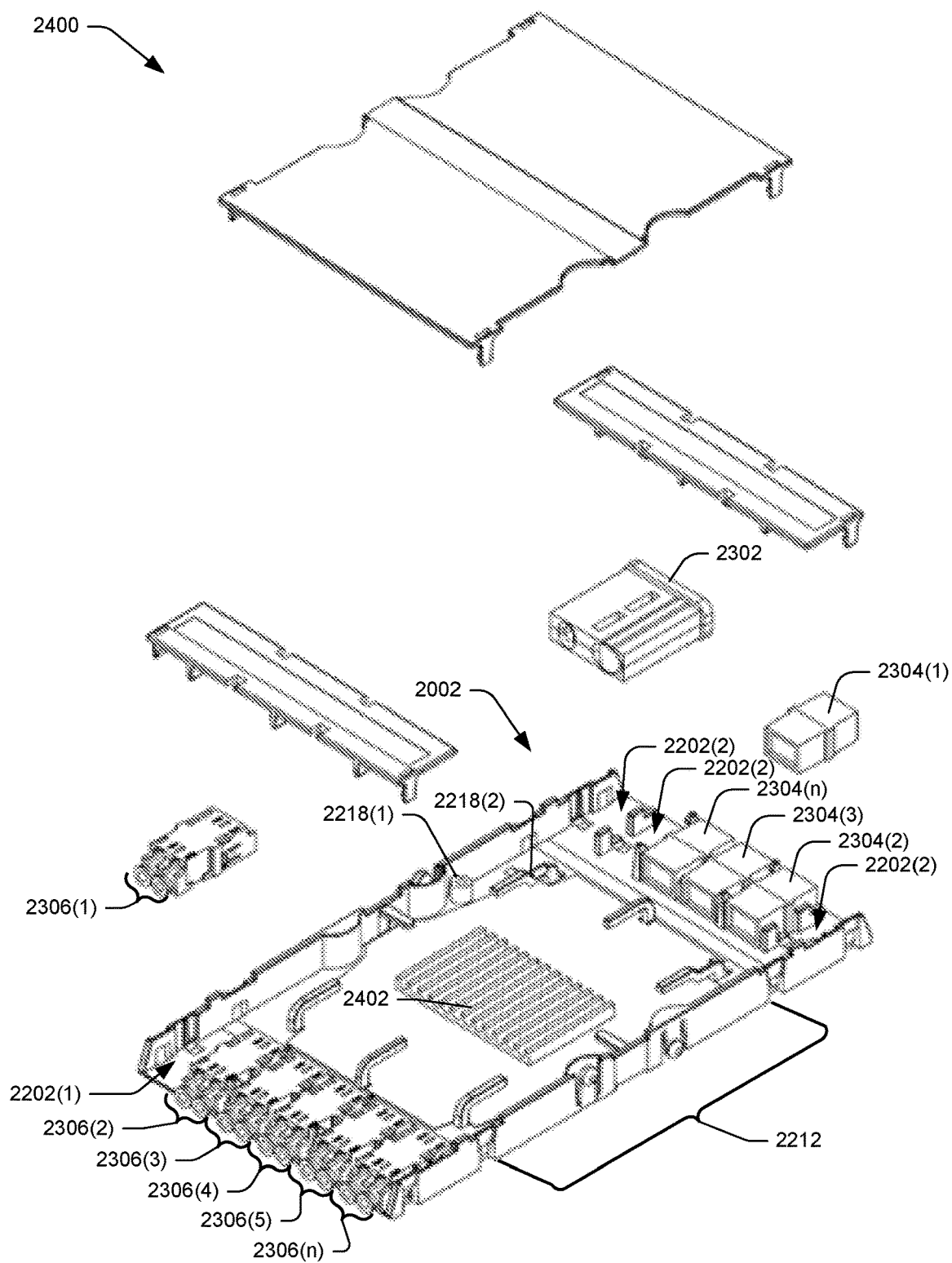
FIG. 24 illustrates an exploded view of the example cassette configured with the strain relief and the connectors shown in FIG. 23.

FIG. 24 illustrates an exploded view 2400 of the cassette 2002 configured with the strain relief unit 2302, the plurality of hole plugs 2304(1)-2304(n), and the plurality of connectors 2306(1)-2306(n) shown in FIG. 23. FIG. 24 illustrates the first plurality of receptacles 2202(1) may fasten the plurality of connectors 2306(1)-2306(n) in the cassette 2002 and the second plurality of receptacles 2202(2) may fasten the strain relief unit 2302 and the plurality of hole plugs 2304(1)-2304(n) in the cassette 2002.

FIG. 24 illustrates the fiber service loop bay 2212 may further include at least one retaining mechanism 2402 for holding a splice of at least one fiber of the plurality of fibers. For example, when the cassette 2002 is configured as a splice cassette that includes the strain relief unit 2302, the plurality of hole plugs 2304(1)-2304(n), and a plurality of LC connectors and/or a plurality of SC connectors, the retaining mechanism 2402 may be fixed to the bottom surface of the cassette 2002 and in the fiber service loop bay 2212 to hold a splice of at least one fiber of the plurality of fibers. When the cassette 2002 is configured as a pre-terminated cassette that includes the strain relief unit 2302, the plurality of hole plugs 2304(1)-2304(n), and a plurality of LC connectors and/or a plurality of SC connectors, the fiber service loop bay 2212 may not include the retaining mechanism 2402 and may be void of the retaining mechanism 2402 for holding a splice of at least one fiber of the plurality of fibers because the pre-terminated configuration may be void of a splice.

FIG. 24 illustrates the fastening mechanism 2218(1) may provide for fastening an aramid yarn acting as a strength member for the plurality of fibers received by the strain relief unit 2302, and fastening mechanism 2218(2) may provide for fastening a jacket of a plurality of fibers received by the strain relief unit 2302.

Figure 25:
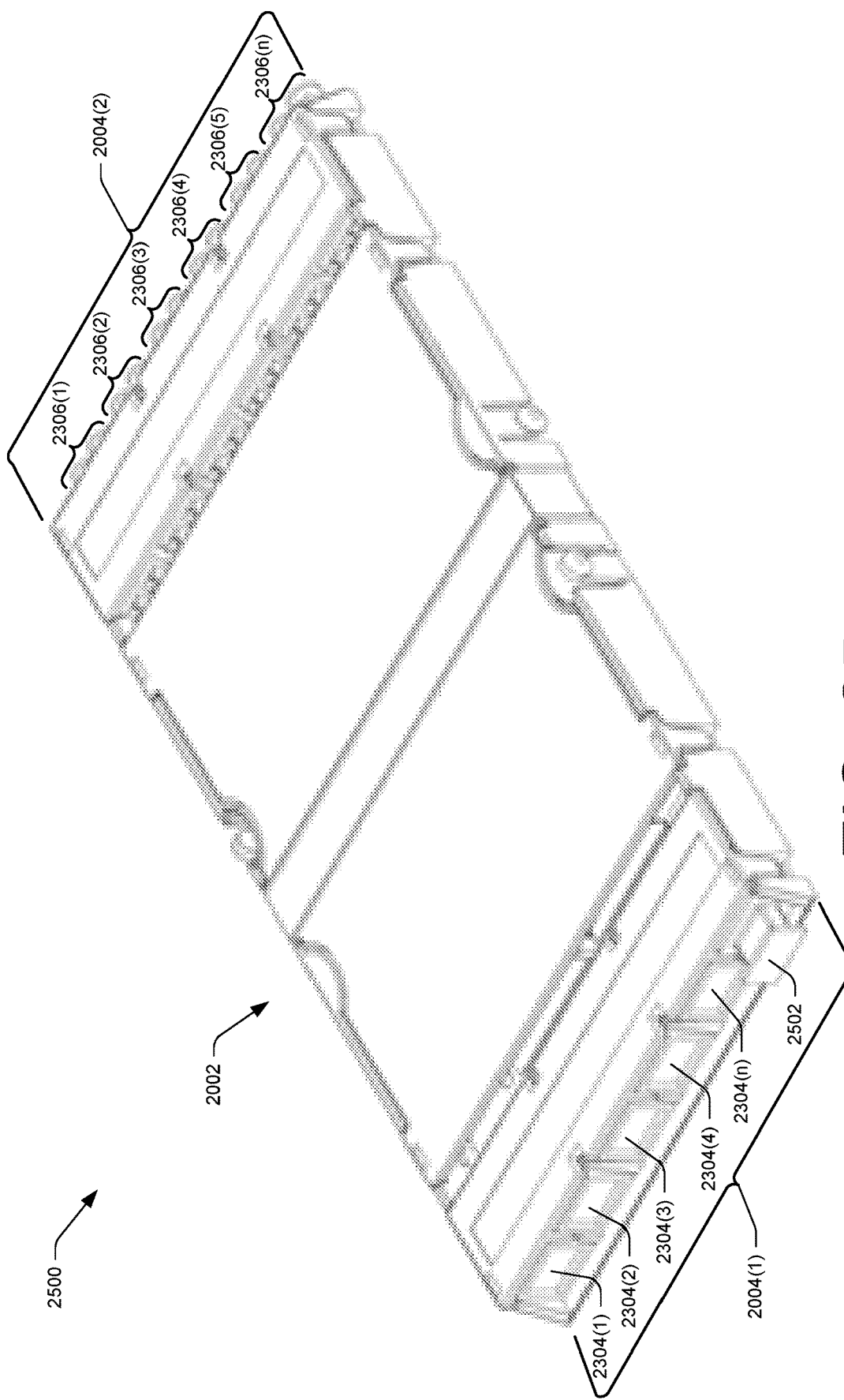
FIG. 25 illustrates a perspective view of the example cassette shown in FIG. 20, configured with an adapter and connectors (e.g., an MPO adapter to LC connectors configuration).

FIG. 25 illustrates a perspective view 2500 of the cassette 2002 shown in FIG. 20, configured with an adapter 2502, the one or more hole plugs 2304(1)-2304(n), and the first plurality of connectors 2306(1)-2306(n). For example, the cassette 2002 may be configured as an MPO adapter to LC connector cassette that includes an MPO adapter, the one or more plugs 2304(1)-2304(n), and the first plurality of connectors 2306(1)-2306(n).

Figure 26:
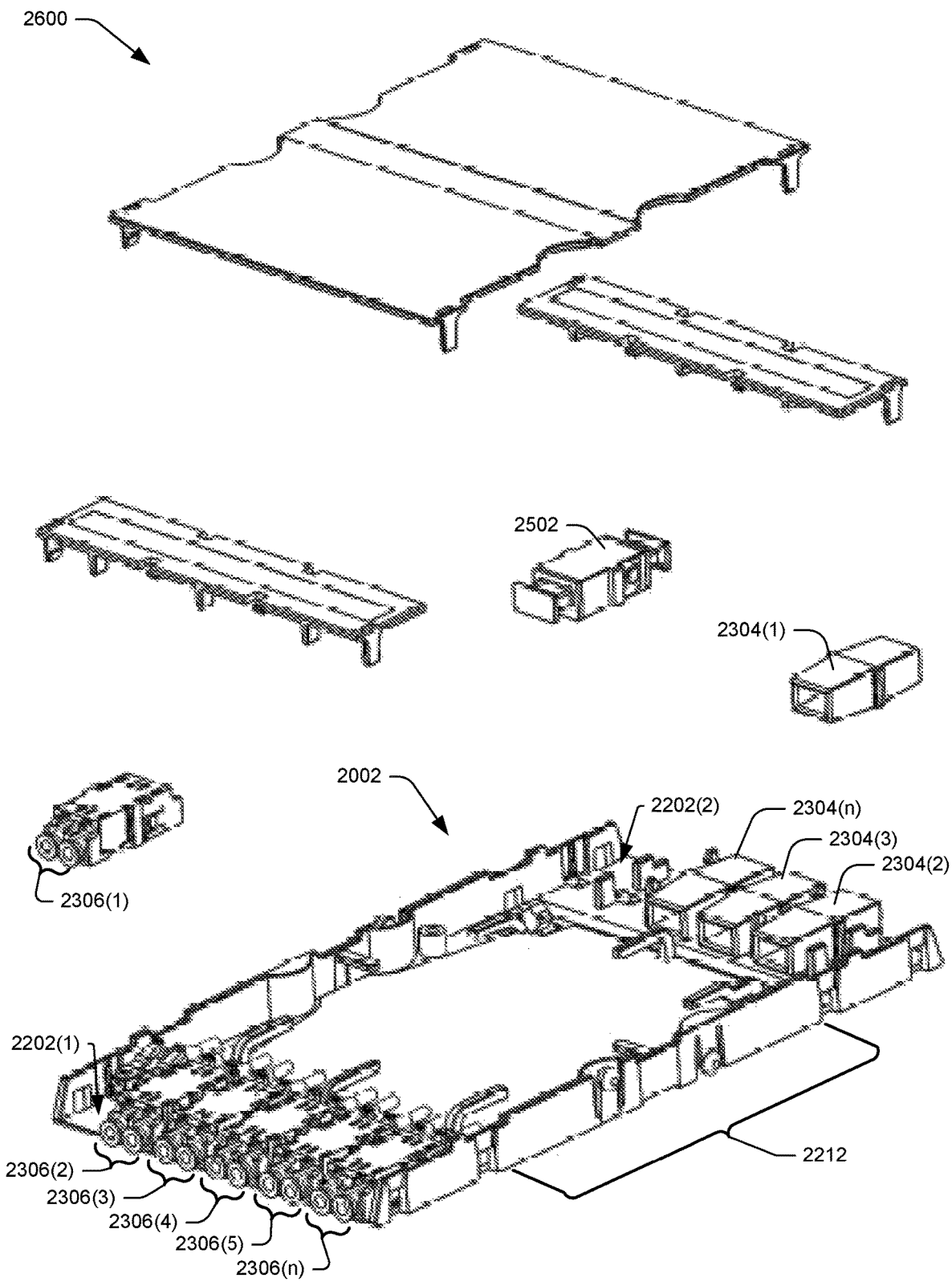
FIG. 26 illustrates an exploded view of the example cassette configured with the adapter and the connectors shown in FIG. 25.

FIG. 26 illustrates an exploded view 2600 of the cassette 2002 configured with the adapter 2502, the plurality of hole plugs 2304(1)-2304(n), and the plurality of connectors 2306(1)-2306(n) shown in FIG. 25. FIG. 26 illustrates the first plurality of receptacles 2202(1) may fasten the plurality of connectors 2306(1)-2306(n) in the cassette 2002 and the second plurality of receptacles 2202(2) may fasten the adapter 2502 and the plurality of hole plugs 2304(1)-2304(n) in the cassette 2002.

Figure 27:
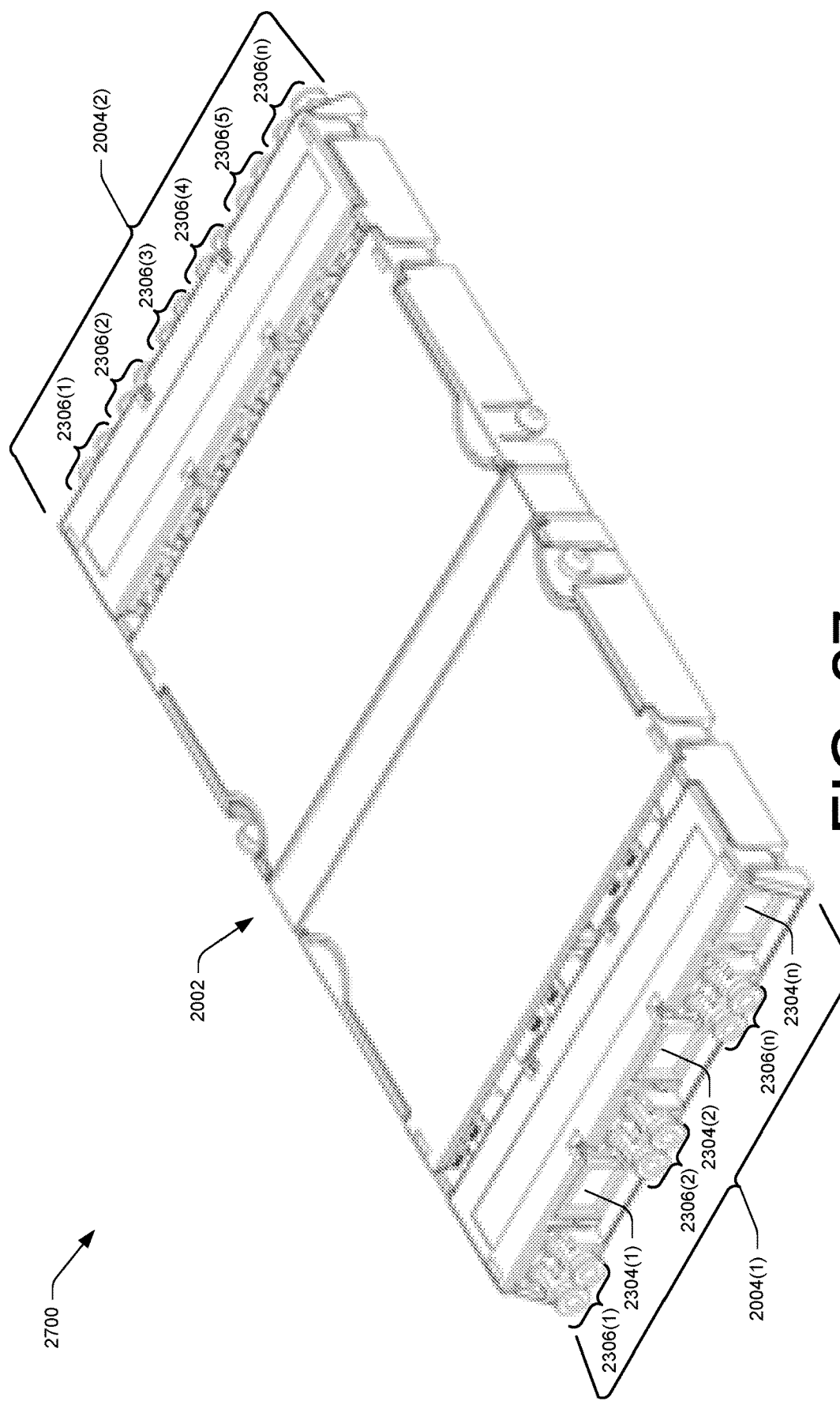
FIG. 27 illustrates a perspective view of the example cassette shown in FIG. 20, configured with connectors (e.g., connectors to connectors splitter configuration).

FIG. 27 illustrates a perspective view 2700 of cassette 2002 shown in FIG. 20, configured with a first plurality of the connectors 2306(1)-2306(n), the one or more hole plugs 2304(1)-2304(n), and a second plurality of the connectors 2306(1)-2306(n). For example, the cassette 2002 may be configured as a splitter cassette that includes three duplex LC connectors or three SC connectors, the plurality of hole plugs 2304(1)-2304(n) fastened in the first plurality of receptacles 2202(1) in the cassette 2002, and six duplex LC connectors or six SC connectors fastened in the second plurality of receptacles 2202(2) in the cassette 2002.

Figure 28:
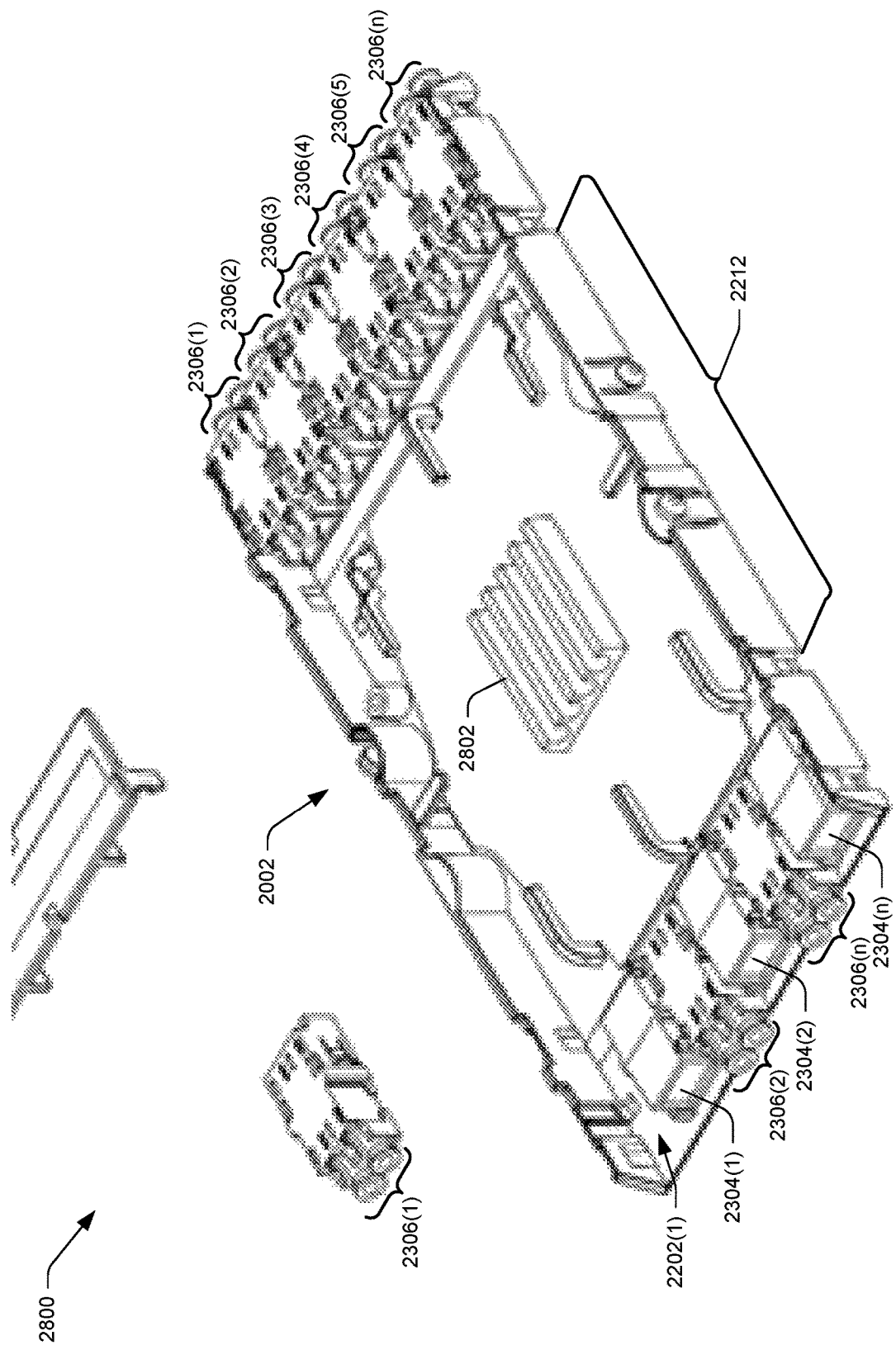
FIG. 28 illustrates an exploded view of the example cassette configured with the connectors shown in FIG. 27.

FIG. 28 illustrates an exploded view 2800 of the cassette 2002 configured with the first plurality of the connectors 2306(1)-2306(n), the one or more hole plugs 2304(1)-2304(n), and a second plurality of the connectors 2306(1)-2306(n) shown in FIG. 27. FIG. 28 illustrates the first plurality of receptacles 2202(1) may fasten the first plurality of connectors 2306(1)-2306(n) and the one or more hole plugs 2304(1)-2304(n) in the cassette 2002 and the second plurality of receptacles 2202(2) may fasten the second plurality of the connectors 2306(1)-2306(n) in the cassette 2002.

FIG. 28 illustrates the fiber service loop bay 2212 may further include at least one retaining mechanism 2802 for holding a splitter of at least one fiber of the plurality of fibers. For example, when the cassette 2002 is configured as a splitter cassette that includes three duplex LC connectors or three SC connectors, and six duplex LC connectors or six SC connectors, the retaining mechanism 2802 may be fixed to the bottom surface of the cassette 2002 and in the fiber service loop bay 2212 to hold a splitter of at least one fiber of the plurality of fibers.

Figure 29:
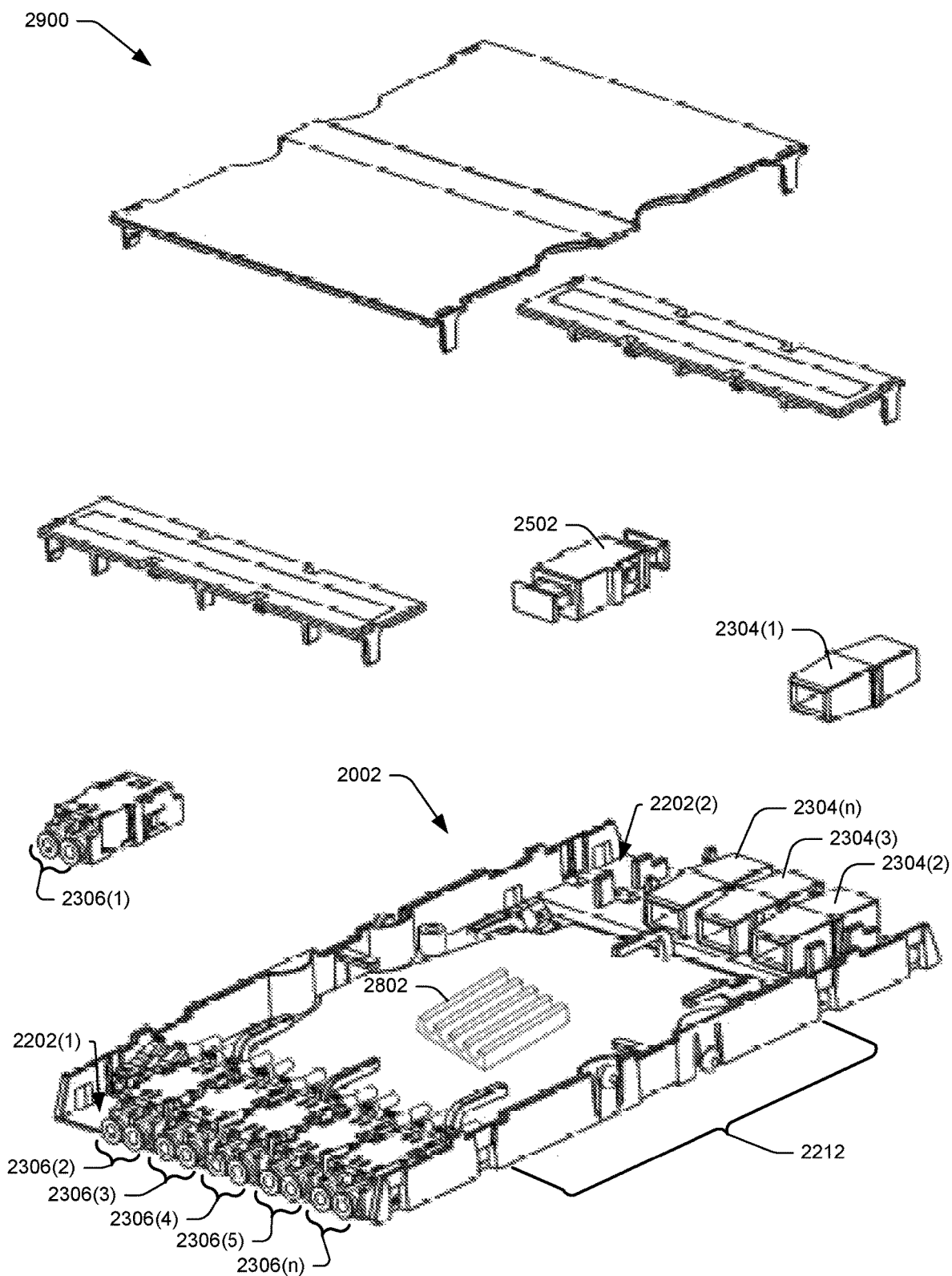
FIG. 29 illustrates an exploded view of the example cassette shown in FIG. 20 configured with an adapter and connectors (e.g., an MPO adapter to LC connectors and/or SC connectors splitter configuration).

FIG. 29 illustrates an exploded view 2900 of the cassette 2002 shown in FIG. 20, configured with the adapter 2502, the one or more hole plugs 2304(1)-2304(n), and the first plurality of connectors 2306(1)-2306(n). For example, the cassette 2002 may be configured as a splitter cassette that includes six duplex LC connectors or six SC connectors fastened in the first plurality of receptacles 2202(1) in the cassette 2002, and an MPO adapter and the one or more hole plugs 2304(1)-2304(n) fastened in the second plurality of receptacles 2202(2) in the cassette 2002.

FIG. 29 illustrates the fiber service loop bay 2212 may further include the at least one retaining mechanism 2802 for holding a splitter of at least one fiber of the plurality of fibers. For example, when the cassette 2002 is configured as a splitter cassette that includes six duplex LC connectors or six SC connectors, and the adapter 2502 and the plurality of hole plugs 2304(1)-2304(n), the retaining mechanism 2802 may be fixed to the bottom surface of the cassette 2002 and in the fiber service loop bay 2212 to hold a splitter of at least one fiber of the plurality of fibers.

Figure 30:
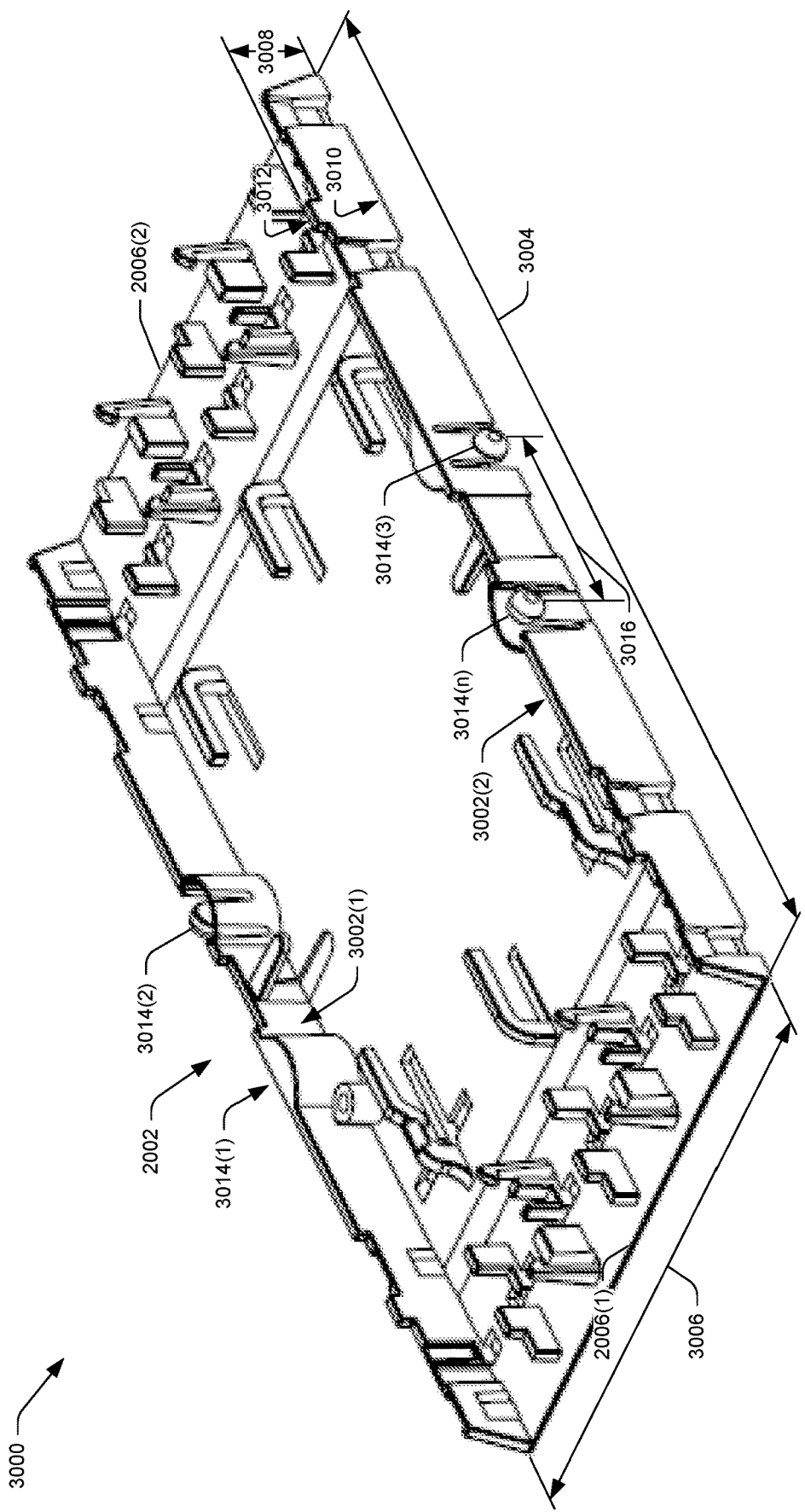
FIG. 30 illustrates a perspective top view of the example cassette shown in FIG. 20, void of the cover (not shown) of the cassette and void of the connector covers (not shown) of the first and second connector fastening stations.

FIG. 30 illustrates a perspective top view 3000 of the example cassette 2002 shown in FIG. 20, void of the cover (not shown) of the cassette 2002 and void of the connector covers 1000 (not shown) of the first and second connector fastening stations 2004(1) and 2004(2).

FIG. 30 illustrates a first side 3002(1) and a second side 3002(2) of the cassette 2002 between the first end 2006(1) and a second end 2006(2) of the cassette 2002. While FIG. 30 illustrates the first side 3002(1) and the second side 3002(2) comprising walls as extending completely from the first end 2006(1) to the second end 2006(2), it is understood that in an alternative embodiment (not shown), the first side 3002(1) and/or the second side 3002(2) may only partially extend across cassette 2002 in varying positions. For example, the first side 3002(1) and/or the second side 3002(2) may partially extend: from the first end 2006(1) toward the second end 2006(2); from the second end 2006(2) toward the first end 2006(1); or from a location (e.g., a middle location, a left of middle location, a right of middle location) located between the first end 2006(1) and the second end 2006(2) toward the first end 2006(1) and/or the second end 2006(2) of the cassette 2002.

FIG. 30 illustrates the cassette 2002 having a length 3004 extending from the first end 2006(1) to the second end 2006(2). In an embodiment, length 3004 may range from about 6 inches to about 8 inches from the first end 2006(1) to the second end 2006(2). For example, length 3004 may be about 7 inches. FIG. 30 also illustrates the cassette 2002 having a width 3006 extending from the first side 3002(1) to the second side 3002(2). In an embodiment, width 3006 may range from about 3 inches to about 5 inches from the first side 3002(1) to the second side 3002(2). For example, width 3006 may be about 4 inches. FIG. 30 also illustrates the cassette 2002 having a height 3008 extending from a bottom surface 3010 to a top surface 3012. In an embodiment, height 3008 may range from about 0.4 inches to about 0.6 inches from the bottom surface 3010 to the top surface 3012. For example, height 3008 may be about 0.5 inches. The bottom surface 3010 may be a substantially planar surface forming the base of the first and second sides 3002(1) and 3002(2) (illustrated in FIG. 31). The top surface 3012 may be one or more portions (e.g., protrusions, ridges, edges, etc.) located on the first side 3002(1) and/or the second side 3002(2) having a greatest height.

FIG. 30 illustrates a plurality of detents 3014(1) and 3014(2) arranged in the first side 3002(1) of the cassette 2002 and a plurality of detents 3014(3) and 3014(n) arranged in the second side 3002(2) of the cassette 2002. While FIG. 30 illustrates the plurality of detents 3014(1) and 3014(2) arranged in the first side 3002(1) and the plurality of detents 3014(3) and 3014(n) arranged in the second side 3002(2), any number of detents 3014(1)-3014(n) may be arranged in the first side 3002(1) and/or the second side 3002(2). For example, at least one detent may be arranged in the first side 3002(1) or at least one detent may be arranged in the second side 3002(2). In another example, at least one detent may be arranged in the first side 3002(1) and at least one detent may be arranged in the second side 3002(2).

FIG. 30 illustrates the detents 3014(3) and 3014(n) are separated by a distance 3016. In an embodiment, distance 3016 may range from about 0.8 inches to about 1.8 inches. For example, distance 3016 may be about 1.3 inches. Similarly, the detents 3014(1) and 3014(2) are separated by the distance 3016. FIG. 30 illustrates the detents 3014(1)-3014(n) are spaced a distance from the first end 2006(1) or the second end 2006(2). In an embodiment, the distance from the first end 2006(1) or the second end 2006(2) may ranging from about 2 inches to about 4 inches. For example, the distance from the first end 2006(1) or the second end 2006(2) may be about 3 inches.

While FIG. 30 illustrates the detents 3014(1)-3014(n) including living hinge springs, the detents 3014(1)-3014(n) may be any other fastener. For example, the detents may be snap-fit fasteners, press-fit fasteners, interference fit fasteners, etc., arranged in the first side 3002(1) or the second side 3002(2) of the cassette 2002. In an embodiment, and discussed in detail below with regard to FIGS. 32 and 33, the detents 3014(1)-3014(n) of the cassette 2002 are engageable with one or more detents arranged in portions (e.g., walls) of a tray to engage the cassette 2002 with the tray.

Figure 31:
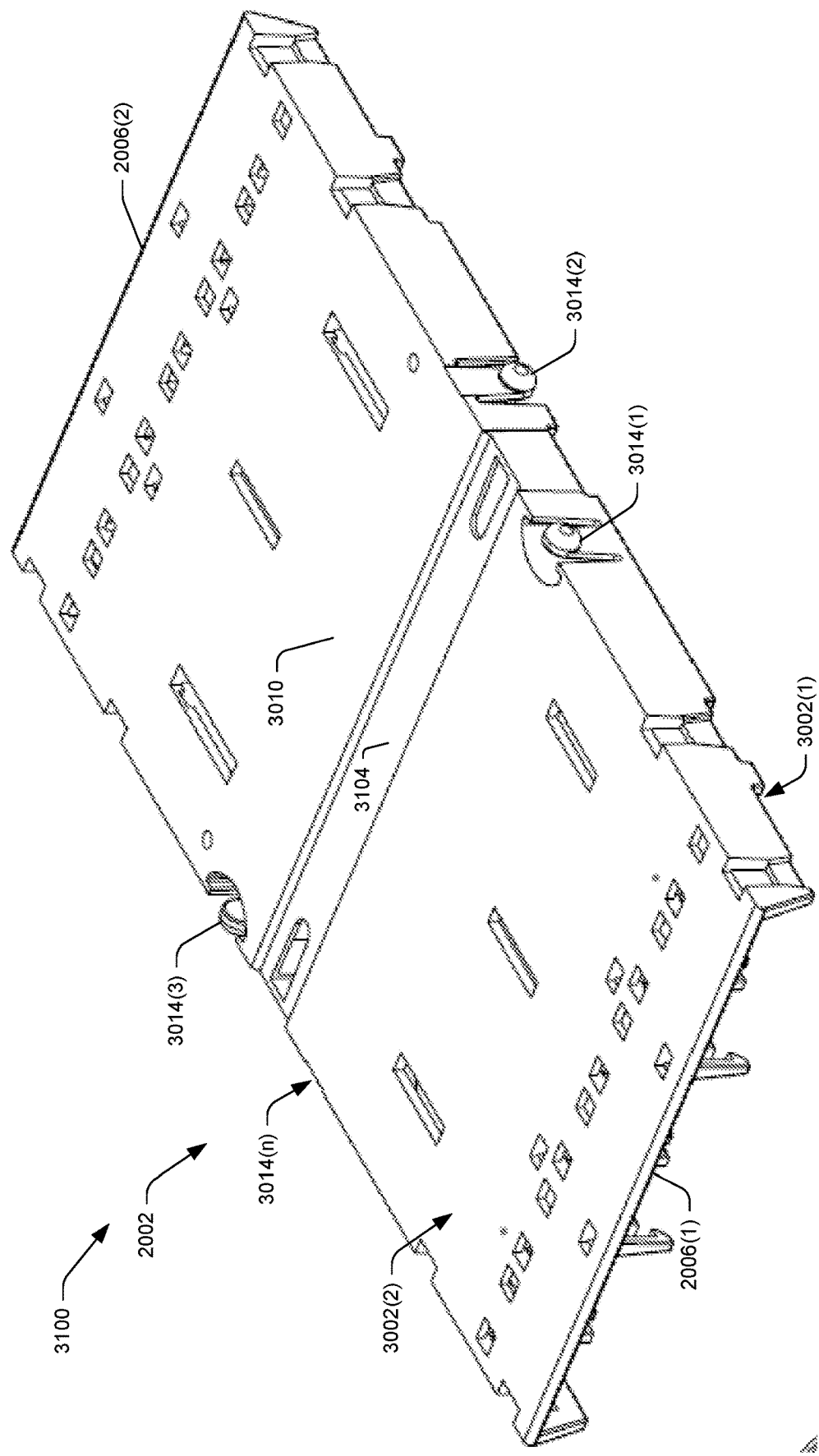
FIG. 31 illustrates a perspective bottom view of the example cassette shown in FIG. 20.

FIG. 31 illustrates a perspective bottom view 3100 of the example cassette 2002 shown in FIG. 20. FIG. 31 illustrates the cassette 2002 having the bottom surface 3010 extending between the first end 2006(1) and the second end 2006(2), and extending between the first side 3002(1) of the cassette 2002 and the second side 3002(2) of the cassette 2002. FIG. 31 illustrates a groove 3102 may be arranged in the bottom surface 3010. For example, the groove 3102 may be arranged between the detents 3014(1)-3014(n). For example, the groove 3102 may be arranged between the detents 3014(1) and 3014(2) and between the detents 3014(3) and 3014(n). The groove 3102 may be spaced a distance from the first end 2006(1) or the second end 2006(2). In an embodiment, the distance may range from about 3 inches to about 4 inches from the first end 2006(1) or the second end 2006(2) to the groove 3102. For example, the distance may be about 3.3 inches from the first end 2006(1) or the second end 2006(2) to the groove 3102. The groove 3102 may have a width ranging from about 0.4 inches to about 0.6 inches. For example, the groove 3102 may have a width of about 0.5 inches.

While FIG. 31 illustrates the groove 3102 as a continuous opening from the first side 3002(1) of the cassette 2002 to the second side 3002(2) of the cassette 2002, in an alternative embodiment (not shown), the groove 3102 may only partially extend between the first side 3002(1) to the second side 3002(2). Further, while FIG. 31 illustrates the groove 3102 arranged between the detents 3014(1)-3014(n), in an alternative embodiment (not shown), the groove 3102 may be arranged outside of the detents 3014(1)-3014(n). In some examples, and discussed in detail below with regard to FIGS. 32 and 33, the groove 3102 of the cassette 2002 is engageable with a protrusion of a tray to engage the cassette 2002 with the tray.

Figure 32:
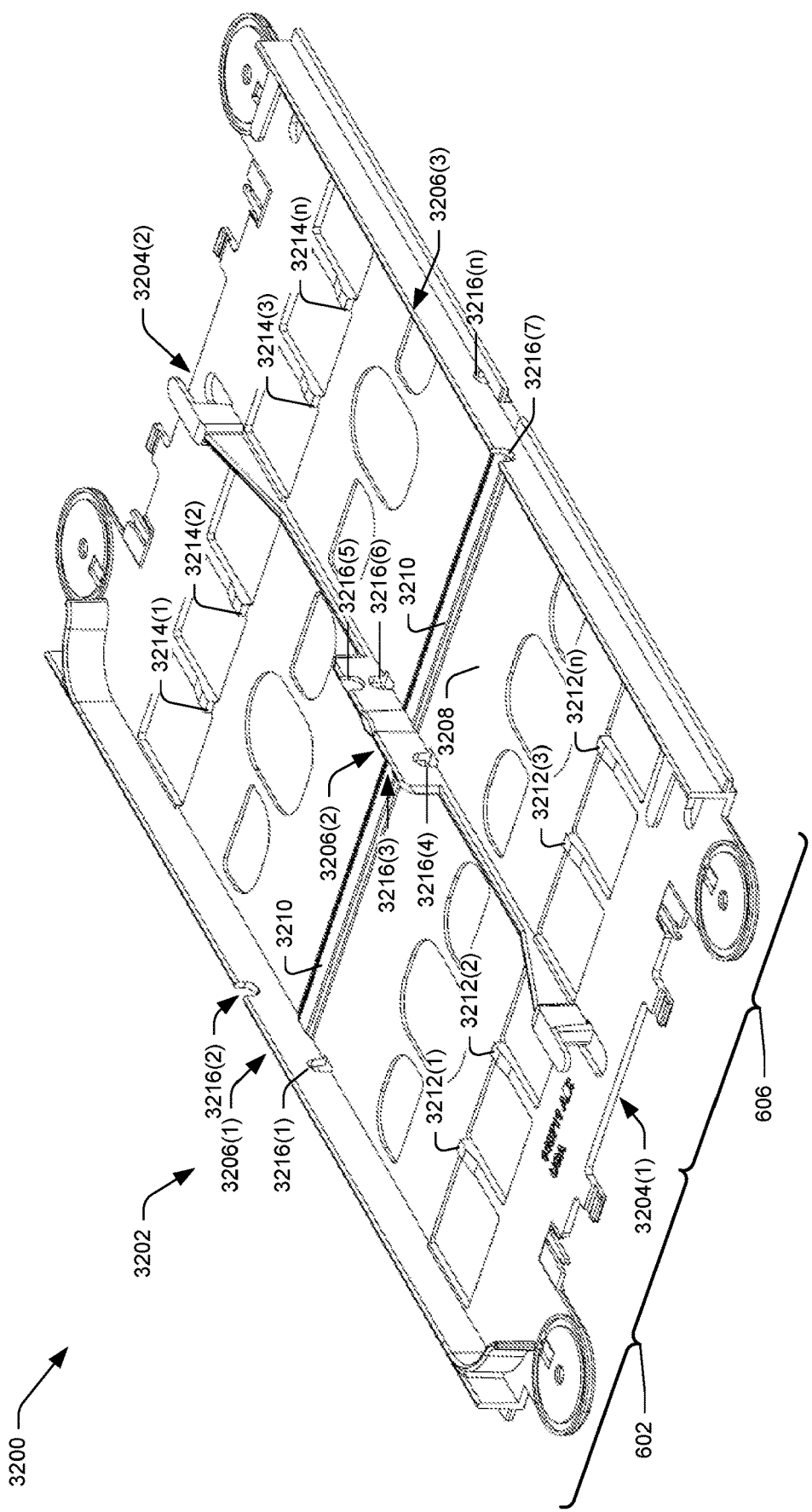
FIG. 32 illustrates a perspective view of an example tray.

FIG. 32 illustrates a perspective view 3200 of another embodiment of a tray 3202. FIG. 32 illustrates the tray 3202 may have a first end 3204(1) opposite a second end 3204(2). Inasmuch as FIG. 32 depicts different first and second ends, while referring to the same elements and features of the tray 3202, the following discussion of specific features may refer interchangeably to any of FIGS. 1, 2, 3, 4, 5, 6, 7, and 8 except where explicitly indicated. In particular, FIG. 32 illustrates an embodiment of the tray 3202, including the first portion 602 of the tray 3202 adjacent to the second portion 606 of the tray 3202. The first portion 602 of the tray 3202 may receive a cassette and the second portion 606 of the tray 3202 may receive a cassette. The cassette may be the same as cassette 112, cassette 604, cassette 1600, or cassette 2002.

FIG. 32 illustrates first portion 602 of the tray 3202 may have a first wall 3206(1) opposite a second wall 3206(2), and the second portion 606 of the tray 3202 may have a third wall 3206(3) opposite the second wall 3206(2). FIG. 32 illustrates a floor 3208 extending between the first wall 3206(1) and the second wall 3206(2) and extending between the second wall 3206(2) and the third wall 3206(3). FIG. 32 illustrates a protrusion 3210 arranged in the floor 3208. While FIG. 32 illustrates the protrusion 3210 including a continuous protrusion (e.g., ridge, nodule, bump, etc.) from the first wall 3206(1) to the second wall 3206(2), and a continuous protrusion from the second wall 3206(2) to the third wall 3206(3), in an alternative embodiment (not shown), the protrusion 3210 may only partially extend between the first wall 3206(1) to the second wall 3206(2), or partially extend between the second wall 3206(2) to the third wall 3206(3). Further, while FIG. 32 illustrates three walls 3206(1), 3206(2) and 3206(3), the tray 3202 may have any number of walls. For example, the tray 3202 may have walls 3206(1) and 2306(3), the tray 3202 may have walls 3206(1) and 3206(2), the tray 3202 may have walls 3206(2) and 3206(3), or the tray 3202 may have no walls.

In some examples, and as discussed in detail below with regard to FIG. 33, the first wall 3206(1) may be configured to engage with the first side 3002(1) of the cassette 2002 or engage with the second side 3002(2) of the cassette 2002 and the second wall 3206(2) may be configured to engage with the first side 3002(1) of the cassette 2002 or engage with the second side 3002(2) of the cassette 2002 to engage the cassette 2002 with the tray 3202 (i.e., engage the cassette 2002 with the first portion 602 of the tray 3202). Similarly, and in some examples the second wall 3206(2) may be configured to engage with the first side 3002(1) of the cassette 2002 or engage with the second side 3002(2) of the cassette 2002 and the third wall 3206(3) may be configured to engage with the first side 3002(1) of the cassette 2002 or engage with the second side 3002(2) of the cassette 2002 to engage the cassette 2002 with the tray 3202 (i.e., engage the cassette 2002 with the second portion 606 of the tray 3202). Further, and in some examples, the protrusion 3210 of the tray 3202 is engageable with the groove 3102 of the cassette 2002 to engage the cassette 2002 with the tray 3202.

FIG. 32 illustrates the tray 3202 may include one or more first engagement members 3212(1), 3212(2), 3212(3), and 3212(n) configured to engage with the first end 2006(1) of the cassette 2002 or with the second end 2006(2) of the cassette 2002. FIG. 32 illustrates the tray 3202 may include one or more second engagement members 3214(1), 3214(2), 3214(3), and 3214(n) configured to engage with the first end 2006(1) of the cassette 2002 or with the second end 2006(2) of the cassette 2002. FIG. 32 illustrates the one or more first engagement members 3212(1)-3212(n) and the one or more second engagement members 3214(1)-3214(n) comprising respective protrusions, nodules, bumps, etc. extending a distance from the floor 3208 of the tray 3202 configured to engage with the first end 2006(1) of the cassette 2002 or with the second end 2006(2) of the cassette 2002.

FIG. 32 illustrates the tray 3202 may include a plurality of detents 3216(1) and 3216(2) arranged in the first wall 3206(1), a plurality of detents 3216(3), 3216(4), 3216(5), and 3216(6) arranged in the second wall 3206(2), and a plurality of detents 3216(7) and 3216(n) arranged in the third wall 3206(3). The plurality of detents 3216(1) and 3216(2) arranged in the first wall 3206(1) of the tray 3202 are configured to engage with the plurality of detents 3014(1) and 3014(2) arranged in the first side 3002(1) of the cassette 2002. The plurality of detents 3216(3) and 3216(6) arranged in the second wall 3206(2) of the tray 3202 are configured to engage with the plurality of detents 3014(3) and 3014(n) arranged in the second side 3002(2) of the cassette 2002. Similarly, the plurality of detents 3216(4) and 3216(5) arranged in the second wall 3206(2) of the tray 3202 are configured to engage with the plurality of detents 3014(1) and 3014(2) arranged in the first side 3002(1) of the cassette 2002. The plurality of detents 3216(7) and 3216(n) arranged in the third wall 3206(3) of the tray 3202 are configured to engage with the plurality of detents 3014(3) and 3014(n) arranged in the second side 3002(2) of the cassette 2002. FIG. 32 illustrates the plurality of detents 3216(1)-3216(n) comprise respective apertures, receptacles, notches, etc. arranged in the first wall 3206(1), second wall 3206(2), and third wall 3206(3) of the tray 3202 configured to engage with the detents 3014(1)-3014(n) of the cassette 2002.

The tray 3202 may have a length extending from the first end 3204(1) to the second end of 3204(2). In an embodiment, the length may range from about 11 inches to about 13 inches from the first end 3204(1) to the second end 3204(2). For example, the length may be about 12 inches. The tray 3202 may have a length extending from the one or more first engagement members 3212(1)-3212(n) to the one or more second engagement members 3214(1)-3214(n). In one embodiment, the length may range from about 6 inches to about 8 inches from the one or more first engagement members 3212(1)-3212(n) to the one or more second engagement members 3214(1)-3214(n). For example, the length may be about of about 7 inches.

The tray 3202 may have a width extending from the first wall 3206(1) to the second wall 3206(2), and a width extending from the second wall 3206(2) to the third wall 3206(3). In one embodiment, the width may range from about 3 inches to about 5 inches from the first wall 3206(1) to the second wall 3206(2), and the width may range from about 3 inches to about 5 inches from the second wall 3206(2) to the third wall 3206(3). For example, the width from the first wall 3206(1) to the second wall 3206(2) may be about 4 inches, and the width from the second wall 3206(2) to the third wall 3206(3) may be about 4 inches. The first wall 3206(1) of the tray 3202 may be configured to engage with the first side 3002(1) of the cassette 2002 or engage with the second side 3002(2) of the cassette 2002. Similarly, the second wall 3206(2) may be configured to engage with the first side 3002(1) of the cassette 2002 or engage with the second side 3002(2) of the cassette 2002. For example, the first and second walls 3206(1) and 3206(2) of the tray 3202 may interference fit, friction fit, press fit, etc. with the first and second sides 3002(1) and 3002(2) of the cassette 2002. Similarly, the second and third walls 3206(2) and 3206(3) of the tray 3202 may interference fit, friction fit, press fit, etc. with the first and second sides 3002(1) and 3002(2) of the cassette 2002.

Figure 33:
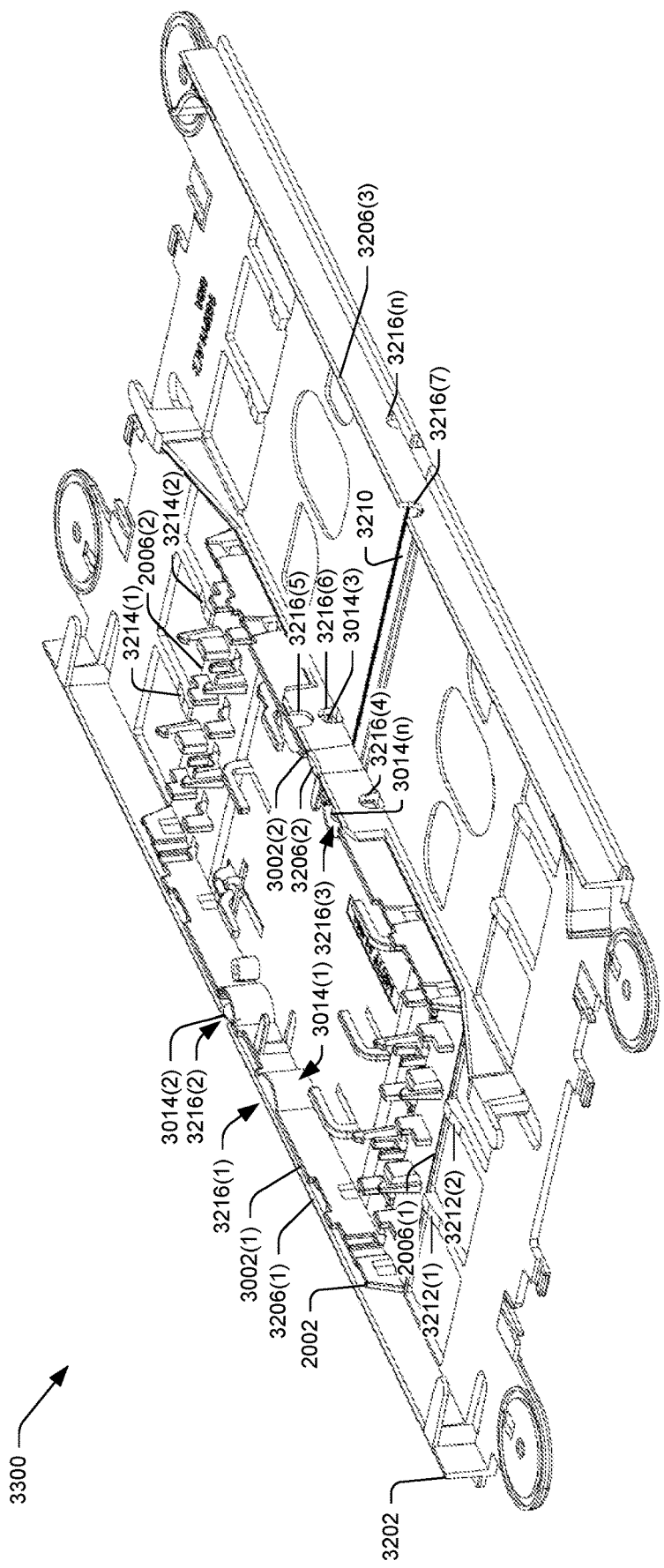
FIG. 33 illustrates a perspective view of the example tray shown in FIG. 32 with the cassette arranged in the tray.

FIG. 33 illustrates a perspective view 3300 of the example tray 3202 shown in FIG. 32 with the cassette 2002 arranged in the tray 3202. FIG. 33 illustrates the cassette 2002 is arrangeable in the tray 3202 such that the first engagement members 3212(1) and 3212(2) engage with the first end 2006(1) of the cassette 2002, and the second engagement members 3214(1) and 3214(2) engage with the second end 2006(2) of the cassette 2002. While FIG. 33 illustrates the first engagement members 3212(1) and 3212(2) engaged with the first end 2006(1) of the cassette 2002 and the second engagement members 3214(1) and 3214(2) engaged with the second end 2006(2) of the cassette 2002, cassette 2002 is reversibly engageable such that the first engagement members 3212(1) and 3212(2) may be engaged with the second end 2006(2) of the cassette 2002, and the second engagement members 3214(1) and 3214(2) may be engaged with the first end 2006(2) of the cassette 2002.

FIG. 33 illustrates the cassette 2002 is arrangeable in the tray 3202 such that the first wall 3206(1) of the tray 3202 is engageable with the first side 3002(1) of the cassette 2002, and the second wall 3206(2) of the tray 3202 is engageable with the second side 3002(2) of the cassette 2002. While FIG. 33 illustrates the first wall 3206(1) of the tray 3202 engaged with the first side 3002(1) of the cassette 2002, cassette 2002 is reversibly engageable such that the first wall 3206(1) of the tray 3202 may be engaged with the second side 3002(2) of the cassette 2002.

FIG. 33 illustrates the cassette 2002 is arrangeable in the tray 3202 such that the detents 3014(1)-3014(n) of the cassette 2002 are engageable with the detents 3216(1), 3216(2), 3216(3), and 3216(6) arranged in the first and second walls 3206(1) and 3206(2) of the tray 3202. For example, FIG. 33 illustrates the detent 3014(1) of the cassette 2002 engaged with the detent 3216(1) of the tray 3202, the detent 3014(2) of the cassette 2002 engaged with the detent 3216(2) of the tray 3202, the detent 3014(3) of the cassette 2002 engaged with the detent 3216(6) of the tray 3202, and the detent 3014(n) of the cassette 2002 engaged with the detent 3216(3) of the tray 3202. While FIG. 33 illustrates the cassette 2002 arrangeable in the tray 3202 such that the detents 3014(1)-3014(n) of the cassette 2002 are engageable with the detents 3216(1), 3216(2), 3216(3), and 3216(6) arranged in the first and second walls 3206(1) and 3206(2) of the tray 3202, cassette 2002 is reversibly engageable such that the detents 3014(1)-3014(n) of the cassette 2002 are engageable with the detents 3216(4), 3216(5), 3216(7), and 3216(n) arranged in the second and third walls 3206(2) and 3206(3) of the tray 3202.

FIG. 33 illustrates the cassette 2002 is arrangeable in the tray 3202 such that the protrusion 3210 of the tray 3202 is engageable with the groove 3102 of the cassette 2002.

Example Clauses

A. A data communication apparatus, comprising: a cassette including: a first end, a second end opposite the first end, a length ranging from about 6 inches to about 8 inches from the first end to the second end, and a connector fastening station located in the first end of the cassette or the second end of the cassette, the connector fastening station configured to fasten at least one of an optical fiber connector, an optical fiber adapter, an optical fiber plug, or an optical fiber strain relief unit.

B. A data communication apparatus as paragraph A recites, wherein a height of the cassette ranges from about 0.4 inches to about 0.6 inches.

C. A data communication apparatus according to any of paragraphs A-B, further comprising a tray slideably displaceable from a stowed position to a first use position or to a second use position, the tray including: a first engagement member configured to engage with the first end of the cassette or with the second end of the cassette; a second engagement member configured to engage with the first end of the cassette or with the second end of the cassette; and a length ranging from about 6 inches to about 8 inches from the first engagement member to the second engagement member, and wherein the cassette is arrangeable in the tray such that the first engagement member engages with the first end of the cassette or with the second end of the cassette, and the second engagement member engages with the first end of the cassette or with the second end of the cassette.

D. A data communication apparatus according to any of paragraphs A-C, further comprising a chassis having a first access side opposite a second access side, wherein the tray is arrangeable in the chassis, the tray having a first end opposite a second end, and wherein: in the stowed position the first and second ends of the tray are located in the chassis; in the first use position the first end of the tray is disposed a distance external from the first access side of the chassis; and in the second use position the second end of the tray is disposed a distance external from the second access side of the chassis.

E. The data communication apparatus according to any of paragraphs A-D, wherein the connector fastening station is a first connector fastening station, and the cassette further includes a second connector fastening station located in the first end of the cassette or the second end of the cassette, the second connector fastening station configured to fasten at least one of the optical fiber connector, the optical fiber adapter, the optical fiber plug, or the optical fiber strain relief unit.

F. The data communication apparatus according to any of paragraphs A-E, further comprising a fiber service loop bay for managing a plurality of fibers received by the cassette, the fiber service loop bay arranged between the first end and the second end, and the fiber service loop bay including a plurality of projections arranged above a bottom surface of the cassette for storing and protecting the plurality of fibers.

G. A data communication apparatus, comprising: a cassette including: a first end, a second end opposite the first end, a first side arranged between the first end and the second end, a second side, opposite the first side, arranged between the first end and the second end, a width ranging from about 3 inches to about 5 inches from the first side to the second side, and a connector fastening station located in the first end of the cassette or the second end of the cassette and between the first side of the cassette and the second side of the cassette, the connector fastening station configured to fasten at least a plurality of optical fiber connectors.

H. A data communication apparatus as paragraph G recites, wherein a height of the cassette ranges from about 0.4 inches to about 0.6 inches.

I. A data communication apparatus according to any of paragraphs G-H, further comprising a tray slideably displaceable from a stowed position to a first use position or to a second use position, the tray including: a first wall configured to engage with the first side of the cassette or engage with the second side of the cassette; a second wall configured to engage with the first side of the cassette or engage with the second side of the cassette; a width ranging from about 3 inches to about 5 inches from the first wall to the second wall; and wherein the cassette is arrangeable in the tray such that the first wall is engageable with the first side of the cassette or engageable with the second side of the cassette, and the second wall is engageable with the first side of the cassette or engageable with the second side of the cassette.

J. A data communication apparatus according to any of paragraphs G-I, further comprising a chassis having a first access side opposite a second access side; the tray arrangeable in the chassis, the tray having a first end opposite a second end, wherein: in the stowed position the first and second ends of the tray are located in the chassis; in the first use position the first end of the tray is disposed a distance external from the first access side of the chassis; and in the second use position the second end of the tray is disposed a distance external from the second access side of the chassis.

K. A data communication apparatus according to any of paragraphs G-J, wherein the plurality of optical fiber connectors comprise a plurality of LC connectors.

L. A data communication apparatus according to any of paragraphs G-K, further comprising a fiber service loop bay for managing a plurality of fibers received by the cassette, the fiber service loop bay arranged between the first end and the second end, and the fiber service loop bay including a plurality of projections arranged above a bottom surface of the cassette for storing and protecting the plurality of fibers.

M. A data communication apparatus, comprising: a cassette including: a first end, a second end opposite the first end, a first side arranged between the first end and the second end, a second side, opposite the first side, arranged between the first end and the second end, at least a detent arranged in the first side or arranged in the second side, and a connector fastening station located in the first end of the cassette or the second end of the cassette and between the first side of the cassette and the second side of the cassette, the connector fastening station configured to fasten at least a plurality of optical fiber connectors.

N. A data communication apparatus as paragraph M recites, wherein the detent is a first detent, and the data communication apparatus further comprising a tray slideably displaceable from a stowed position to a first use position or to a second use position, the tray including: a first wall opposite a second wall; at least a second detent arranged in the first wall or arranged in the second wall to engage with the first detent; and wherein the cassette is arrangeable in the tray such that the first detent is engageable with the second detent.

O. A data communication apparatus according to any of paragraphs M-N, further comprising a chassis having a first access side opposite a second access side; the tray arrangeable in the chassis, the tray having a first end opposite a second end, wherein: in the stowed position the first and second ends of the tray are located in the chassis; in the first use position the first end of the tray is disposed a distance external from the first access side of the chassis; and in the second use position the second end of the tray is disposed a distance external from the second access side of the chassis.

P. A data communication apparatus according to any of paragraphs M-O, wherein a height of the cassette ranges from about 0.4 inches to about 0.6 inches.

Q. A data communication apparatus according to any of paragraphs M-P, further comprising a fiber service loop bay for managing a plurality of fibers received by the cassette, the fiber service loop bay arranged between the first end and the second end, and the fiber service loop bay including a plurality of projections arranged above a bottom surface of the cassette for storing and protecting the plurality of fibers.

R. A data communication apparatus, comprising: a cassette including: a first end, a second end opposite the first end, a first side arranged between the first end and the second end, a second side, opposite the first side, arranged between the first end and the second end, a bottom surface extending between the first end of the cassette and the second end of the cassette, and between the first side of the cassette and the second side of the cassette, an groove arranged in the bottom surface, and a connector fastening station located in the first end of the cassette or the second end of the cassette and between the first side of the cassette and the second side of the cassette, the connector fastening station configured to fasten at least a plurality of optical fiber connectors.

S. A data communication apparatus as paragraph R recites, further comprising a tray slideably displaceable from a stowed position to a first use position or to a second use position, the tray including: a first wall opposite a second wall; a floor extending between the first wall and the second wall; a protrusion arranged in the floor; and wherein the cassette is arrangeable in the tray such that the protrusion of the tray is engageable with the groove of the cassette.

T. A data communication apparatus according to any of paragraphs R-S, further comprising a chassis having a first access side opposite a second access side; the tray arrangeable in the chassis, the tray having a first end opposite a second end, wherein: in the stowed position the first and second ends of the tray are located in the chassis; in the first use position the first end of the tray is disposed a distance external from the first access side of the chassis; and in the second use position the second end of the tray is disposed a distance external from the second access side of the chassis.

U. A data communication apparatus according to any of paragraphs R-T, wherein a height of the cassette ranges from about 0.4 inches to about 0.6 inches.

V. A data communication apparatus according to any of paragraphs R-U, further comprising a fiber service loop bay for managing a plurality of fibers received by the cassette, the fiber service loop bay arranged between the first end and the second end, and the fiber service loop bay including a plurality of projections arranged above a bottom surface of the cassette for storing and protecting the plurality of fibers.

W. A data communication apparatus comprising: a chassis having a first access side opposite a second access side; a tray arrangeable in the chassis, the tray having a first end opposite a second end, the tray slideably displaceable from a stowed position to a first use position or to a second use position, wherein: in the stowed position the first and second ends of the tray are located in the chassis; in the first use position the first end of the tray is disposed a distance external from the first access side of the chassis; and in the second use position the second end of the tray is disposed a distance external from the second access side of the chassis; a cassette arranged in the tray, the cassette having a first end opposite a second end, the cassette including: a shuttle member arranged in the first end of the cassette opposite a connector fastening station arranged in the second end of the cassette, the shuttle member slideably displaceable from a first position to a second position, wherein: when in the first position the shuttle member is disposed a distance from the connector fastening station; and when in the second position the shuttle member is disposed a distance from the connector fastening station greater than the distance when the shuttle member is in the first position; and wherein when the tray is in the first use position, at least a portion of the shuttle member is disposed a distance external from the first access side of the chassis, and when the tray is in the second use position, at least a portion of the connector fastening station is disposed a distance external from the second access side of the chassis.

X. A data communication apparatus as paragraph W recites, further comprising a plurality of optical fibers received by the shuttle member and positioned adjacent to the connector fastening station.

Y. A data communication apparatus according to any of paragraphs W-X, wherein the plurality of optical fibers are routed through the shuttle member when the tray is in the first use position and the shuttle member is in the first position or the second position.

Z. A data communication apparatus according to any of paragraphs W-Y, wherein the plurality of optical fibers each have a termination, and at least one termination of the terminations is removeably connected to an adapter fastened to the connector fastening station when the tray is in the second use position.

AA. A data communication apparatus according to any of paragraphs W-Z, wherein the connector fastening station fastens respective adapters to a portion of the second end of the cassette in a staggered pattern.

BB. A data communication apparatus according to any of paragraphs W-AA, wherein the staggered pattern of the respective adapters includes a first adapter and a second adapter disposed in a first plane, and a third adapter and a fourth adapter disposed in a second plane, the first plane space a distance from the second plane.

CC. A data communication apparatus according to any of paragraphs W-BB, further comprising one or more apertures arranged in a portion of the tray proximate to the connector fastening station, wherein the one or more apertures provide access to an adapter fastened to the connector fastening station.

DD. A data communication apparatus according to any of paragraphs W-CC, wherein the chassis is a 19 inch chassis having a left side and a right side, and the tray is a standard tray arrangeable in both the left side and the right side.

EE. A data communication apparatus according to any of paragraphs W-DD, further comprising a flexible member having an end coupleable to the first end of the tray or the second end of the tray, the flexible member for maintaining a bend radius of the optical fibers received by the flexible member.

FF. A data communication apparatus according to any of paragraphs W-EE, wherein the flexible member includes at least a first straight link shorter than a second straight link, the first straight link pivotably coupled to the second straight link.

GG. A data communication apparatus according to any of paragraphs W-FF, wherein the flexible member includes at least a first straight link and second straight link, the first straight link and the second straight link being shorter than a third straight link, and the first straight link pivotably coupled to the second straight link.

HH. A data communication apparatus according to any of paragraphs W-GG, further comprising a braking member arrangeable adjacent to the first side or the second side of the chassis, the braking member including protrusions having offset points of contact, the protrusions for contacting a plurality of optical fibers arranged in the protrusions and preventing the plurality of optical fibers from being displaced, relative to the protrusions, up to a threshold amount of force applied to the optical fibers.

II. A data communication apparatus according to any of paragraphs W-HH, wherein the cassette is a first cassette, the first cassette is arranged in a first portion of the tray, and further including a second cassette arranged in a second portion, adjacent to the first portion, of the tray.

JJ. A data communication apparatus according to any of paragraphs W-II, wherein the second cassette includes a first connector fastening station arranged in a first end of the second cassette and a second connector fastening station arranged in a second end, opposite the first end, of the second cassette.

KK. A data communication apparatus according to any of paragraphs W-JJ, wherein the first connector fastening station fastens respective adapters to a portion of the first end of the second cassette in a staggered pattern or the second connector fastening station fastens respective adapters to a portion of the second end of the second cassette in the staggered pattern.

LL. A data communication apparatus according to any of paragraphs W-KK, wherein the second cassette has a first portion adjacent to a second portion, and at least one connector module removeably receivable by the first portion or the second portion.

MM. A data communication apparatus according to any of paragraphs W-LL, wherein the at least one connector module includes a first connector fastening station arranged in a first end, opposite a second end of the at least one connector module, and a second connector fastening station arranged in the second end of the at least one connector module, the first connector fastening station fastens respective adapters to a portion of the first end of the at least one connector module or the second connector fastening station fastens respective adapters to a portion of the second end of the at least one connector module.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A data communication apparatus, comprising:
    a cassette including:
        a first end,
        a second end opposite the first end, the first end having a first geometry symmetrical, about at least one axis, to a second geometry of the second end,
        a length ranging from about 6 inches to about 8 inches from the first end to the second end,
        a first side arranged between the first end and the second end,
        a second side, opposite the first side, arranged between the first end and the second end,
        a width extending a distance between the first side and the second side,
        a bottom surface extending the length between the first end and the second end, and extending the width between the first side and the second side,
        a groove arranged in the bottom surface between the first end and the second end and extending the width between the first side and the second side, the groove being engageable with a protrusion of a tray, the tray slideably displaceable from a stowed position to a first use position or to a second use position different from the first use position, and
        a connector fastening station located in the first end of the cassette or the second end of the cassette, the connector fastening station configured to fasten at least one of an optical fiber connector, an optical fiber adapter, an optical fiber plug, or an optical fiber strain relief unit.

2. The data communication apparatus of claim 1, wherein a height of the cassette ranges from about 0.4 inches to about 0.6 inches.

3. The data communication apparatus of claim 1, wherein the tray further includes:
    a first engagement member configured to engage with the first end of the cassette or with the second end of the cassette;
    a second engagement member configured to engage with the first end of the cassette or with the second end of the cassette; and
    a length ranging from about 6 inches to about 8 inches from the first engagement member to the second engagement member, and
    wherein the cassette is arrangeable in the tray such that the first engagement member engages with the first end of the cassette or with the second end of the cassette, and the second engagement member engages with the first end of the cassette or with the second end of the cassette.

4. The data communication apparatus of claim 3, further comprising a chassis having a first access side opposite a second access side,
    wherein the tray is arrangeable in the chassis, the tray having a first end opposite a second end, and
    wherein:
        in the stowed position the first and second ends of the tray are located in the chassis;
        in the first use position the first end of the tray is disposed a distance external from the first access side of the chassis; and
        in the second use position the second end of the tray is disposed a distance external from the second access side of the chassis.

5. The data communication apparatus of claim 1, wherein the connector fastening station is a first connector fastening station, and the cassette further includes a second connector fastening station located in the first end of the cassette or the second end of the cassette, the second connector fastening station configured to fasten at least one of the optical fiber connector, the optical fiber adapter, the optical fiber plug, or the optical fiber strain relief unit.

6. The data communication apparatus of claim 1, further comprising a fiber service loop bay for managing a plurality of fibers received by the cassette, the fiber service loop bay arranged between the first end and the second end, and the fiber service loop bay including a plurality of projections arranged above a bottom surface of the cassette for storing and protecting the plurality of fibers.

7. A data communication apparatus, comprising:
    a cassette including:
        a first end,
        a second end opposite the first end, the first end having a first geometry symmetrical, about at least one axis, to a second geometry of the second end,
        a length direction extending a distance between the first end and the second end,
        a first side arranged between the first end and the second end,
        a second side, opposite the first side, arranged between the first end and the second end,
        a width ranging from about 3 inches to about 5 inches from the first side to the second side,
        a bottom surface extending in the length direction between the first end and the second end, and extending the width between the first side and the second side,
        a groove arranged in the bottom surface between the first end and the second end and extending the width between the first side and the second side, the groove being engageable with a protrusion of a tray, the tray slideably displaceable from a stowed position to a first use position or to a second use position different from the first use position, and
        a connector fastening station located in the first end of the cassette or the second end of the cassette and between the first side of the cassette and the second side of the cassette, the connector fastening station configured to fasten at least a plurality of optical fiber connectors.

8. The data communication apparatus of claim 7, wherein a height of the cassette ranges from about 0.4 inches to about 0.6 inches.

9. The data communication apparatus of claim 7, wherein the tray further includes:
   a first wall configured to engage with the first side of the cassette or engage with the second side of the cassette;
   a second wall configured to engage with the first side of the cassette or engage with the second side of the cassette;
   a width ranging from about 3 inches to about 5 inches from the first wall to the second wall; and
   wherein the cassette is arrangeable in the tray such that the first wall is engageable with the first side of the cassette or engageable with the second side of the cassette, and the second wall is engageable with the first side of the cassette or engageable with the second side of the cassette.

10. The data communication apparatus of claim 9, further comprising a chassis having a first access side opposite a second access side;
   the tray arrangeable in the chassis, the tray having a first end opposite a second end, wherein:
      in the stowed position the first and second ends of the tray are located in the chassis;
      in the first use position the first end of the tray is disposed a distance external from the first access side of the chassis; and
      in the second use position the second end of the tray is disposed a distance external from the second access side of the chassis.

11. The data communication apparatus of claim 7, wherein the plurality of optical fiber connectors comprise a plurality of LC connectors.

12. The data communication apparatus of claim 7, further comprising a fiber service loop bay for managing a plurality of fibers received by the cassette, the fiber service loop bay arranged between the first end and the second end, and the fiber service loop bay including a plurality of projections arranged above a bottom surface of the cassette for storing and protecting the plurality of fibers.

13. A data communication apparatus, comprising:
   a cassette including:
      a first end,
      a second end opposite the first end, the first end having a first geometry symmetrical, about at least one axis, to a second geometry of the second end,
      a length direction extending a distance between the first end and the second end,
      a first side arranged between the first end and the second end,
      a second side, opposite the first side, arranged between the first end and the second end,
      a width direction extending a distance between the first side and the second side,
      a bottom surface extending in the length direction between the first end and the second end, and extending in the width direction between the first side and the second side,
      a groove arranged in the bottom surface between the first end and the second end and extending in the width direction between the first side and the second side, the groove being engageable with a protrusion of a tray, the tray slideably displaceable from a stowed position to a first use position or to a second use position different from the first use position,
      at least a detent arranged in the first side or arranged in the second side, and
      a connector fastening station located in the first end of the cassette or the second end of the cassette and between the first side of the cassette and the second side of the cassette, the connector fastening station configured to fasten at least a plurality of optical fiber connectors.

14. The data communication apparatus of claim 13, wherein the detent is a first detent, and wherein the tray further includes:
   a first wall opposite a second wall;
   at least a second detent arranged in the first wall or arranged in the second wall to engage with the first detent; and
   wherein the cassette is arrangeable in the tray such that the first detent is engageable with the second detent.

15. The data communication apparatus of claim 14, further comprising a chassis having a first access side opposite a second access side;
   the tray arrangeable in the chassis, the tray having a first end opposite a second end, wherein:
      in the stowed position the first and second ends of the tray are located in the chassis;
      in the first use position the first end of the tray is disposed a distance external from the first access side of the chassis; and
      in the second use position the second end of the tray is disposed a distance external from the second access side of the chassis.

16. The data communication apparatus of claim 13, wherein a height of the cassette ranges from about 0.4 inches to about 0.6 inches.

17. The data communication apparatus of claim 13, further comprising a fiber service loop bay for managing a plurality of fibers received by the cassette, the fiber service loop bay arranged between the first end and the second end, and the fiber service loop bay including a plurality of projections arranged above a bottom surface of the cassette for storing and protecting the plurality of fibers.

18. The data communication apparatus of claim 13, wherein the tray further includes:
   a first wall opposite a second wall; and
   a floor extending between the first wall and the second wall; the protrusion arranged in the floor; and
   wherein the cassette is arrangeable in the tray such that the protrusion of the tray is engageable with the groove of the cassette.

19. The data communication apparatus of claim 18, further comprising a chassis having a first access side opposite a second access side;
   the tray arrangeable in the chassis, the tray having a first end opposite a second end, wherein:
      in the stowed position the first and second ends of the tray are located in the chassis;
      in the first use position the first end of the tray is disposed a distance external from the first access side of the chassis; and
      in the second use position the second end of the tray is disposed a distance external from the second access side of the chassis.

* * * * *